INFORMATION TRANSFER SYSTEM

Filed Sept. 13, 1962 45 Sheets-Sheet 1

INVENTORS
E. LEONARD
E. M. RICHARDS
E. BEREZIN
S.C. Yuter
ATTORNEY

June 14, 1966 E. LEONARD ETAL 3,256,514

INFORMATION TRANSFER SYSTEM

Filed Sept. 13, 1962 45 Sheets-Sheet 11

June 14, 1966 E. LEONARD ETAL 3,256,514

INFORMATION TRANSFER SYSTEM

Filed Sept. 13, 1962 45 Sheets-Sheet 19

June 14, 1966 E. LEONARD ETAL 3,256,514

INFORMATION TRANSFER SYSTEM

Filed Sept. 13, 1962 45 Sheets-Sheet 22

June 14, 1966 E. LEONARD ETAL 3,256,514

INFORMATION TRANSFER SYSTEM

Filed Sept. 13, 1962 45 Sheets-Sheet 23

June 14, 1966 E. LEONARD ET AL 3,256,514

INFORMATION TRANSFER SYSTEM

Filed Sept. 13, 1962 45 Sheets-Sheet 24

June 14, 1966 E. LEONARD ETAL 3,256,514

INFORMATION TRANSFER SYSTEM

Filed Sept. 13, 1962 45 Sheets-Sheet 25

June 14, 1966 E. LEONARD ETAL 3,256,514

INFORMATION TRANSFER SYSTEM

Filed Sept. 13, 1962 45 Sheets-Sheet 28

COUNTER & TIME INTERVAL GENERATOR CTIG

COUNTER RESET 1070

COUNTER 1090

FIG. 40B
BINARY COUNTER 1130
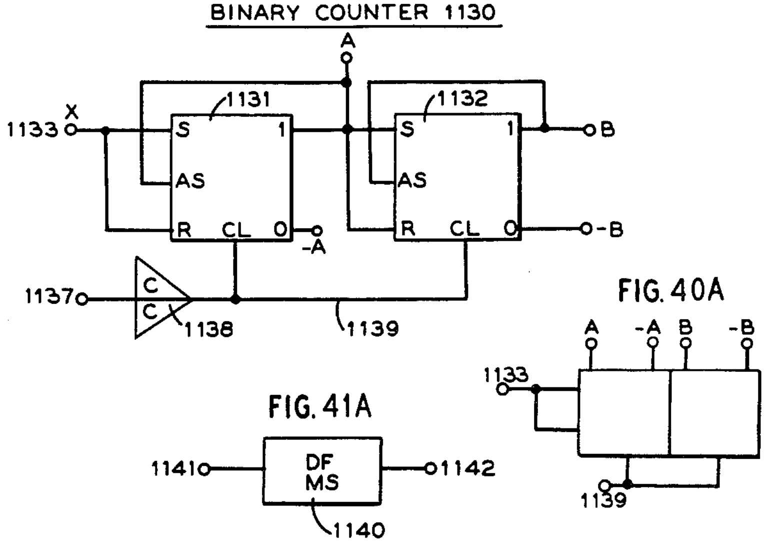
FIG. 40A, FIG. 41A
FIG. 41B
DELAY FLOP 1140
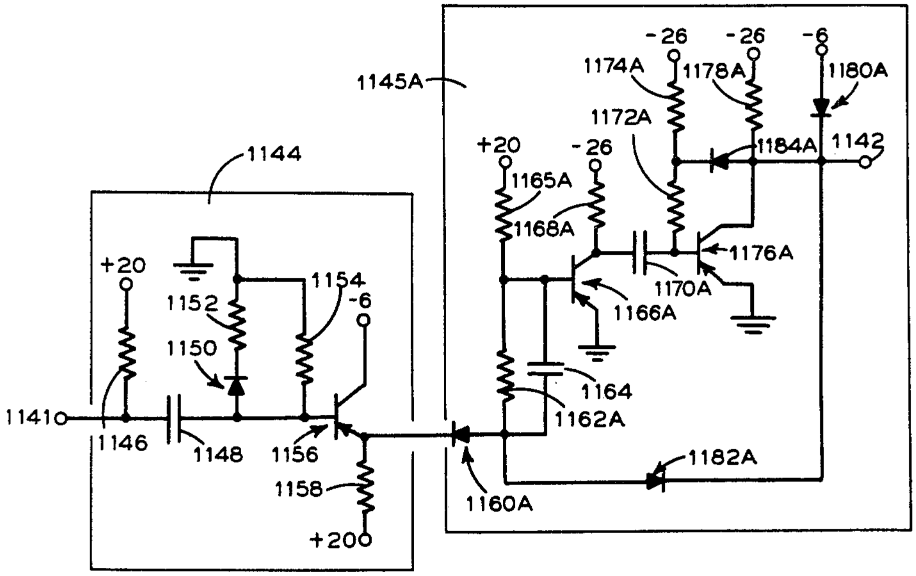

PARITY CHECKER 1320

CORE DRIVER

INHIBIT DRIVER

BILATERAL SWITCH

United States Patent Office 3,256,514

Patented June 14, 1966

3,256,514

INFORMATION TRANSFER SYSTEM

Eugene Leonard, Sands Point, Edward M. Richards, East Northport, and Evelyn Berezin, New York, N.Y., assignors to Digitronics Corporation, Albertson, N.Y., a corporation of Delaware Filed Sept. 13, 1962, Ser. No. 223,481

15 Claims. (Cl. 340—146.1)

This invention pertains to information transfer systems and more particularly to systems for transmitting units of information comprising binary digits, represented by signals, serially between remotely located stations.

Heretofore, digital information was transmitted between remote stations over private telephone or telegraph lines. These systems have several serious limitations in view of the ever increasing need for high speed and long distance transmission of information between cities or even across the continent. In the first place, the rate of information transfer over these lines was exceedingly slow and generally in the order of about ten characters (alphabetic letters, decimal digits, punctuation marks, etc.) per second. Secondly, such systems, because of their extremely slow transmission rates increase the cost per unit of information transmitted. In addition, a great deal of time is required to transmit messages and in some cases, because of the immediacy for the need of the information, it is impossible to transmit the message in the required time.

Another disadvantage of such systems is lack of means for detecting and checking for errors in the transmitted information. Formerly, the type of information was such that errors could be tolerated. However, present day handling systems demand virtually error-free information or at least means which indicate that an error is present in the information. Finally, such systems often required the physical presence of an operator at each station to prepare the equipment for receiving or transmitting information.

There has become recently available telephone equipment which permits the transfer of data over conventional telephone lines and which enables direct dialing of a receiving or transmitting station and then transfer of the information via the present telephone system through switchboards and exchanges to a subscriber set at a remote installation. Such apparatus removes the necessity for, and reduces data transmission cost in relation to privately owned or leased telephone or telegraph lines since the user pays only for the on-line-time. However, such telephone equipment is unreliable as regards accuracy of the information transferred. It is well known that conventional telephone lines are quite often noisy. During voice communication, the noise on a line is quite often of no consequence since the conversing parties can either repeat the garbled words or can mentally decipher their meaning. Also, when the parties sense a noisy connection, they can disconnect and initiate a new connection.

However, when digital information is transferred over these lines, the noise can destroy units of information or can introduce errors into the units of information.

Furthermore, in contrast with voice communication the transmitted coded information cannot be readily followed from context, aurally or otherwise. In this sense, the opportunity to disconnect and reconnect is not available. Therefore, if the telephone line is noisy, the user will be paying for the time he is on the line, whether or not useful information is being transferred.

It is desirable in the ideal, that the telephone line user pay only for the time during which useful information is being transmitted.

It is also desirable to have information transfer system which permits the transmission of a maximum amount of reliable information in a minimum period of time at a minimum cost.

In the copending application for an Information Transfer System, Serial No. 180,435, filed March 19, 1962, E. Leonard et al. assigned to the same assignee, such a system has been provided. While such a system admirably satisfied many of requirements of data processing and digital information transfer customers, it created a need for still more versatile, economic and reliable systems.

In such information transfer systems, it is highly desirable to divide the units of information into a plurality of units which constitute a block of units of information. Most information processing systems are geared to handle the information in blocks. In addition, it is convenient to divide the information into blocks so that if retransmissions are required because of the transfer of erroneous characters, it is only necessary to retransmit a given block instead of the entire message. However, it should be noted that if a particularly noisy line is encountered it is possible to have many retransmissions of the same block. For example, it is possible that during the initial transmission that one unit of information is received in error because of noise on the line. Accordingly, there will be a retransmission of the information. When the noise on the line is random the probability is that a different unit of information will be received in error. Therefore, there will be another transmission.

It is accordingly a general object of this aspect of the invention to minimize the number of retransmissions when there are erroneous units of information in the blocks of information transferred over a noisy communications link such as a telephone line.

It is another object of this aspect of the invention to reconstruct an error free block of information from a block of information that has been transmitted at least twice by selecting the appropriate error free units during each transmission.

Briefly, this aspect of the invention contemplates a system for transferring a group or block of units of information such as characters which includes transmitting means for transmitting the units of information and receiving means for receiving the units of information. The receiving means includes a storage means for storing the received units of information and error detecting means for detecting errors in the received units of information. Control means is provided which is responsive to the error detecting means for causing a retransmission of the group or block when the error detecting means detects an error in one of the received units of information. During the retransmission, means are operative to ensure that error free units are stored in the storage means by causing the storage of the newly received unit of information if error free, or of the related previously received and stored unit of information.

A feature of this aspect of the invention contemplates the equivalent of an initial transmission when both the newly received unit of information and its related previously received and stored unit of information are erroneous.

A further feature of this aspect of the invention provides for the equality comparison of the newly received unit of information and its related previously received and stored unit of information when both are apparently error free. If the two units prove to be identical, the information is treated as valid. If they are not identical, neither is treated as valid, and a new transmission, equivalent to an original transmission, is called for. This insures that valid units of information are not precessed by invalid units of information. But for this feature of the invention, processing might occur under the following circumstances, for example.

In addition to the units of information ultimately intended to be received and recorded, the apparatus of the disclosed system also transmits certain signals, so-called reference characters, which serve to force synchronization of transmitter and receiver, and for additional purposes. At the receiver, the reference characters are recognized as such, and are normally not stored for ultimate recording. Because of noisy line conditions, it is possible that a reference character be converted to what is apparently a unit of information, and even error free. As such, it would be stored, and the order of units of information would be disturbed, that is, the valid units of information would be precessed.

The operations described so far may be briefly summarized as follows. Upon retransmission, there exist the following possibilities:

(1) The previously received and stored character had error, and its corresponding newly received character is error free. The latter replaces the former.

(2) The previously received and stored character was error free, and its corresponding newly received character is in error. The former is retained.

(3) Both corresponding characters are in error. A completely new transmission, equivalent to an original transmission, is called for.

(4) Both corresponding characters are apparently error free. A comparison is made. If they are found to be identical, the information is retained; otherwise a new transmission, equivalent to an original transmission, is called for.

When an information transfer system includes stations or units serially interposed between the initial source and the ultimate receiver there is the possibility of errors occurring in the units of information at any intermediate stage. For example, a system which may include an input magnetic tape unit, which transmits to a buffer memory, which transmits to a transmitter of a data link, which in turn transmits to a receiver of the data link. It is apparent that at each stage of transfer there is a possibility for introduction of error. To enhance the reliability of the system, error checking is incorporated in each transfer path and when an error is detected a retransmission on that path is called for. However, it can also happen that an error is generated at one of the stations in the path and when the succeeding station calls for a retransfer because it received erroneous information, the retransfer would again be erroneous and error correction by retransmission would be defeated. Although systems have been devised to solve this problem they are generally complicated and expensive.

It is, therefore, a general object of this aspect of the invention to provide an improved error correcting means to be incorporated in an information system which includes at least a transmitter of information, an ultimate receiver of information and at least one station or relaying unit interconnecting the transmitter to the receiver. A relaying unit is apparatus which receives information from one unit and retransmits it to another unit. In the above cited example, a relaying unit would be the buffer memory between the magnetic tape system and the transmitter of the data link.

It is a more specific object of this aspect of the invention to provide an error correcting means which minimize the number of retransfers between the several serially connected units of an information transfer system.

Briefly this aspect of the invention contemplates at least three serially connected units. The first unit includes means for transmitting information to the second unit. The second unit includes means for receiving information from the first unit and means for transmitting the received information to the third unit. The third unit includes means for receiving information from the second unit. The second unit contains error detecting means for detecting errors in the information it transmits to the third unit. The third unit contains error detecting means for detecting errors in the information it receives from the second unit. Therefore, if the error detecting means of the third unit detects an error the error could arise from one of two sources. The error could be generated in the line connecting the second and third units or the error could have been generated in the second unit. If the error were generated by the connecting line a simple retransmission from the second unit to the third unit would suffice. However, if the error were generated by the second unit such a retransmission would not be satisfactory. Therefore, the third unit includes means for directing a retransmission by the second unit whenever the error detecting means of the third unit detects an error. The second unit includes control means which responds to both the directing means and to the error detecting means in the second unit. If the error detecting means of the second unit has not detected an error in the transmitted information, the control means causes the second unit to retransmit its information. If, however, this error detecting means had detected an error, then the control means of the second unit would call for a retransmission of the information from the first unit to the second unit, which would then be transmitted to the third unit. In this way, the number of interrelated retransmissions may be minimized.

In such systems when the receiver has an intermediate storage a problem can arise when the number of units of information in a block being transferred exceeds the capacity of the intermediate storage, so that the storage may overflow before the end of transmission of a block of units of information. Heretofore, it was necesary to limit the length of a transferred block, i.e. limit the number of units of information or characters in the block to a number less than the capacity of the intermediate storage. However, such a scheme clearly limits the flexibility of the system. Furthermore, when the transmitter includes a paper tape reader such as that shown in the mentioned co-pending Leonard et al. application a further hardship is encountered. Generally, the input paper tape is prepared by a human operator. Therefore, the operator must keep count of the units of information in a block and arbitrarily insert end of block characters when a certain count is reached. Since the typical operator is only semi-skilled, she often fails to perform this operation and proceeds to the natural end of the block.

It is therefore a general object of this aspect of the invention to eliminate the need to limit the size of the blocks when the receiver of the system includes an intermediate storage of limited capacity.

It is accordingly another general object of this aspect of the invention to provide apparatus for transmitting blocks of information that include a number of units of information which would ordinarily exceed the capacity of an intermediate storage at the receiver.

It is a more specific aspect of the invention to permit the transfer of blocks having a number of units of information which exceed the capacity of an intermediate storage of the receiver and still have the blocks retain their overall unitary structure after transfer from the intermediate storage by the receiver.

It is a more specific object of this aspect of the invention to provide apparatus which permits the transmission of blocks of variable length and if such blocks exceed a certain size, to create pseudo blocks of predetermined size.

Briefly, in accordance with this aspect of the invention there is contemplated a system which includes means for transmitting blocks of units of information to a receiver which includes a first storage means of limited capacity and a second storage means. The first storage means initially receives the units of information from the transmitting means and subsequently transfers the units of information to the second storage means. Counting means are provided for counting the units of information transmitted. Means are responsive to the counting means for suspending transmission for a given time interval by the transmitting means. Other means are also responsive to the counting means to cause the transfer of the units of information from the first storage means to the second storage means during the period of suspension.

A feature of this aspect of the invention is the appending to the units of information transferred from the first storage means to the second storage means, a control unit of information for indicating that the succeeding units of information transferred by the first storage means are to be included in the block being transmitted by the transmitting means.

Other objects, features and advantages of the various aspects of the invention will be apparent from the following detailed description when read with the accompanying drawings wherein.

Figure 2:
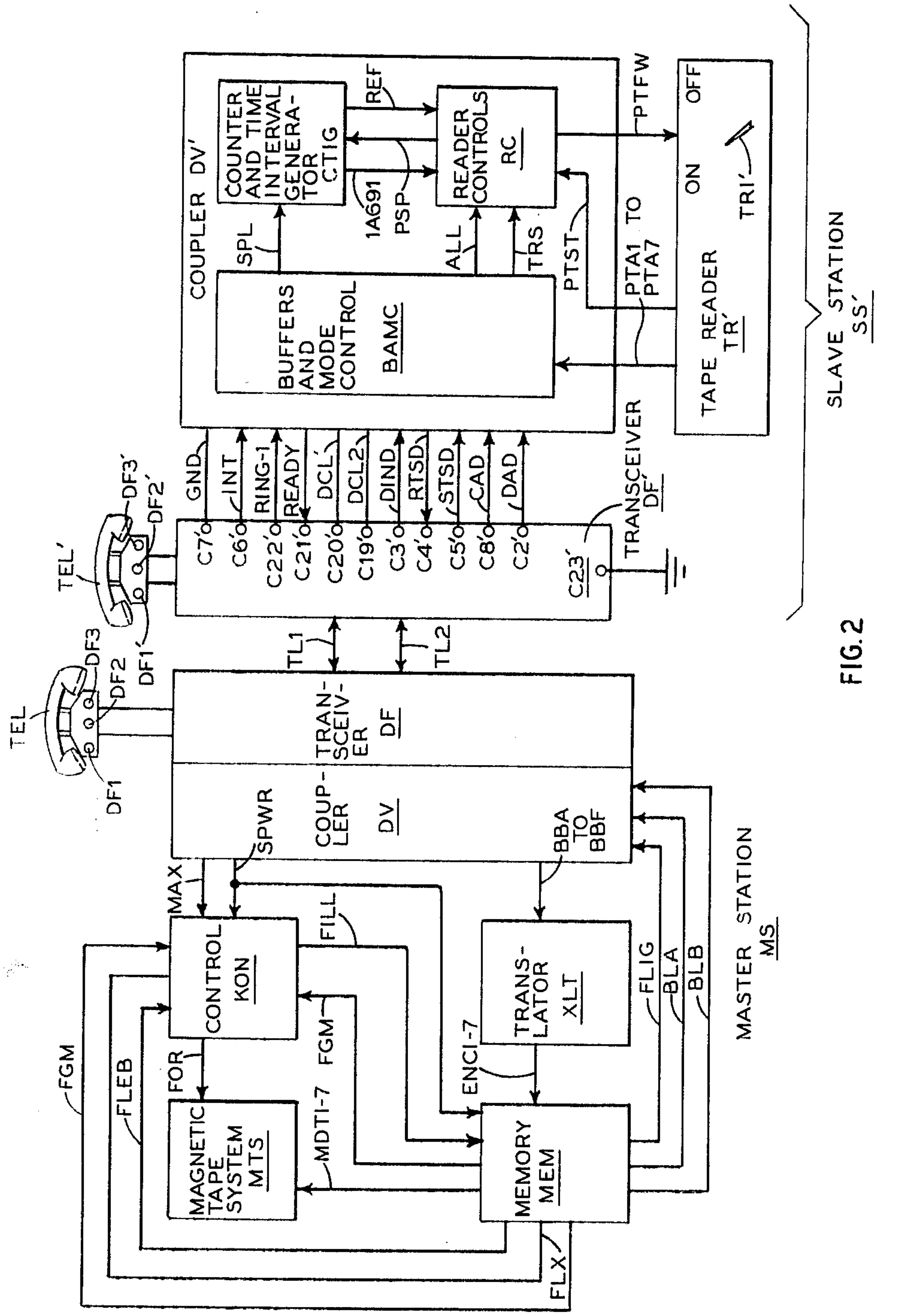
FIGURE 2 shows, in accordance with another aspect of the invention, another overall block diagram of an information transfer system including a master station similar to the master station of FIGURE 1 and a slave station which includes a coupler having buffer and mode controls; a counter and time interval generator; a reader controls; a transceiver; and a tape reader.
Figures 3A, 3B, 3C:
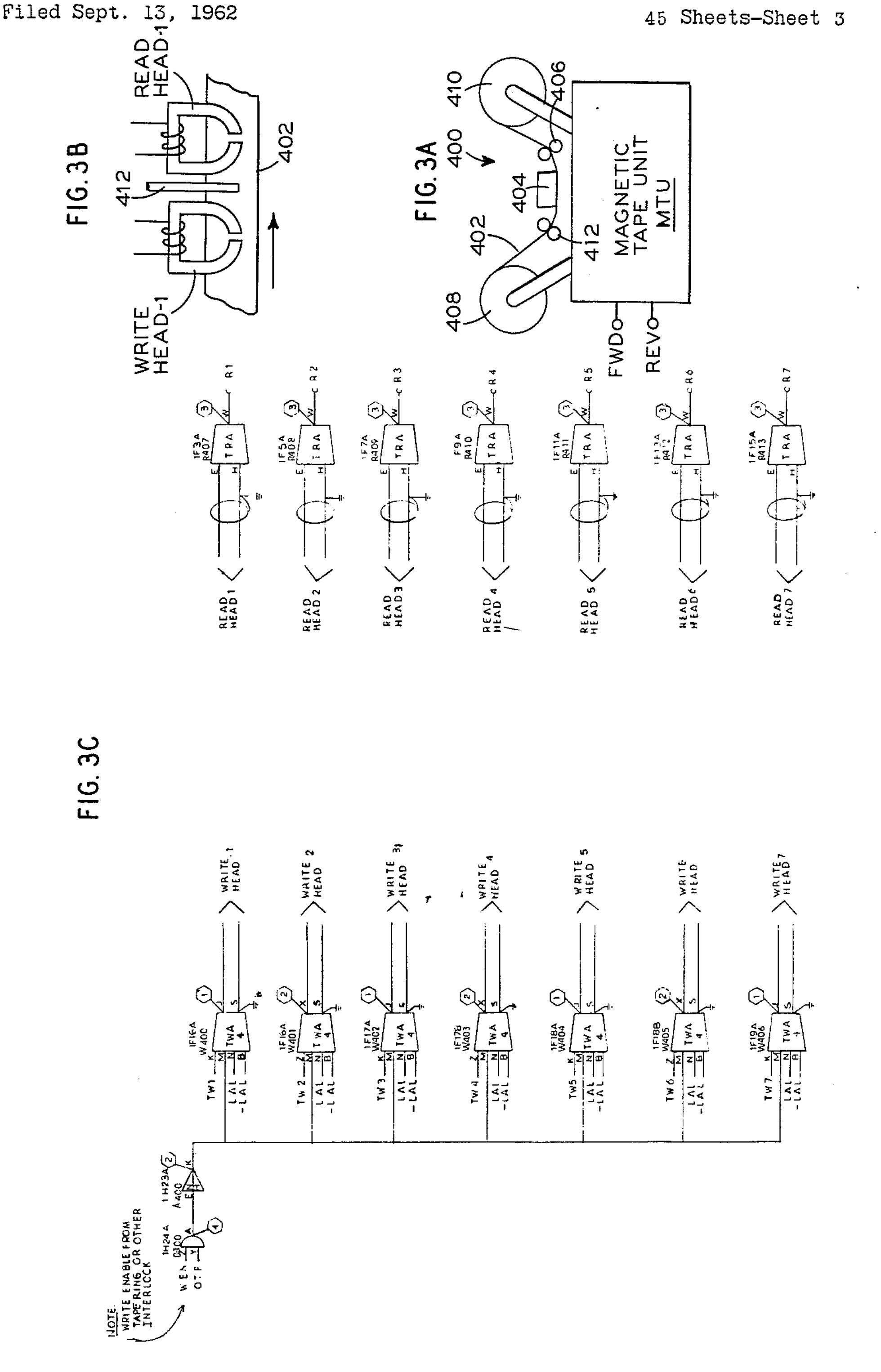
Figure 4:
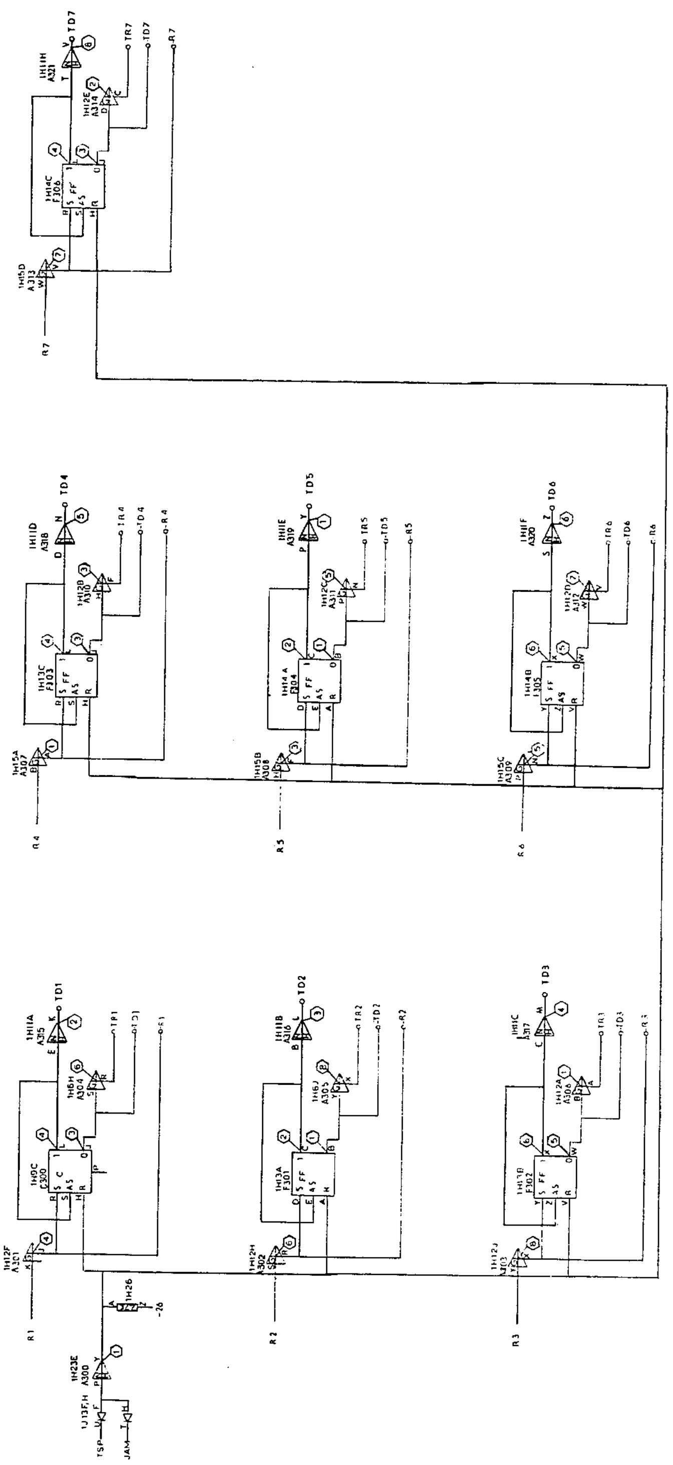
Figure 5:
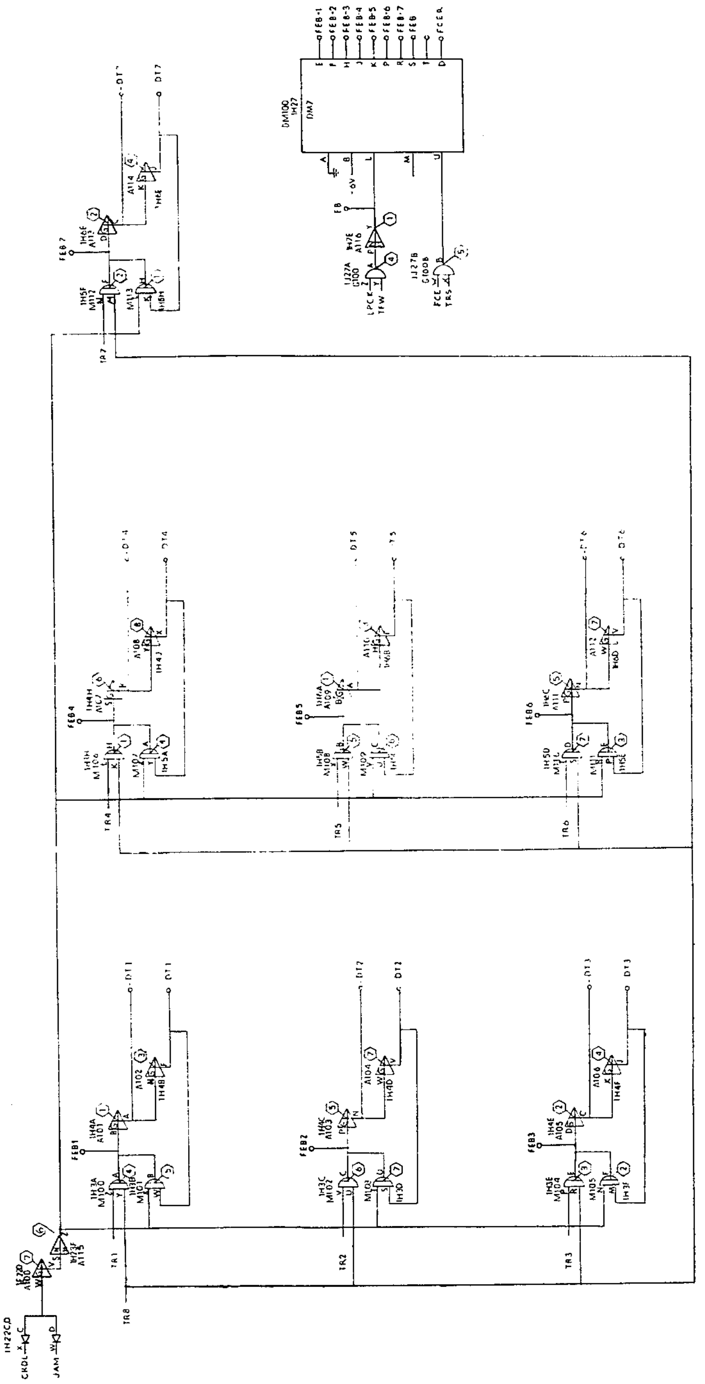
Figure 6:
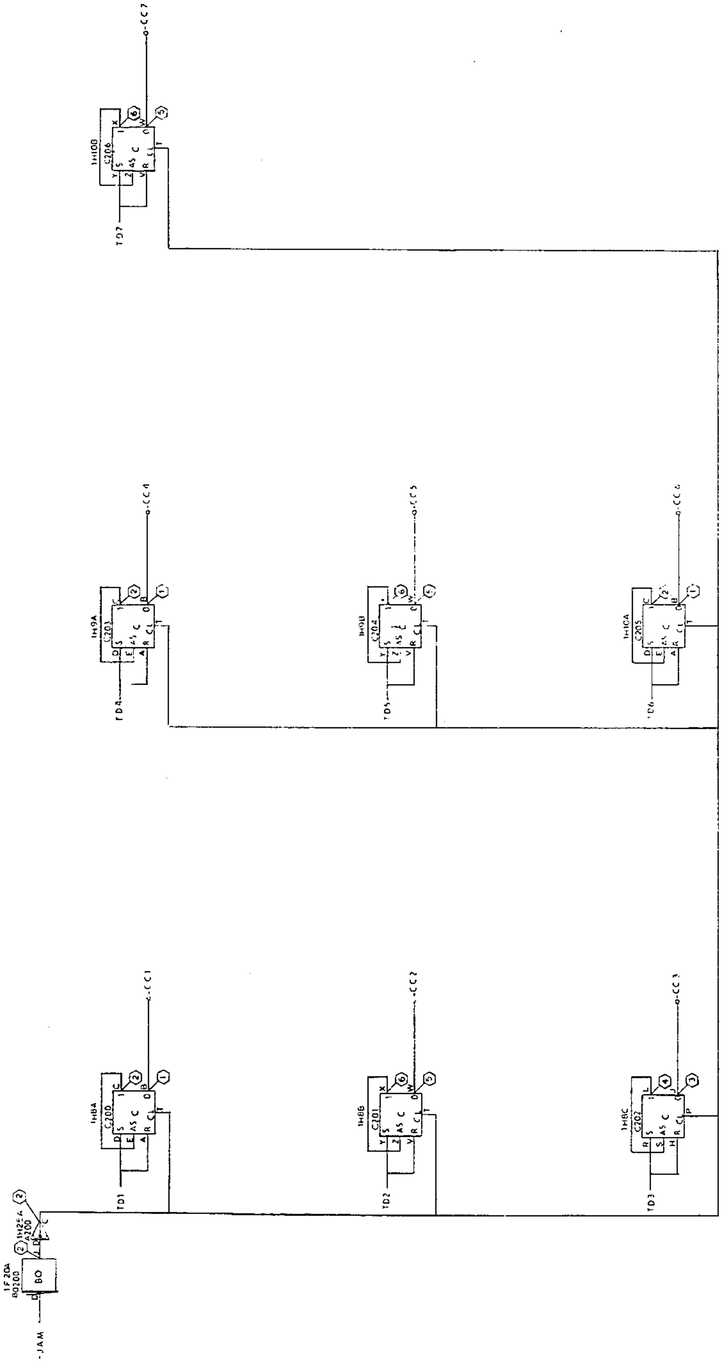
Figure 7:
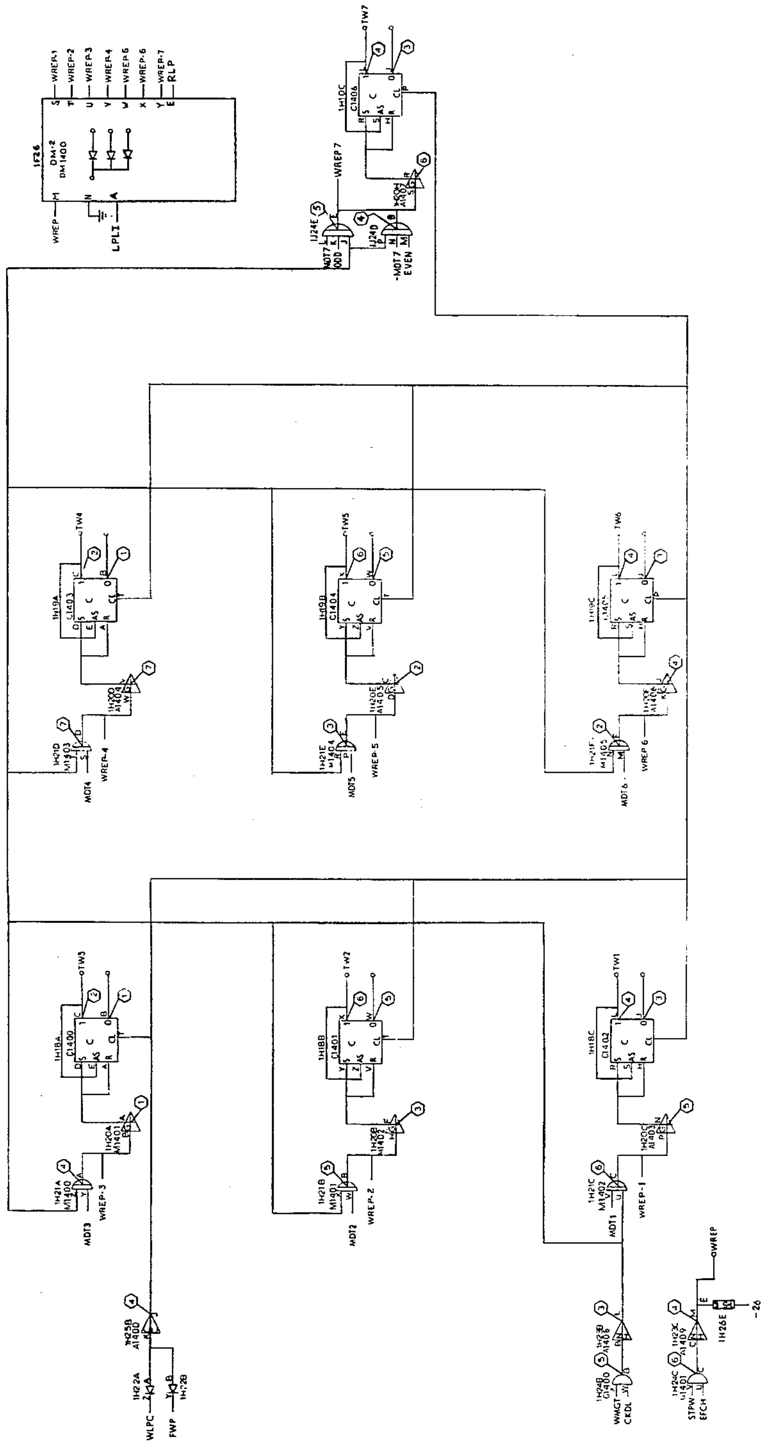
Figure 8:
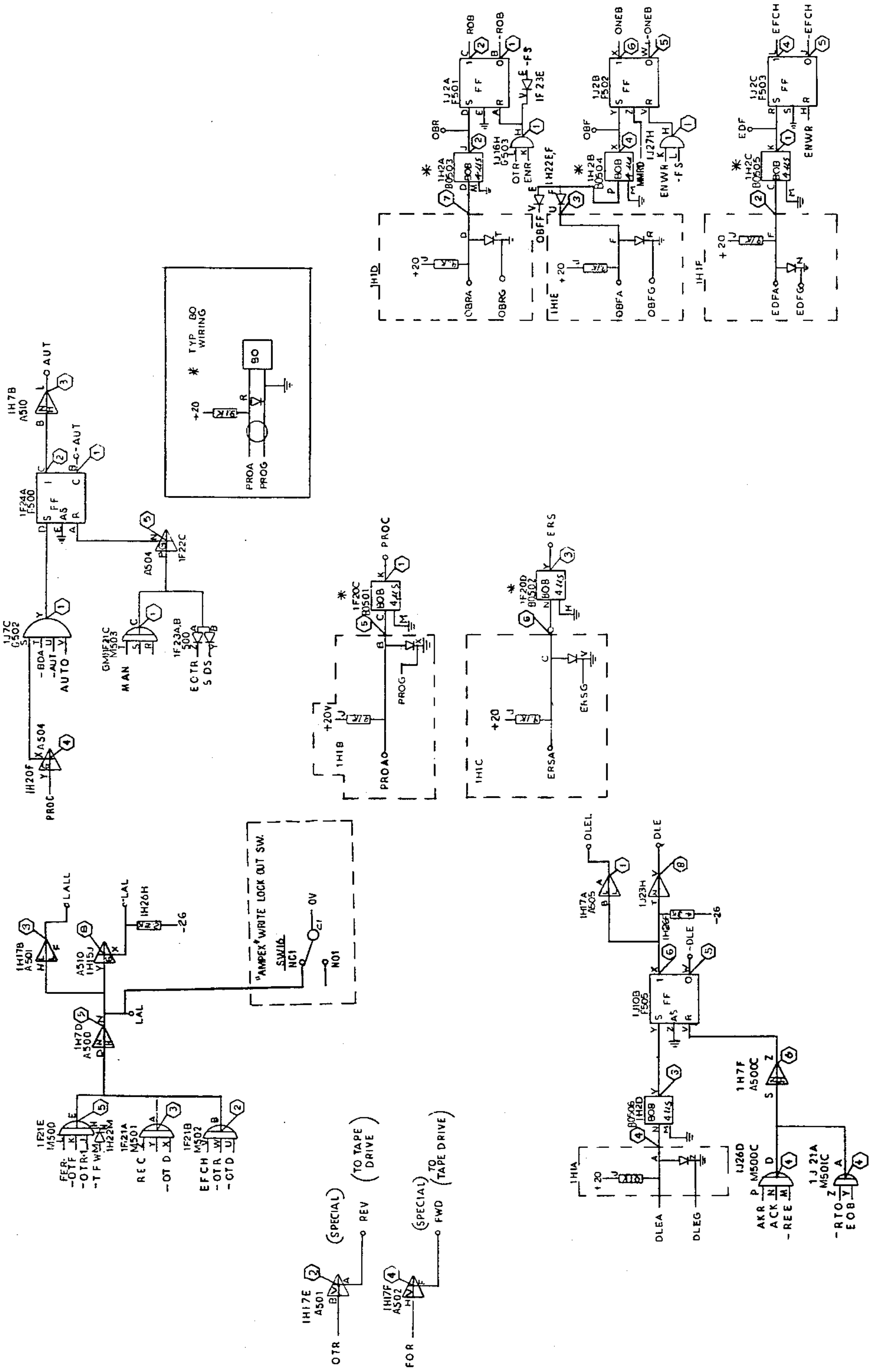
Figure 9A:
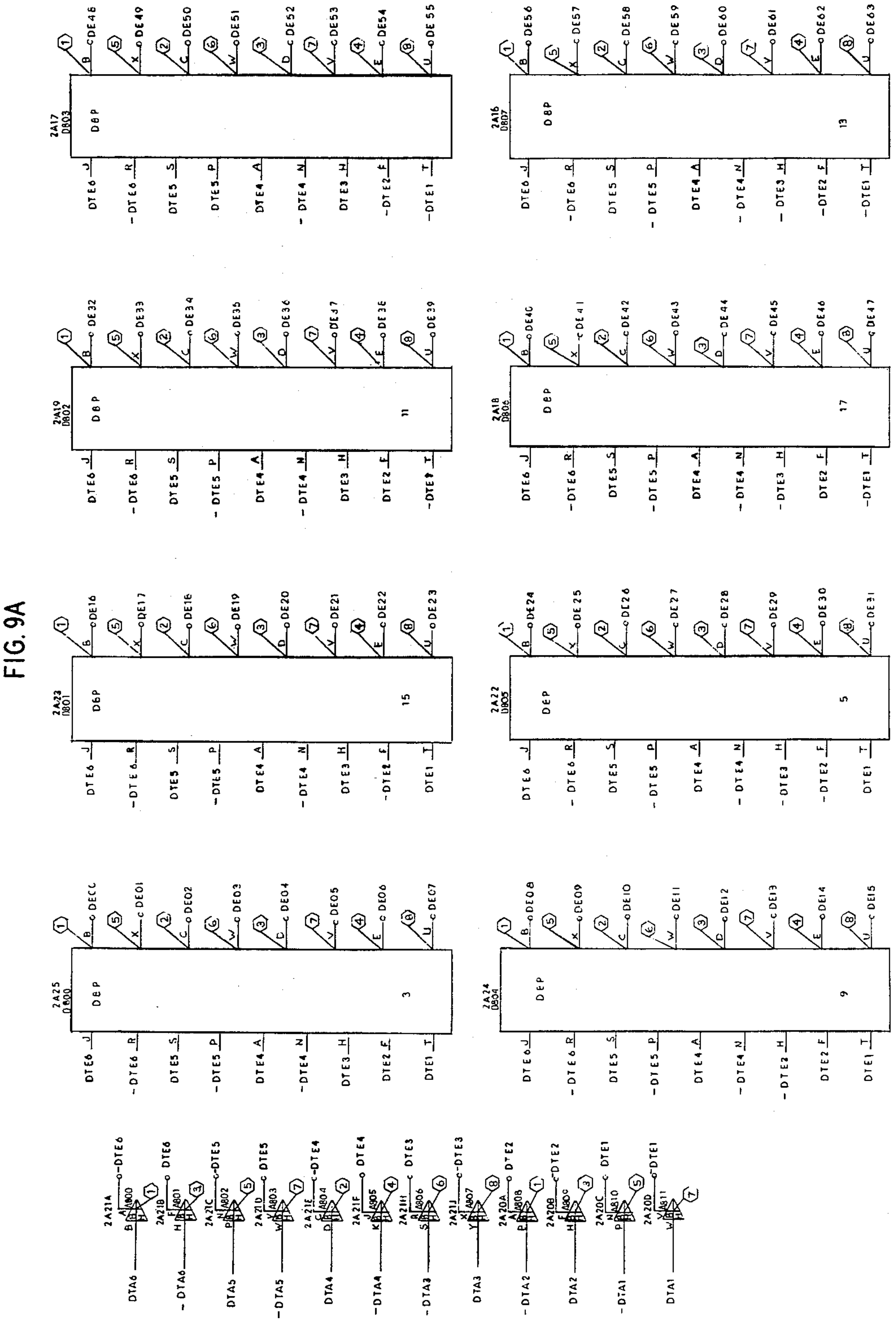
Figure 9B:
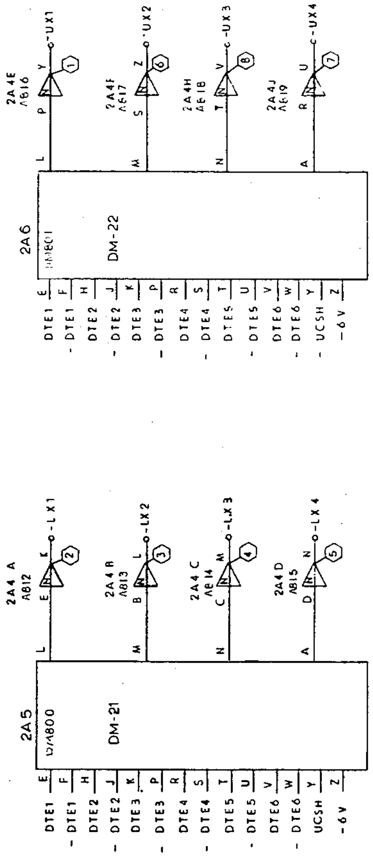
Figure 10:
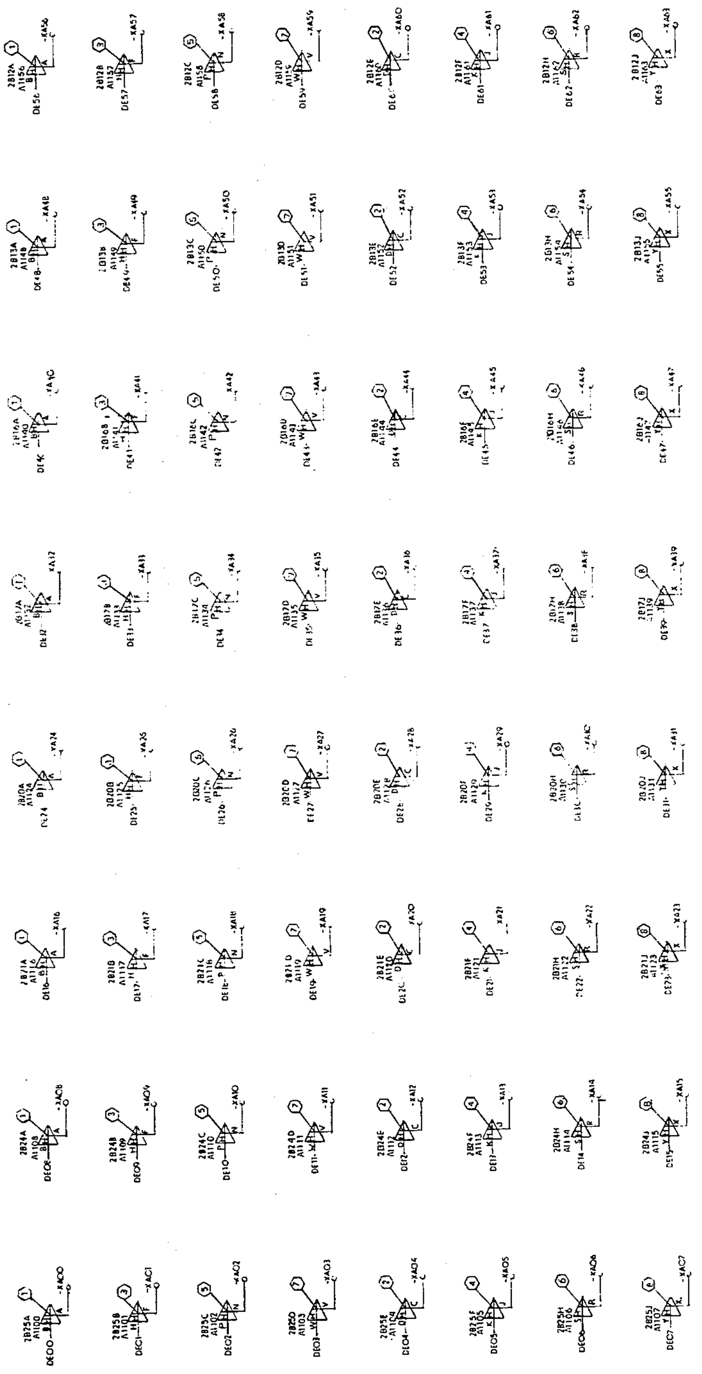
Figure 11:
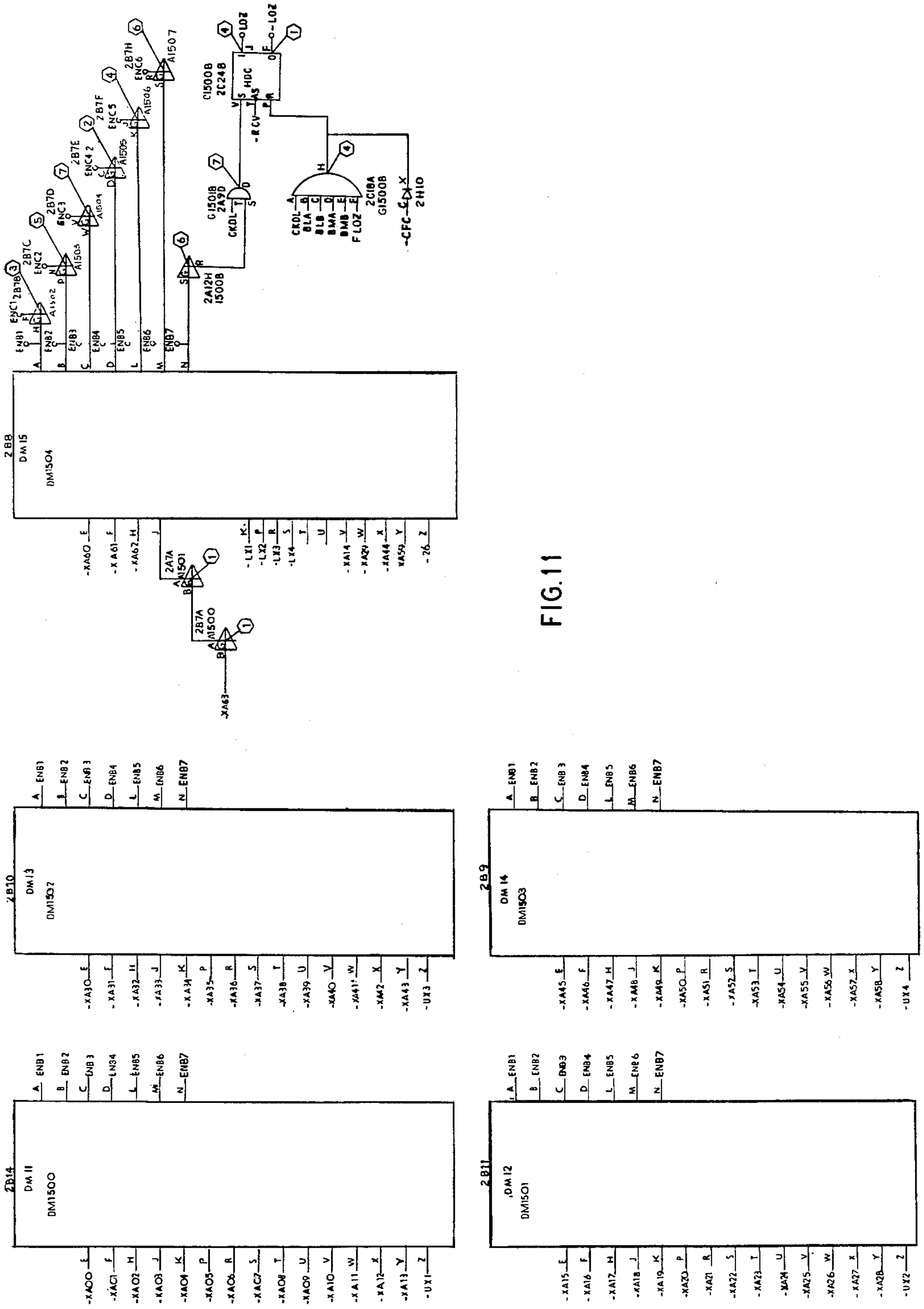
Figure 12:
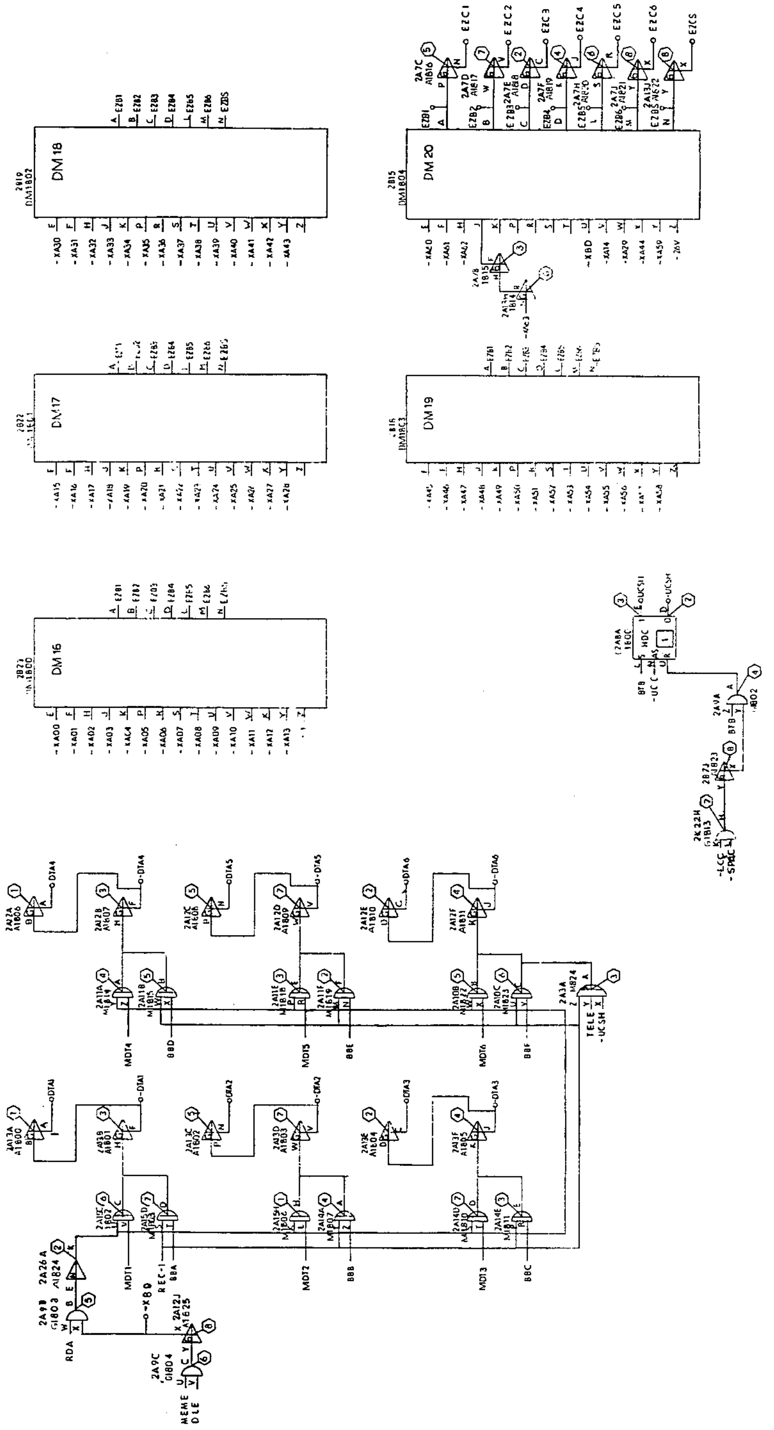
Figures 13A, 13B:
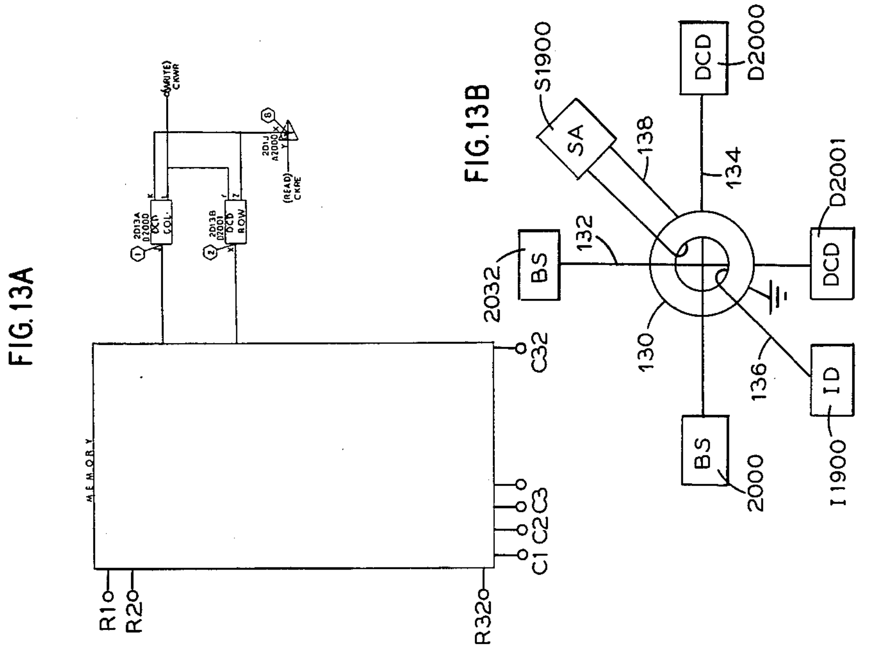
Figure 13C:
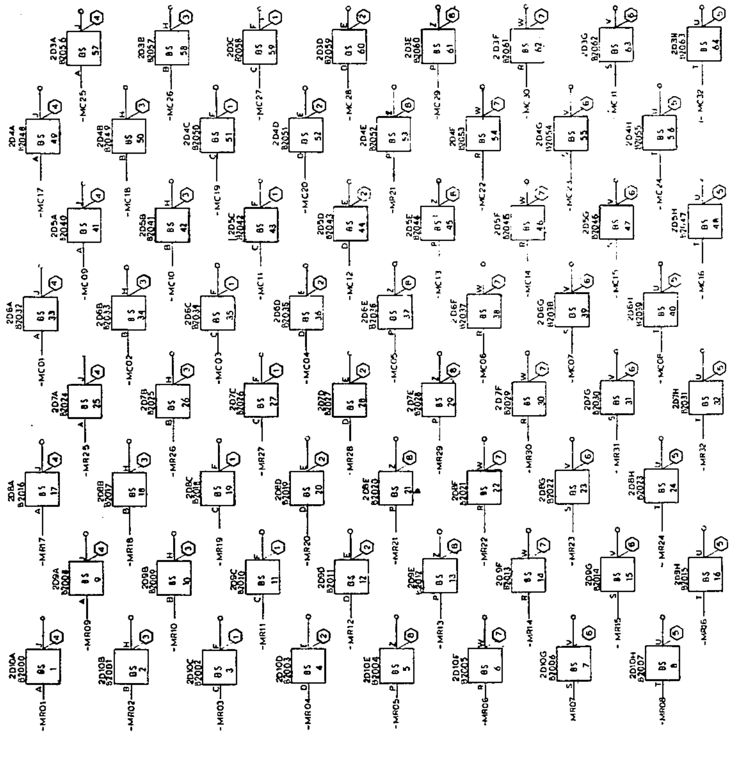
Figure 14:
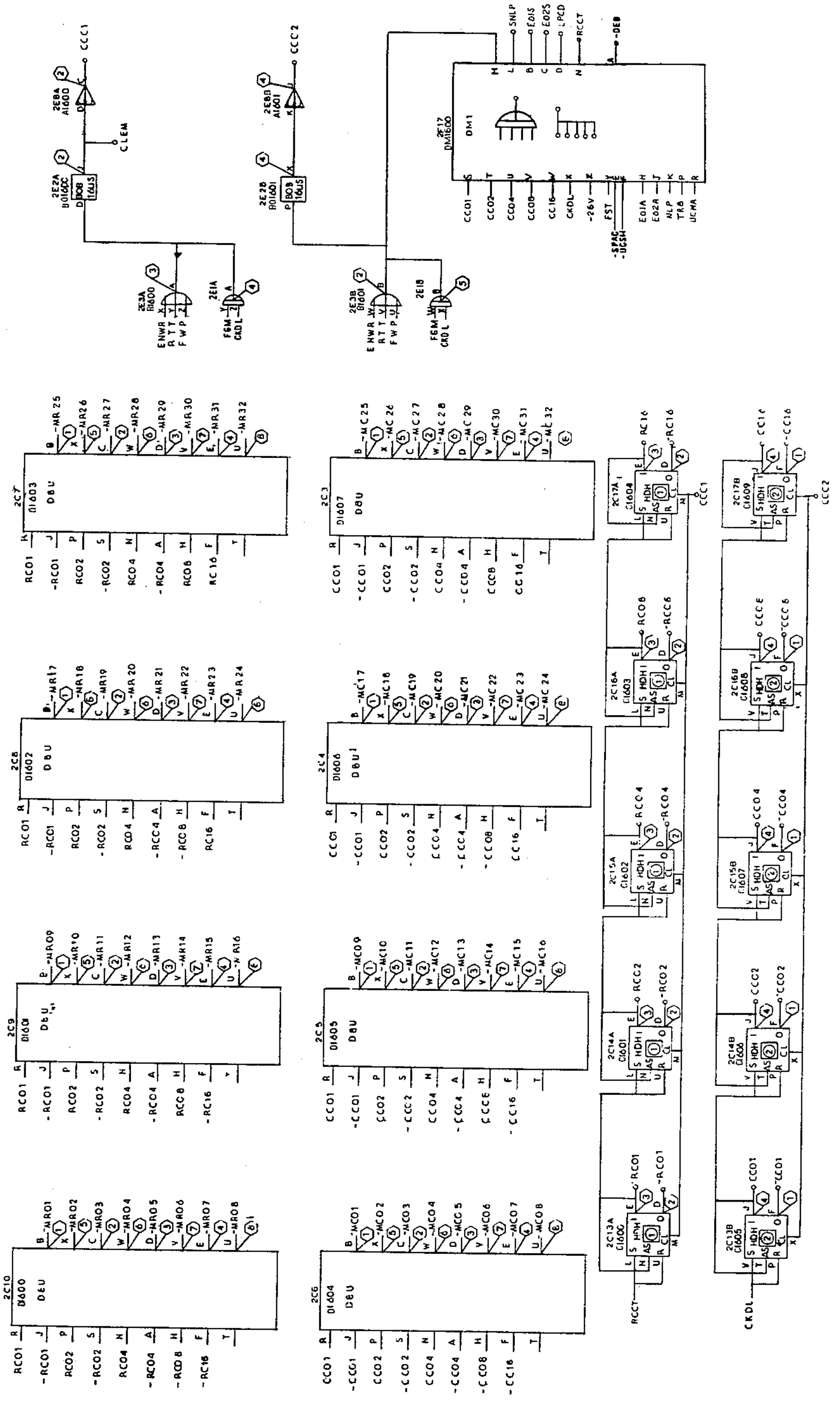
Figure 15:
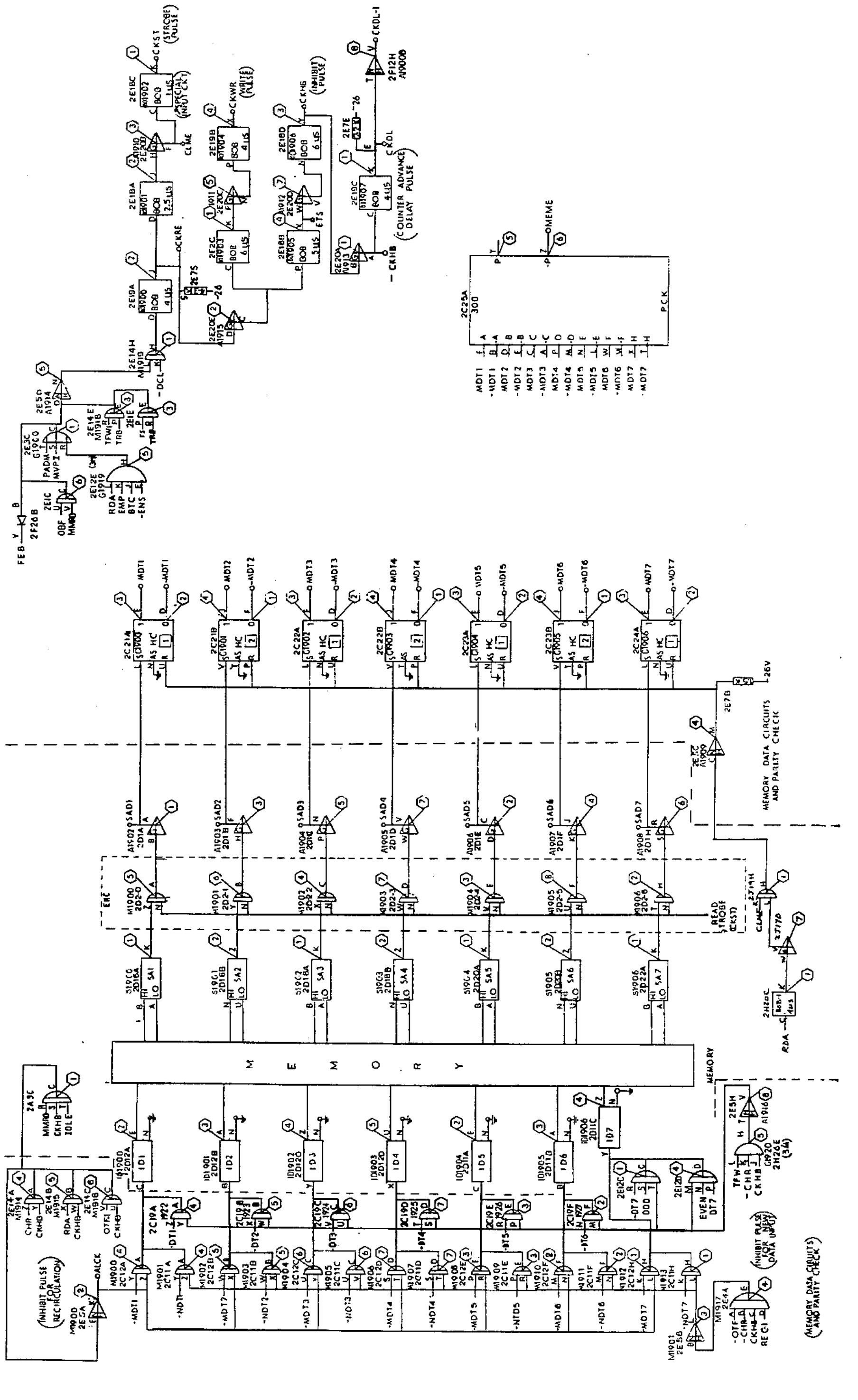
Figure 16:
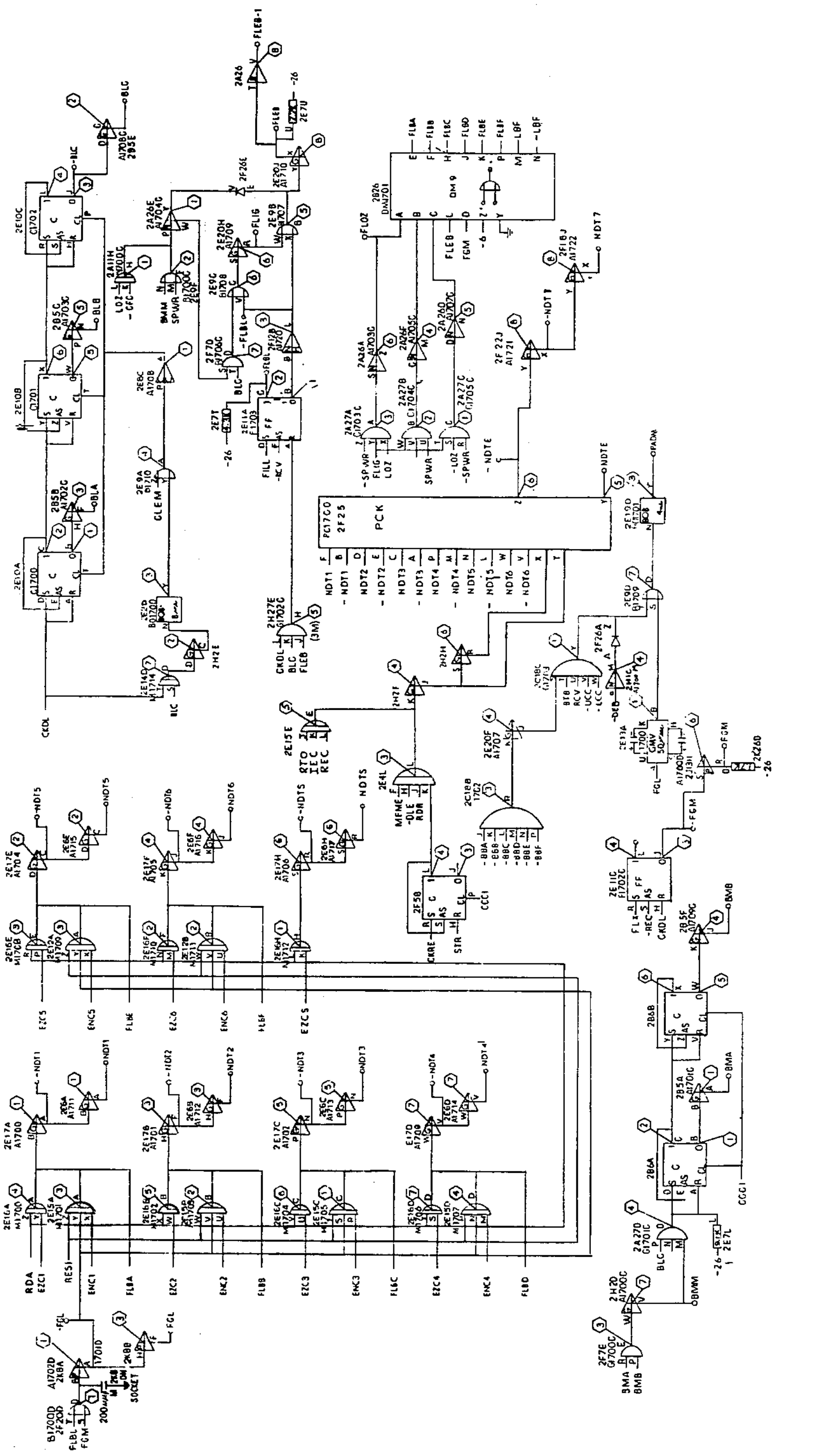
Figure 17:
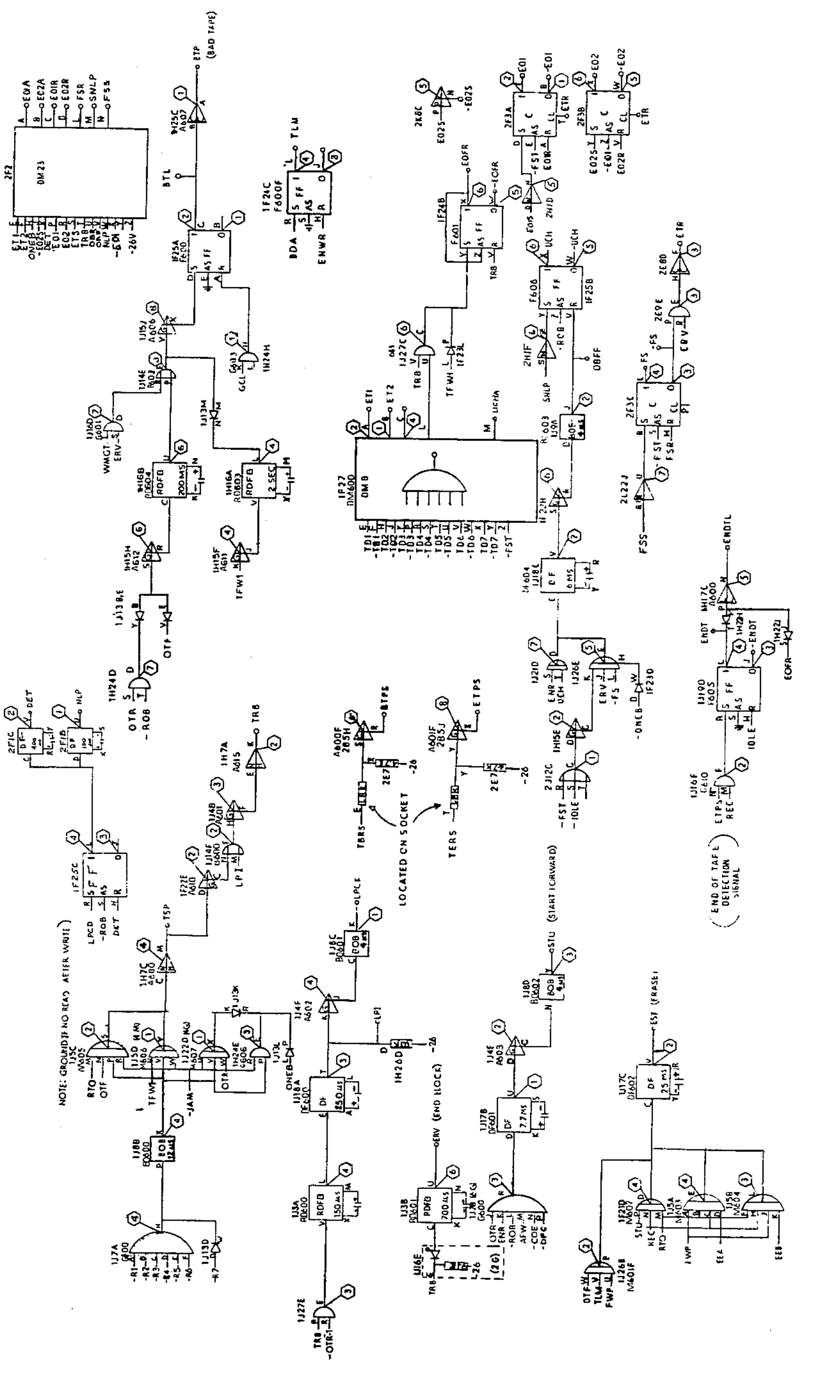
Figure 18:
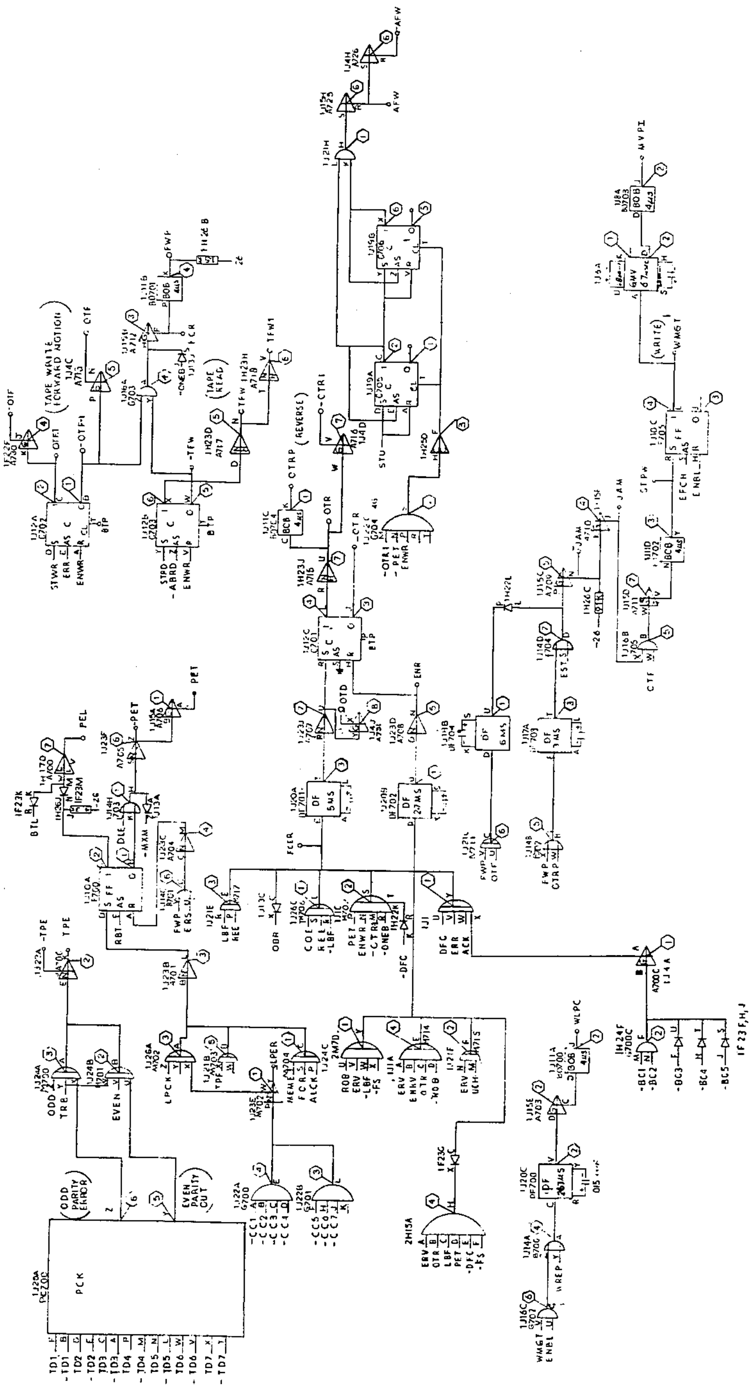
Figure 19:
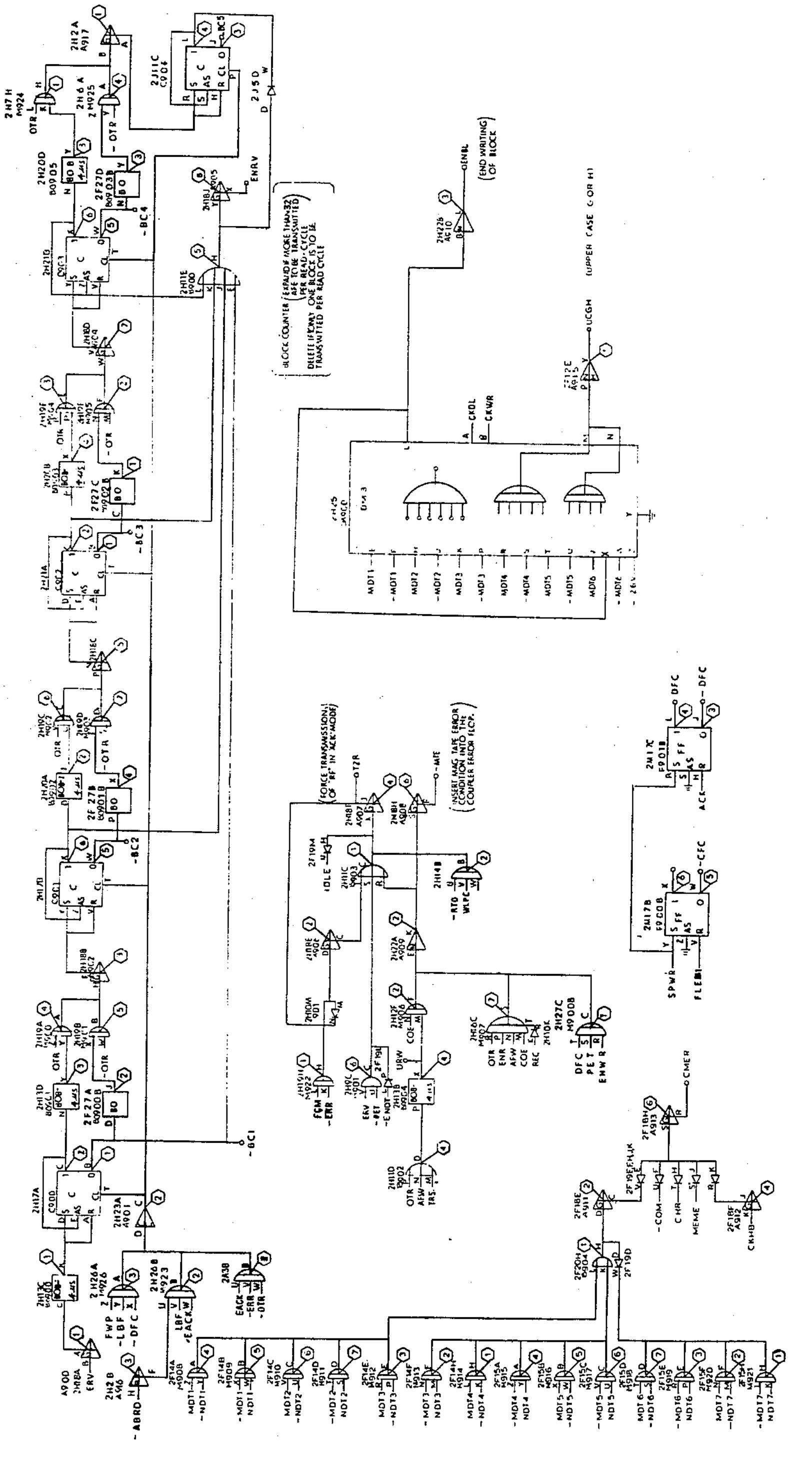
Figure 20:
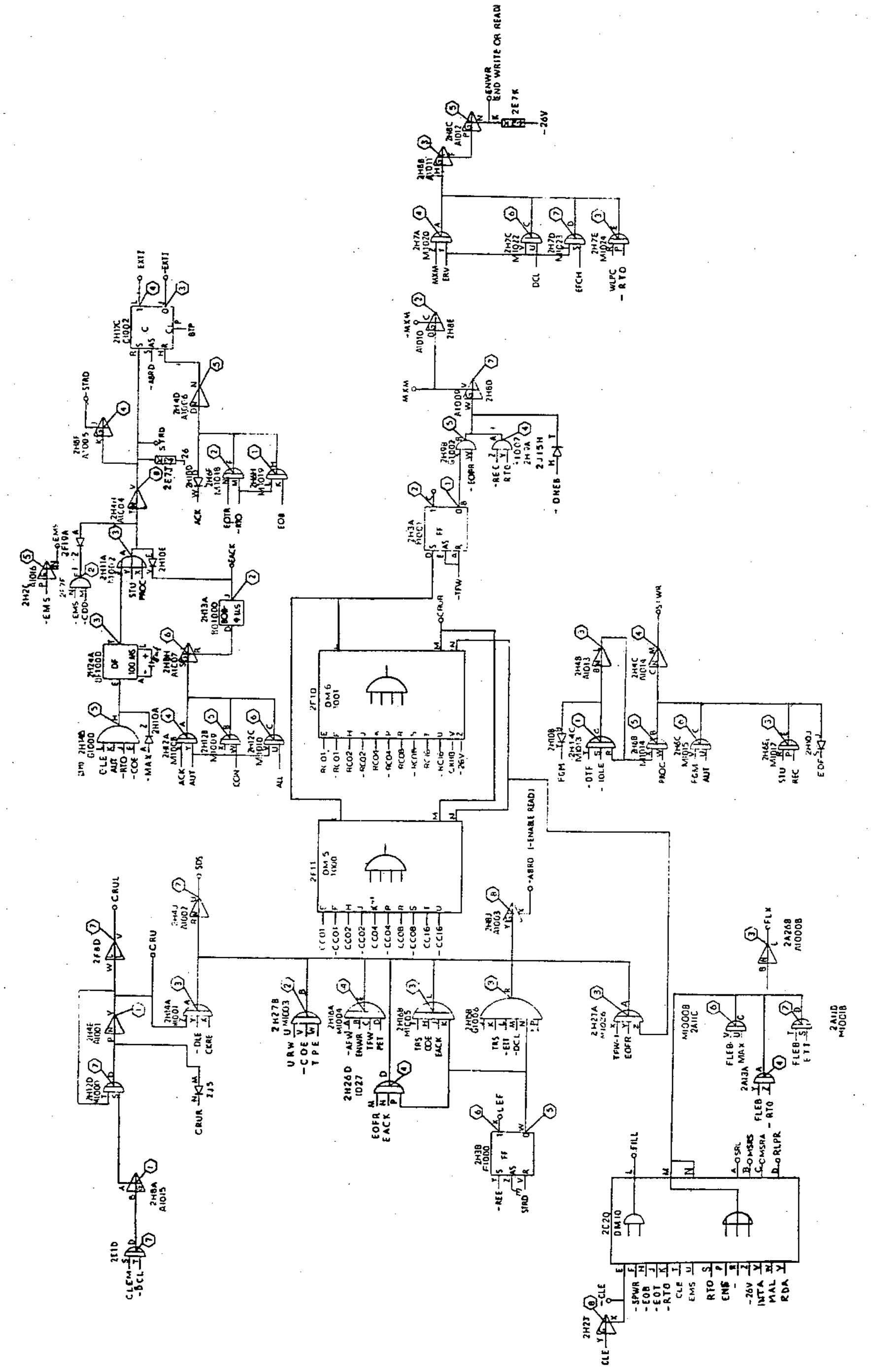
Figure 21:
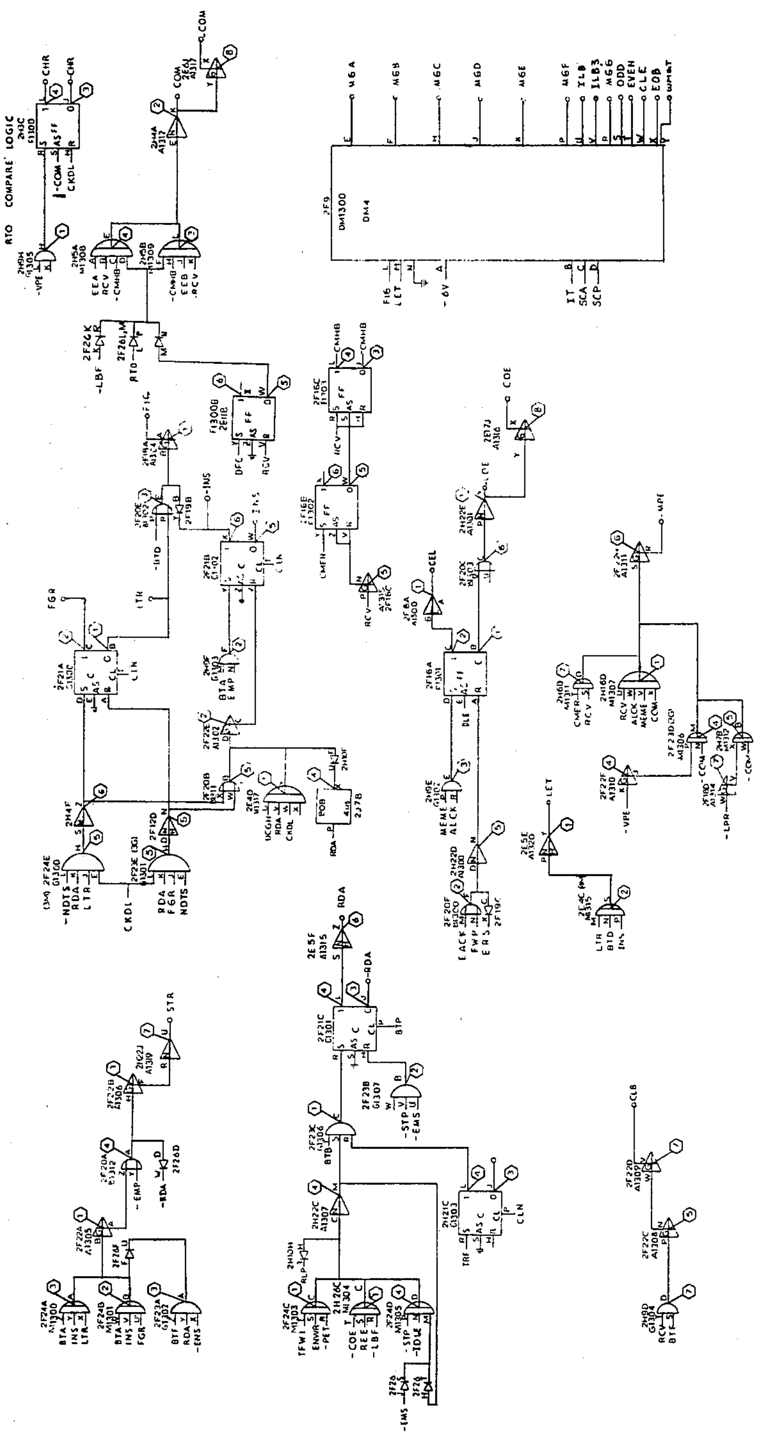
Figure 22:
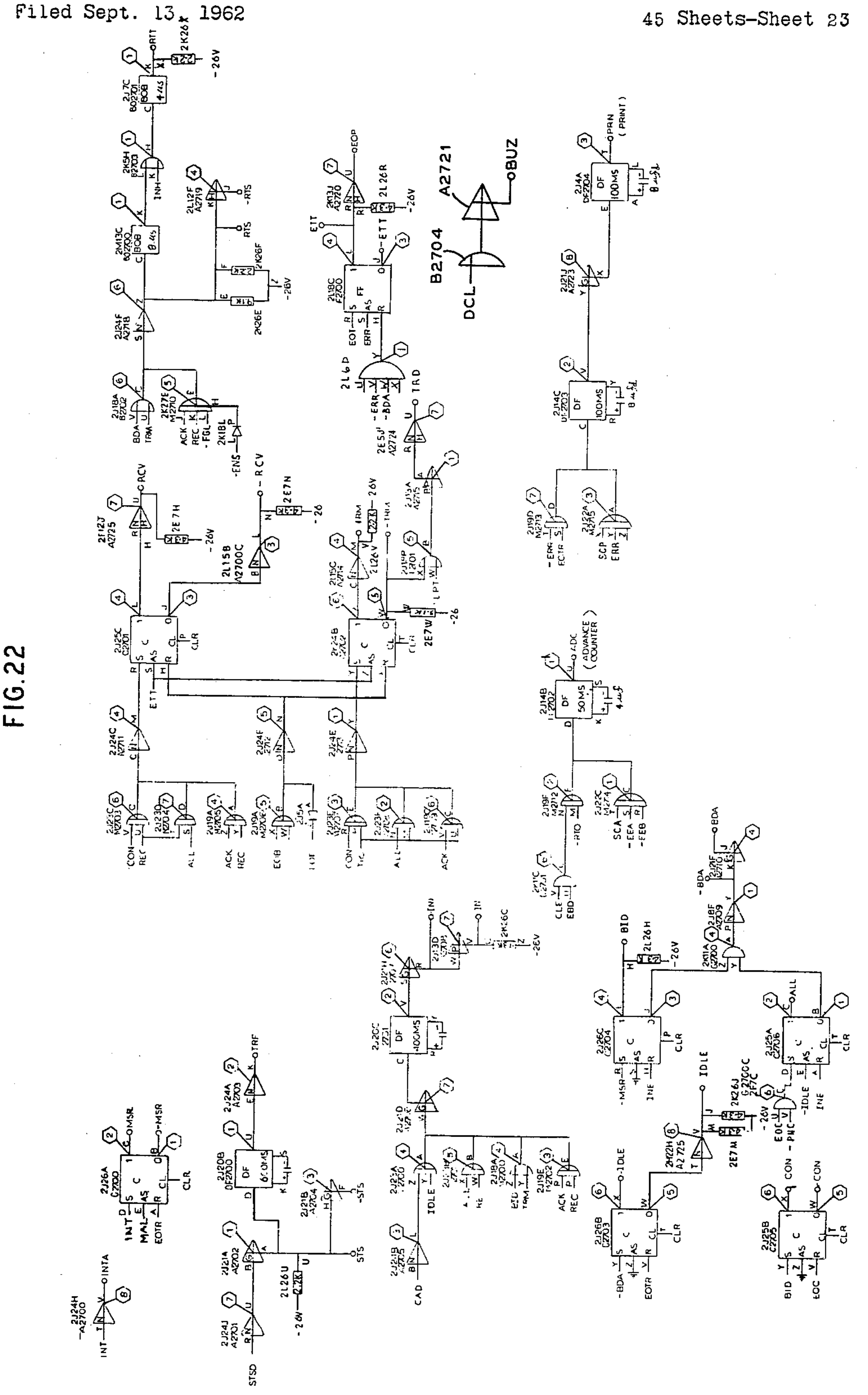
Figure 23:
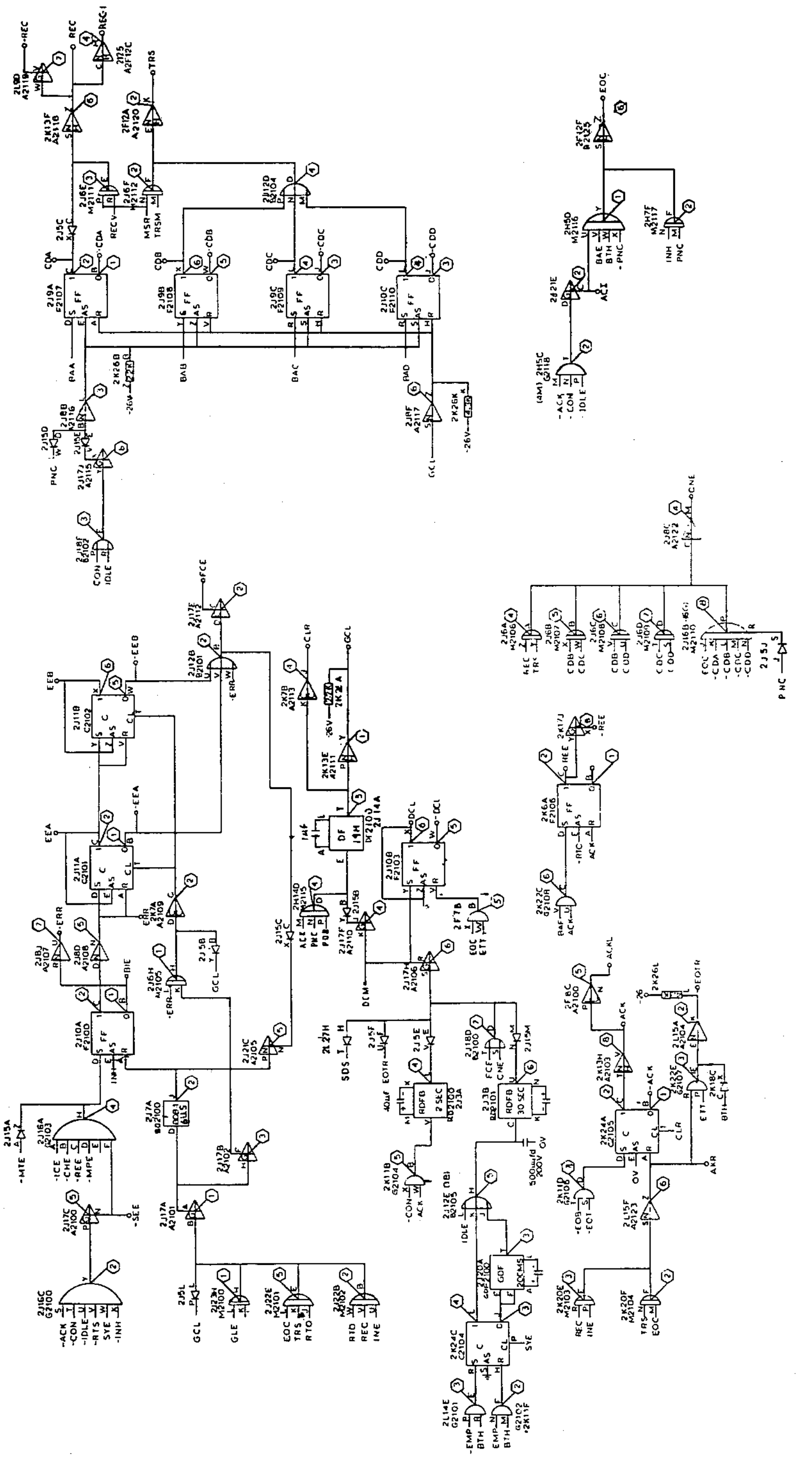
Figure 24:
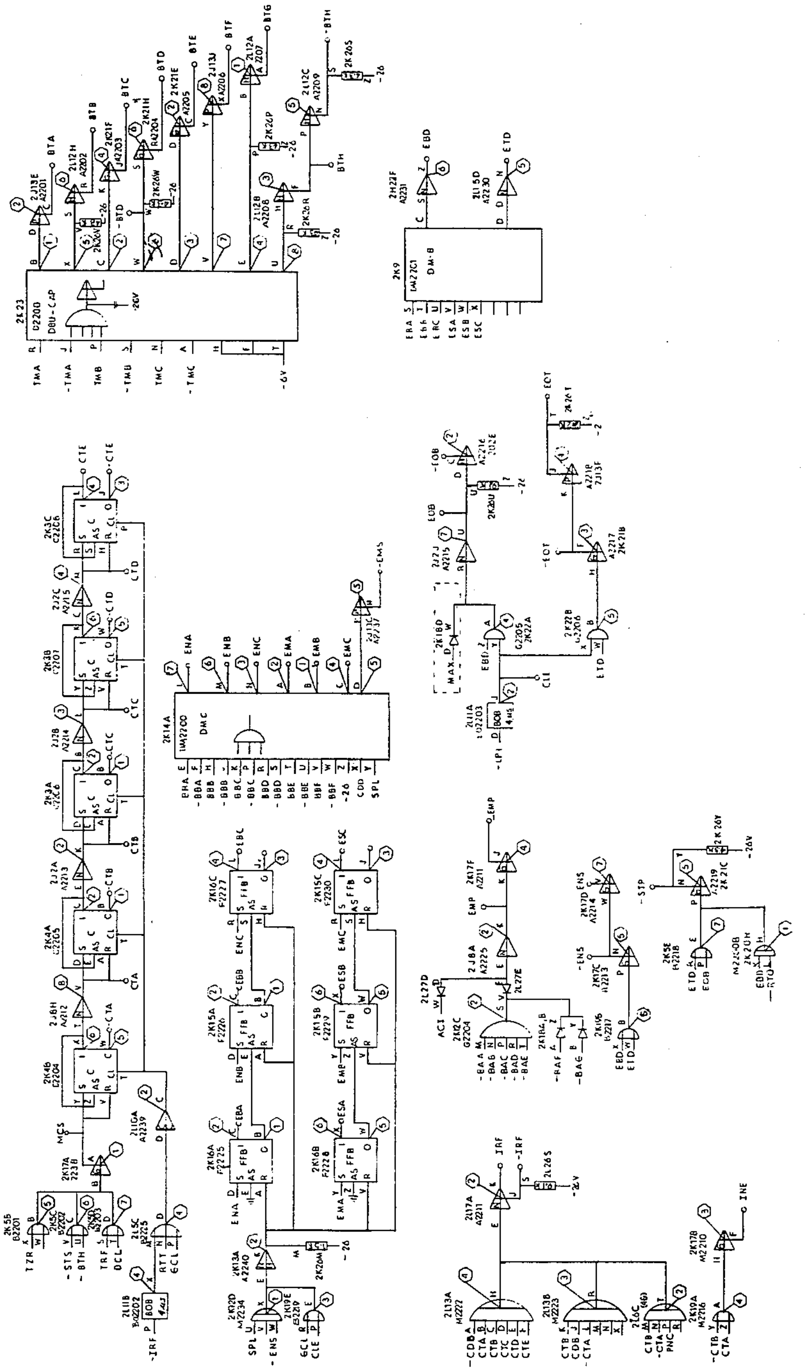
Figure 25:
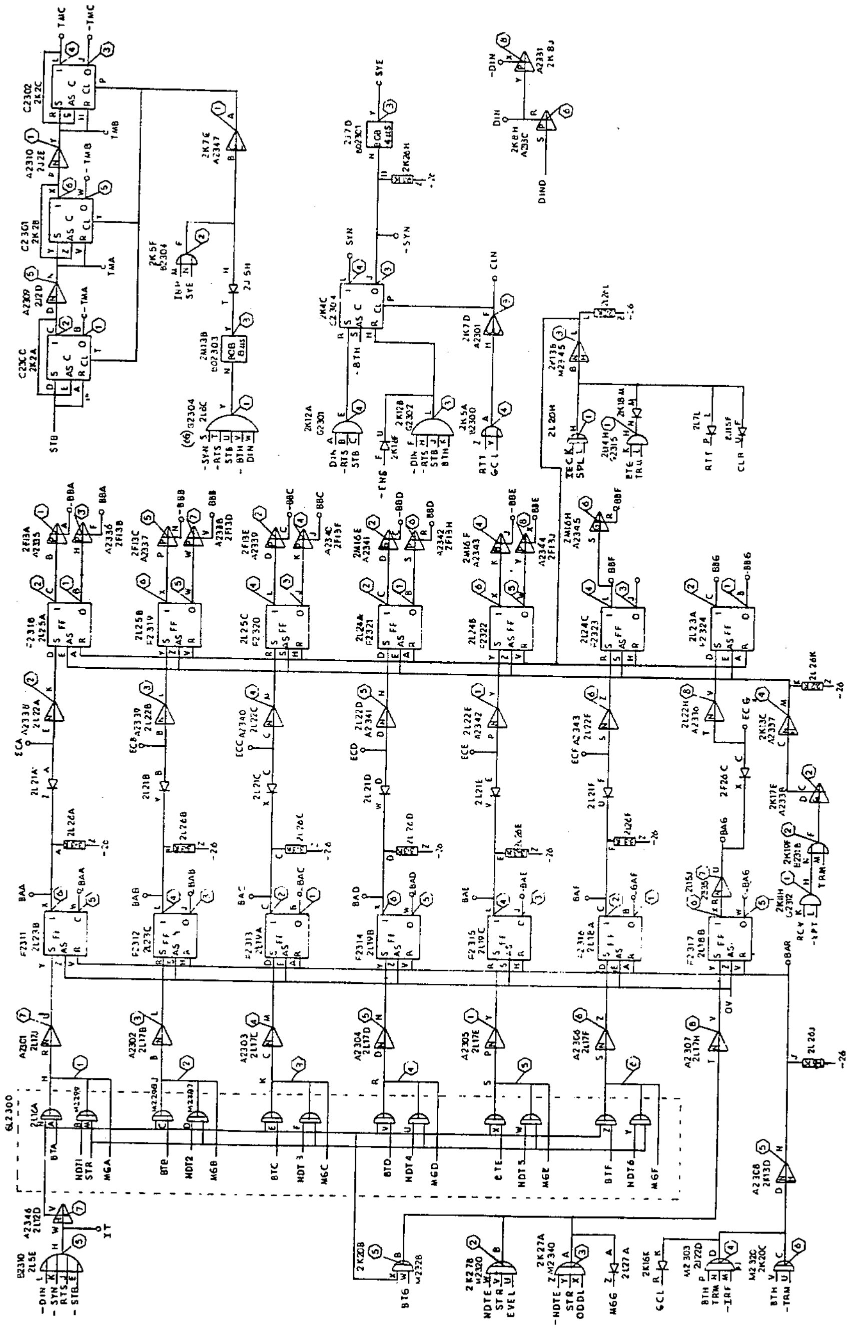
Figure 26:
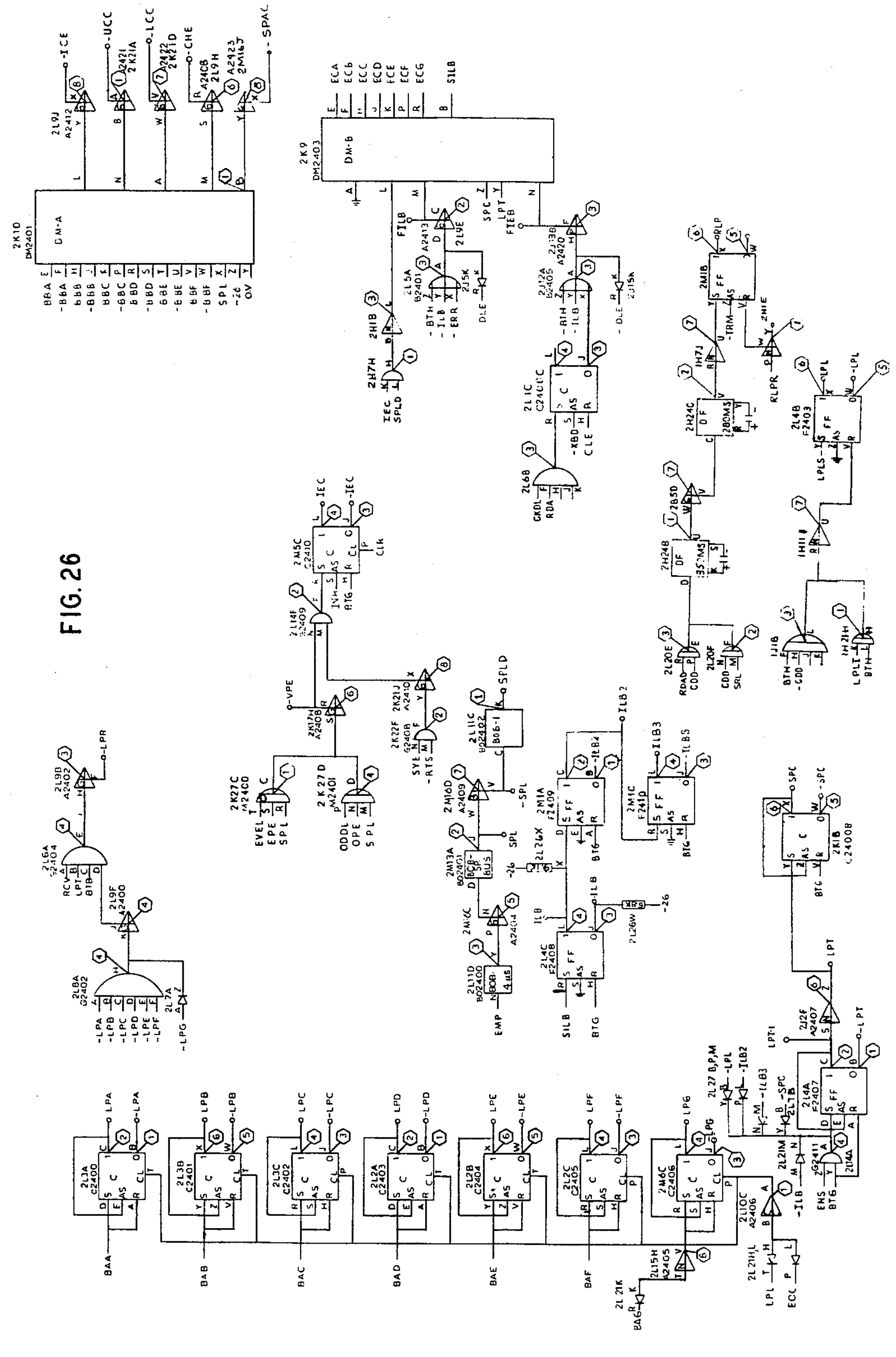
Figure 27:
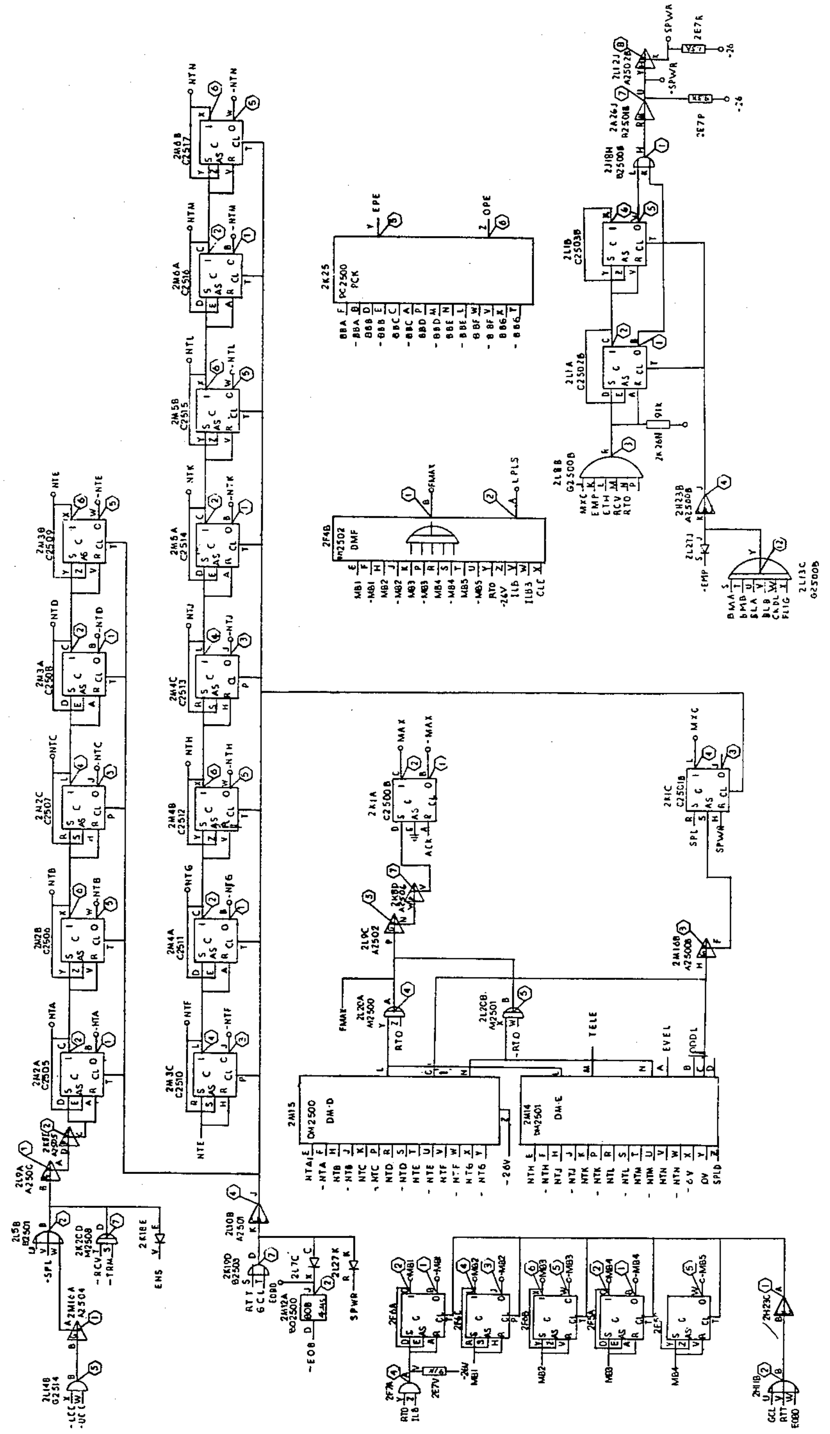
Figure 28:
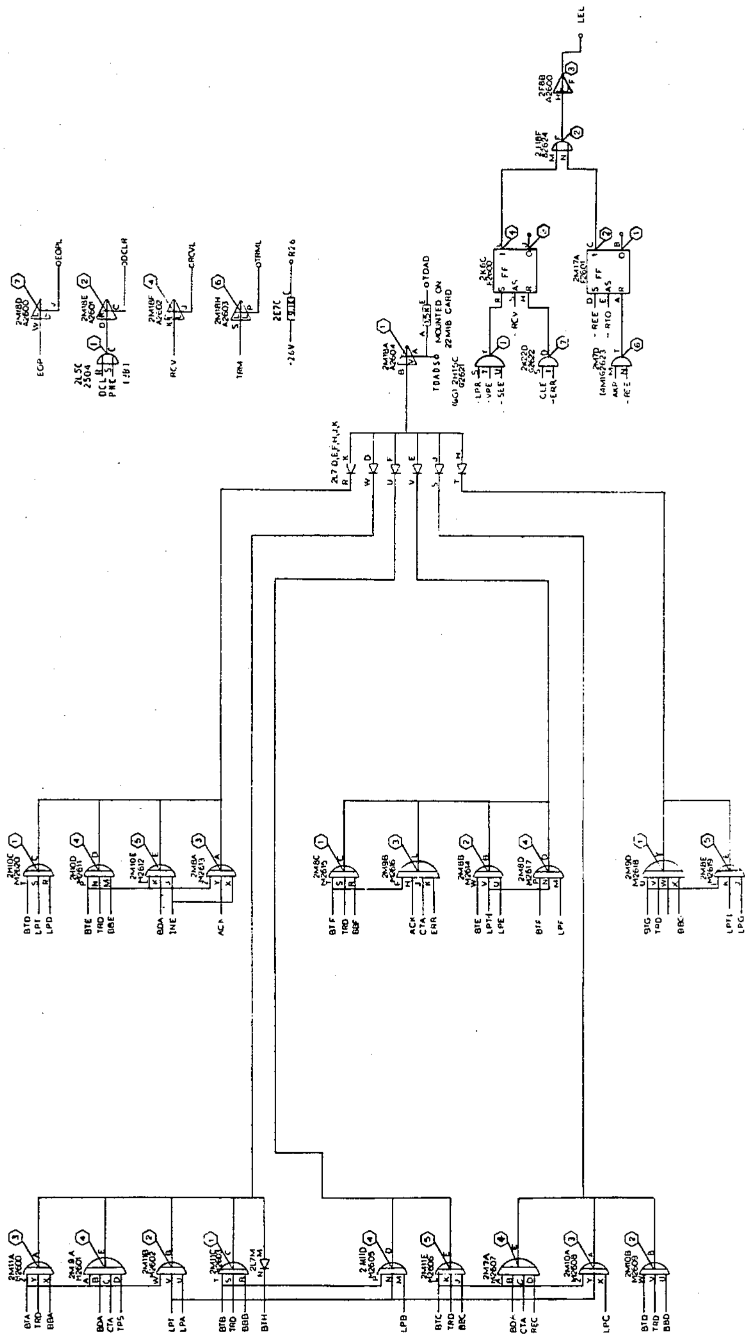
Figure 29:
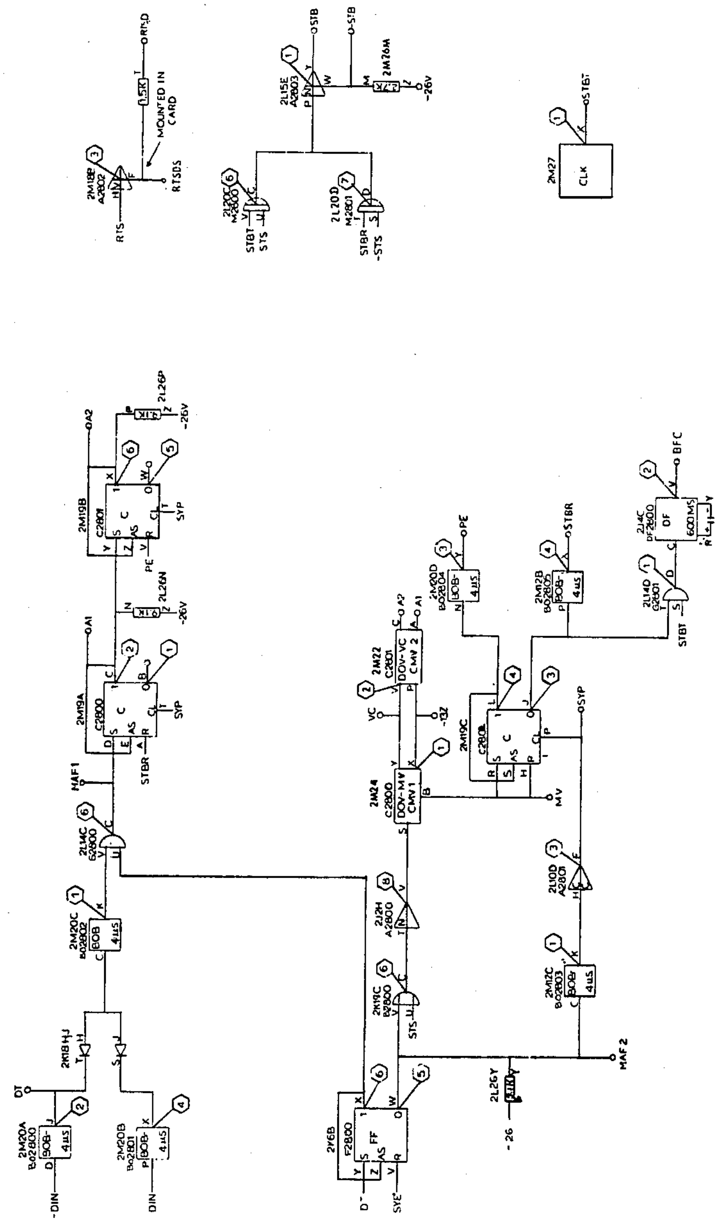
Figure 30:
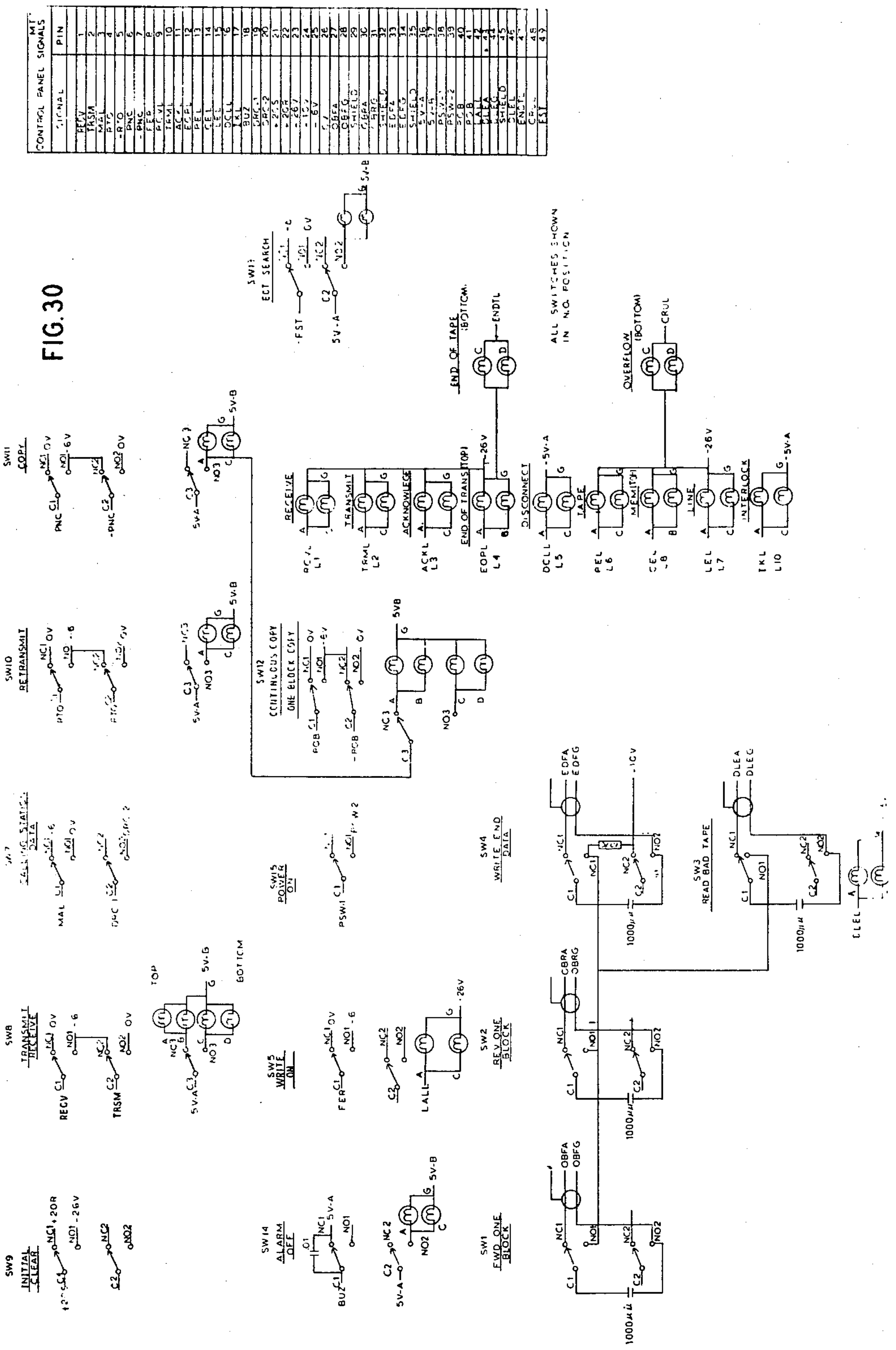
Figure 31:
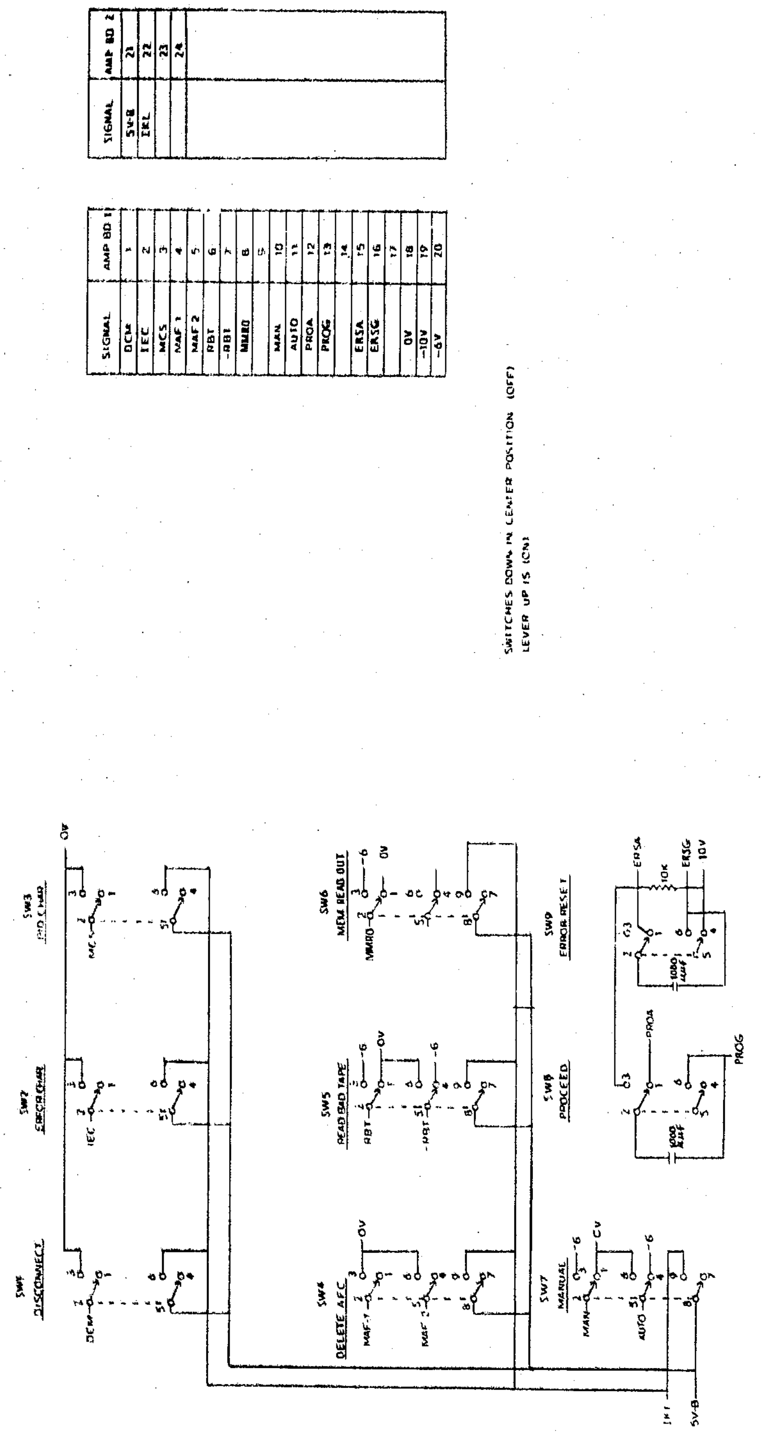
Figure 32:
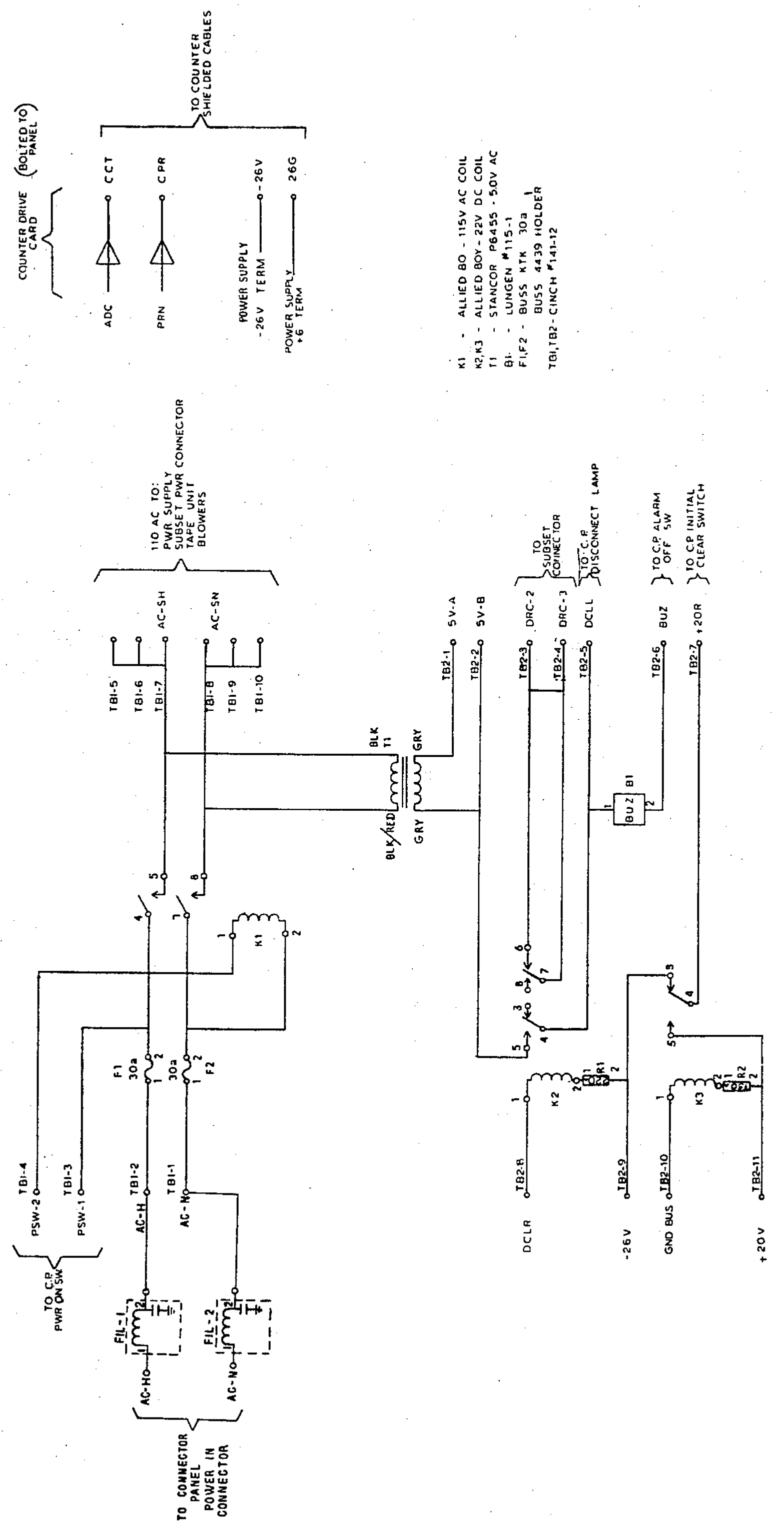
Figure 33:
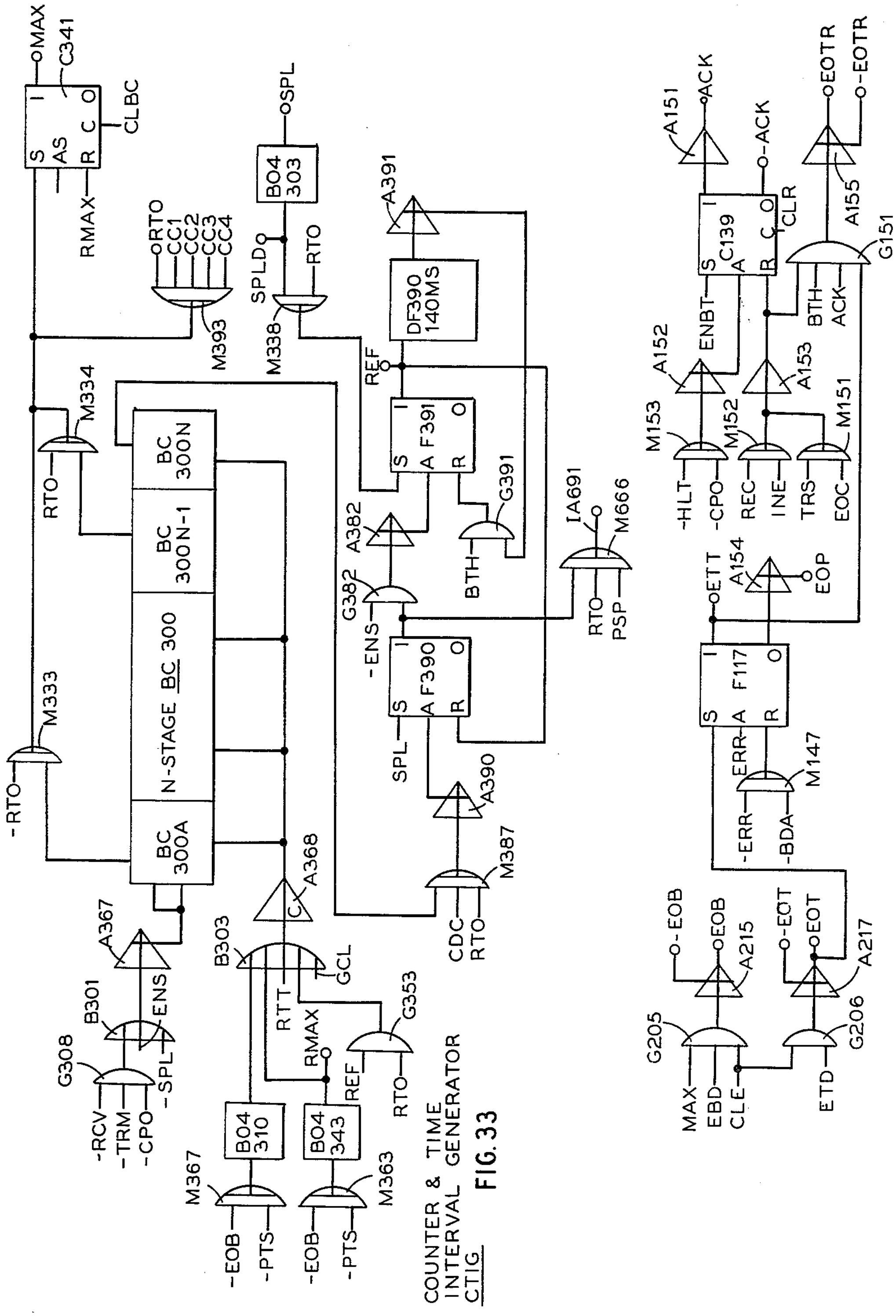
Figures 34A, 34B, 35A, 35B, 36A, 36B, 37A:
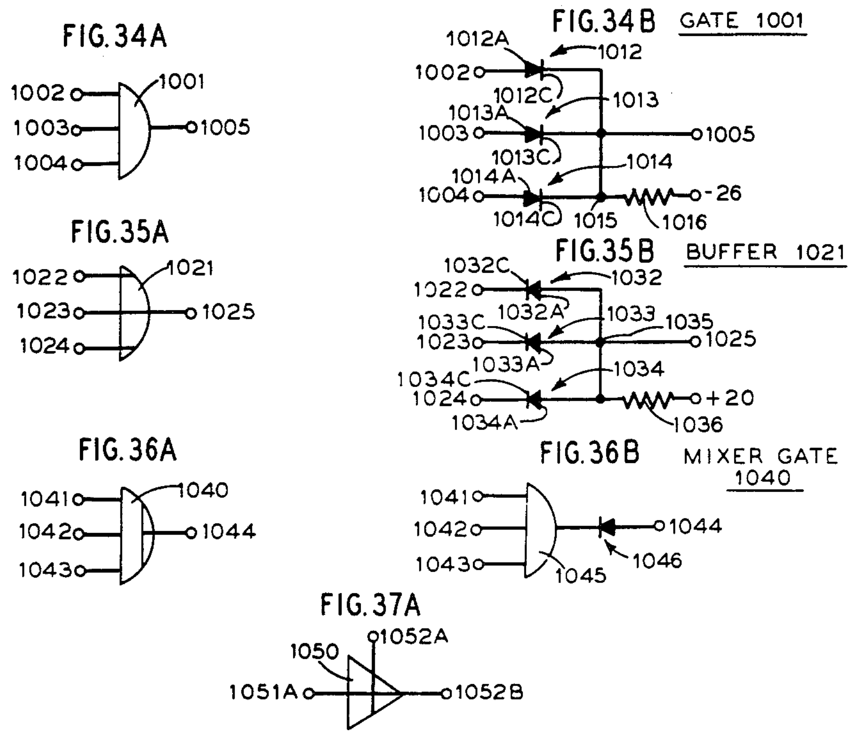
Figure 37B:
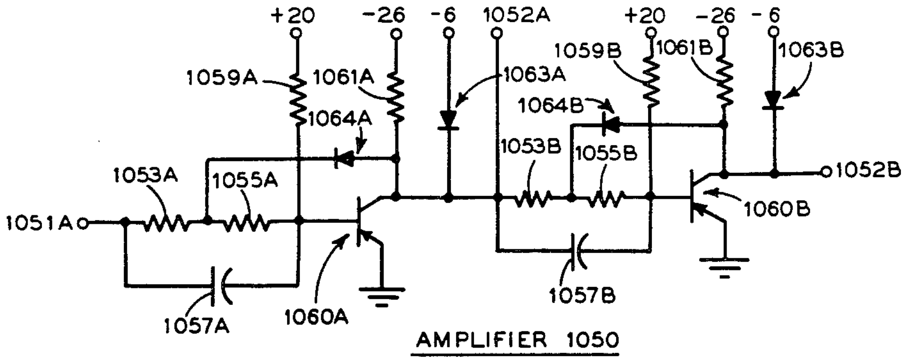
Figure 38A:
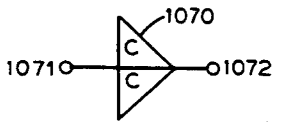
Figure 38B:
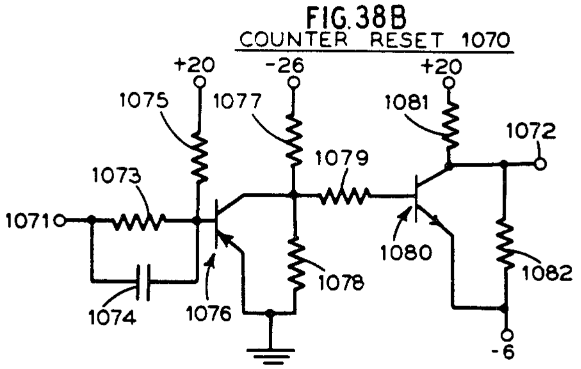
Figure 39A:
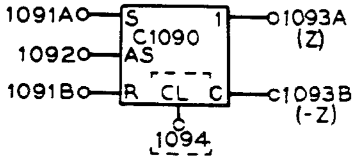
Figure 39B:
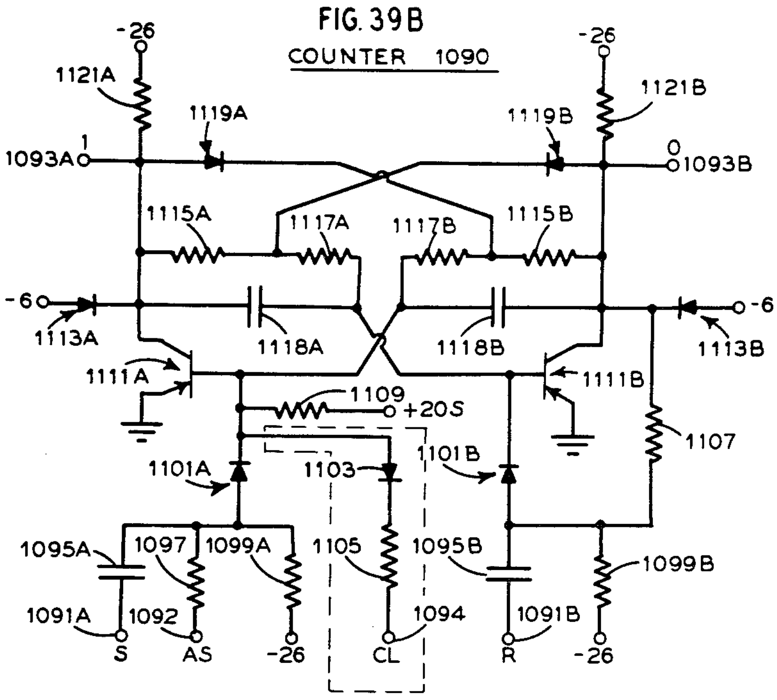
Figure 42B:
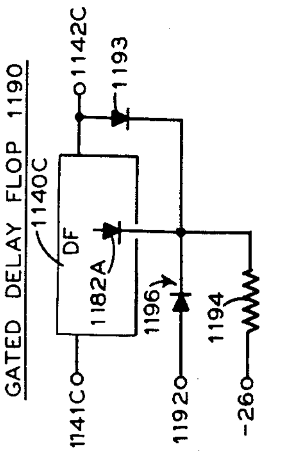
Figure 42A:
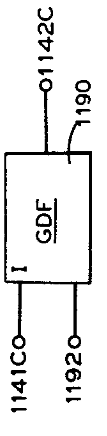
Figures 43A, 43B:
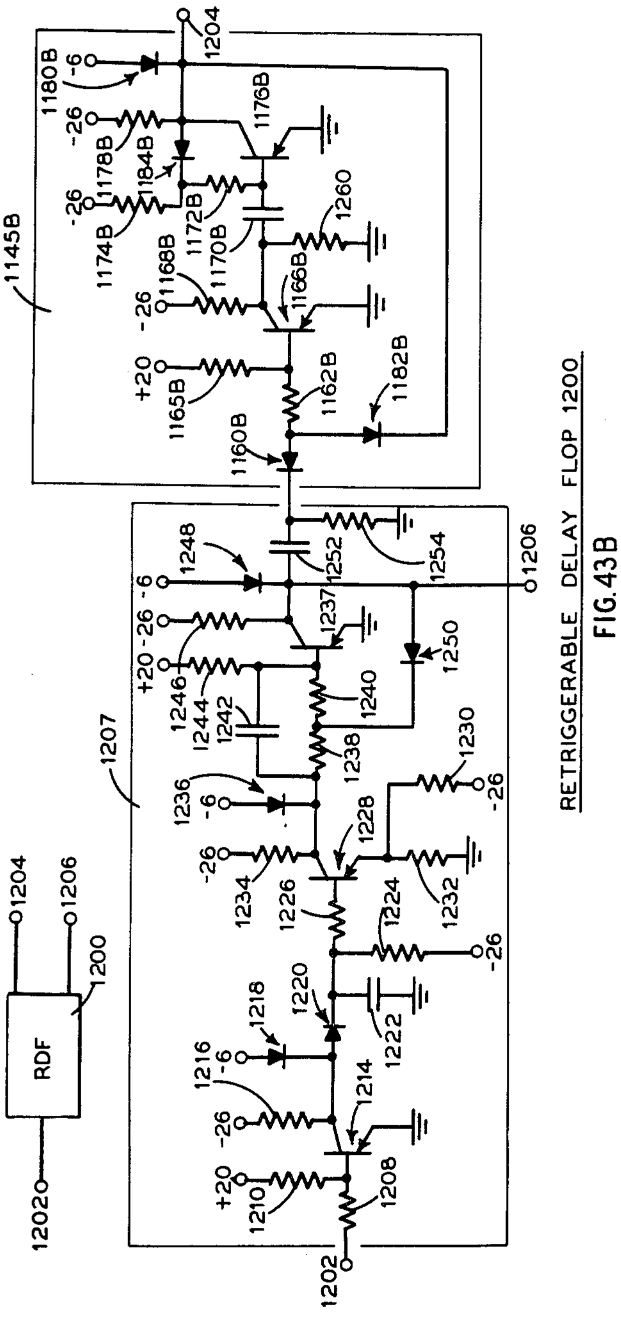
Figure 44B:
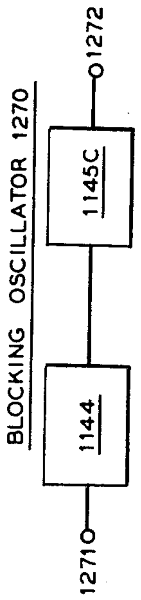
Figure 44A:
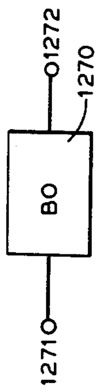
Figure 45A:
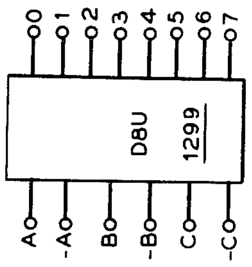
Figure 45B:
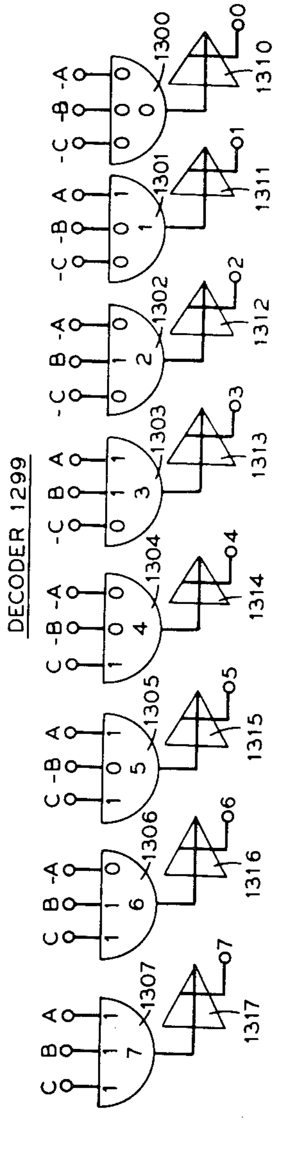
Figure 46B:
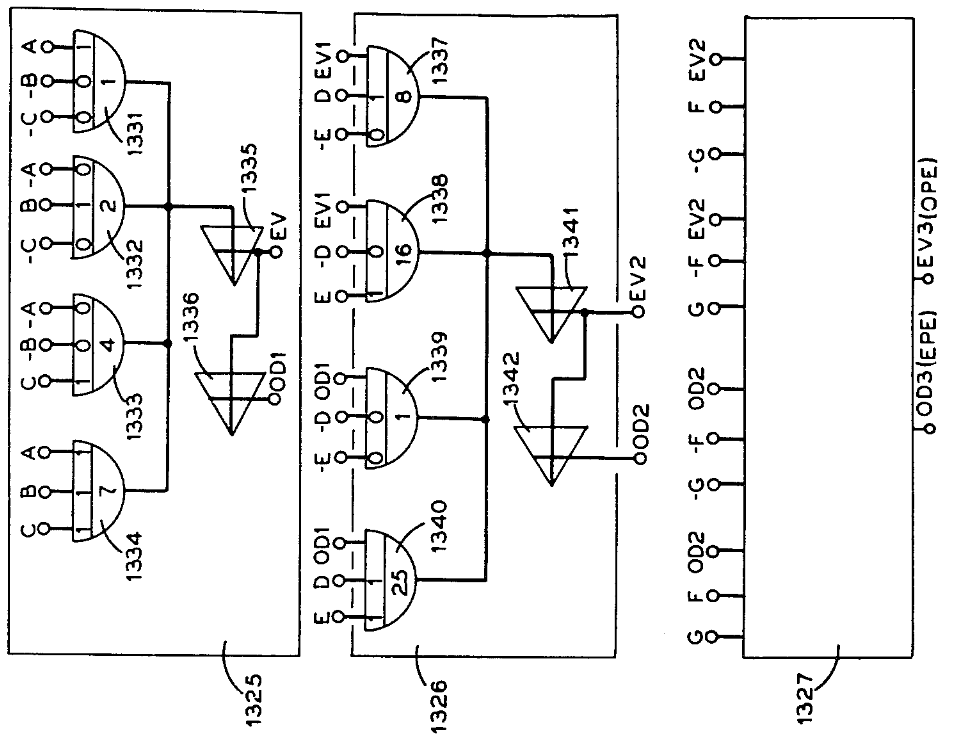
Figure 46A:
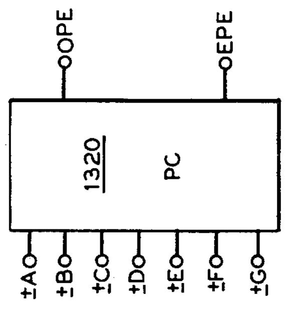
Figure 47B:
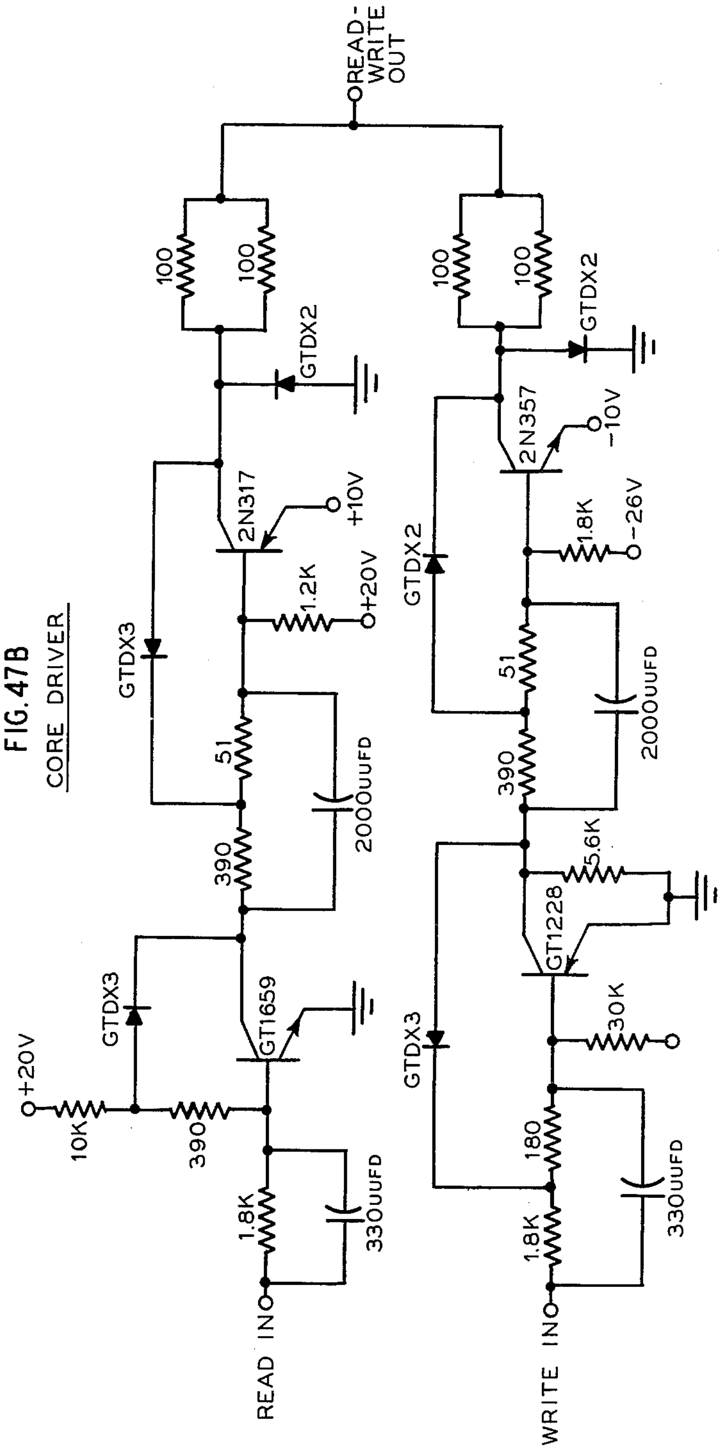
Figure 47A:
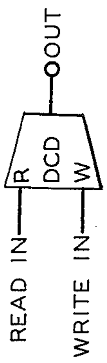
Figure 48:
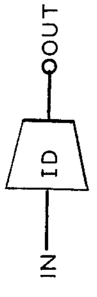
Figure 49B:
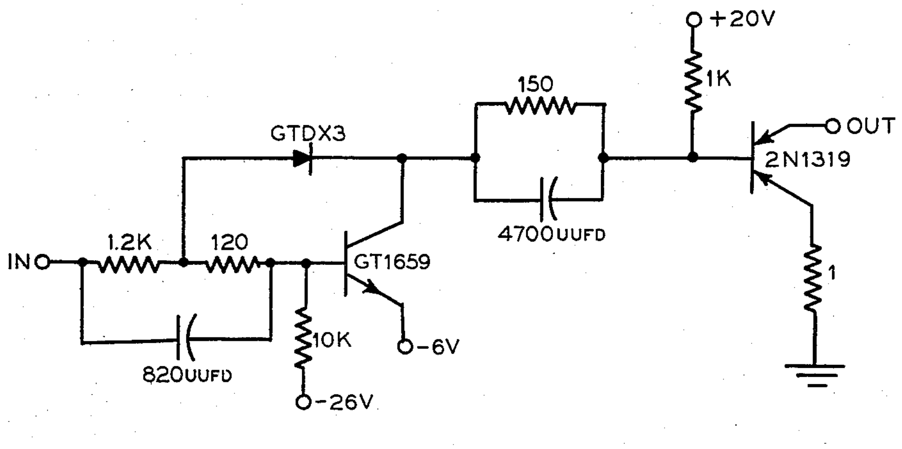
Figure 49A:
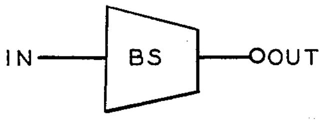
Figures 50A, 50B, 51A, 51B:
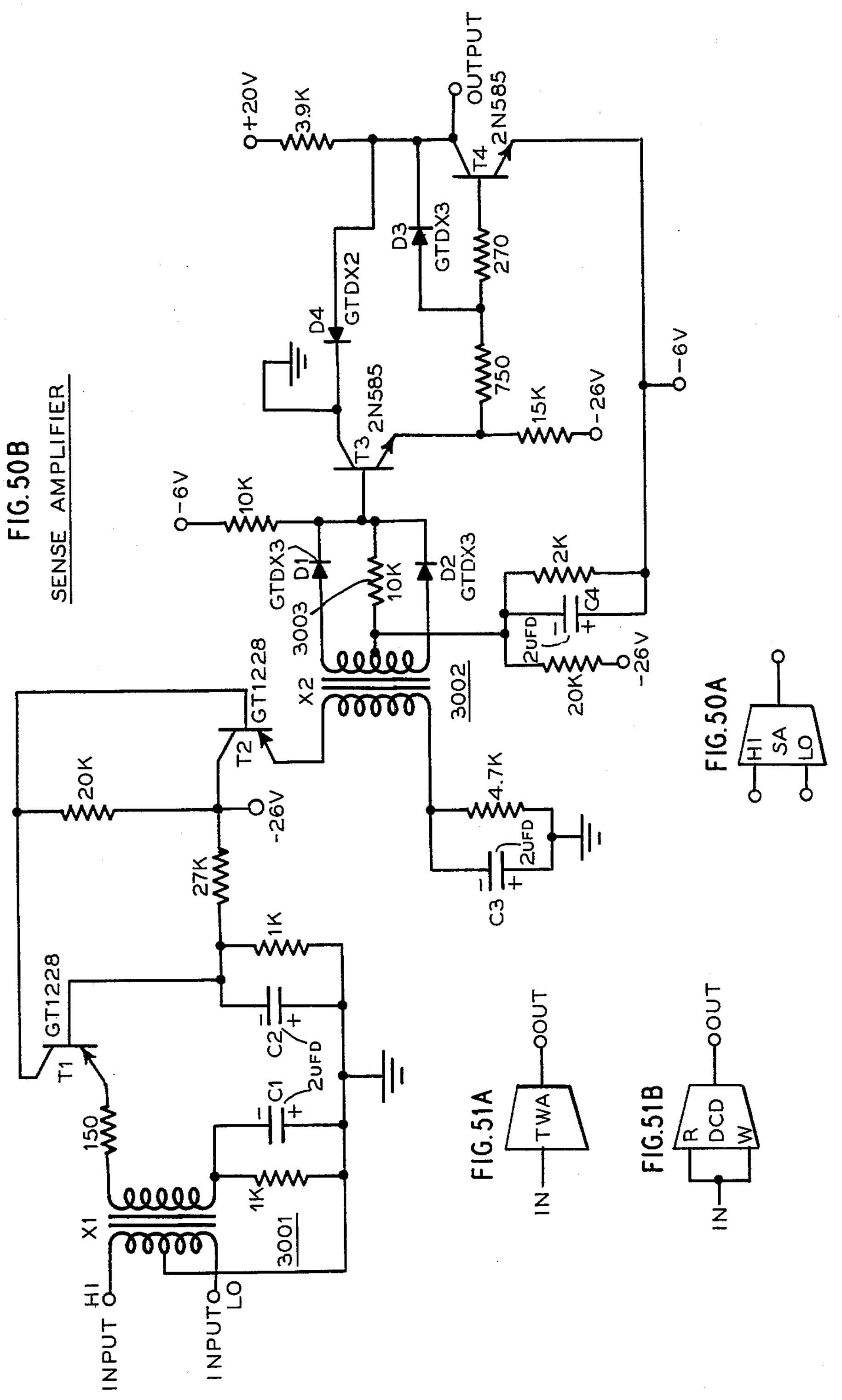
Figures 52A, 52B:
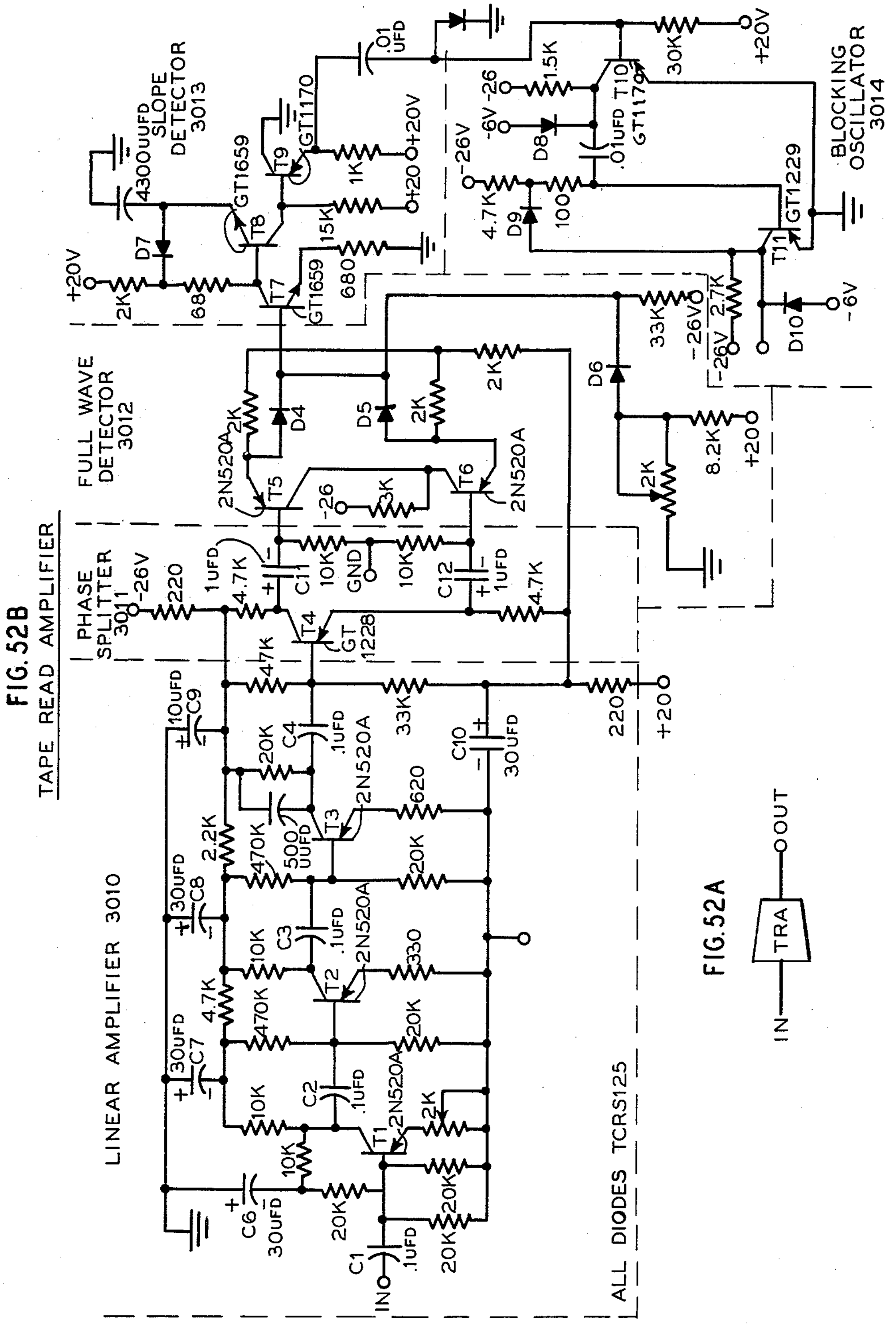
Figure 53:
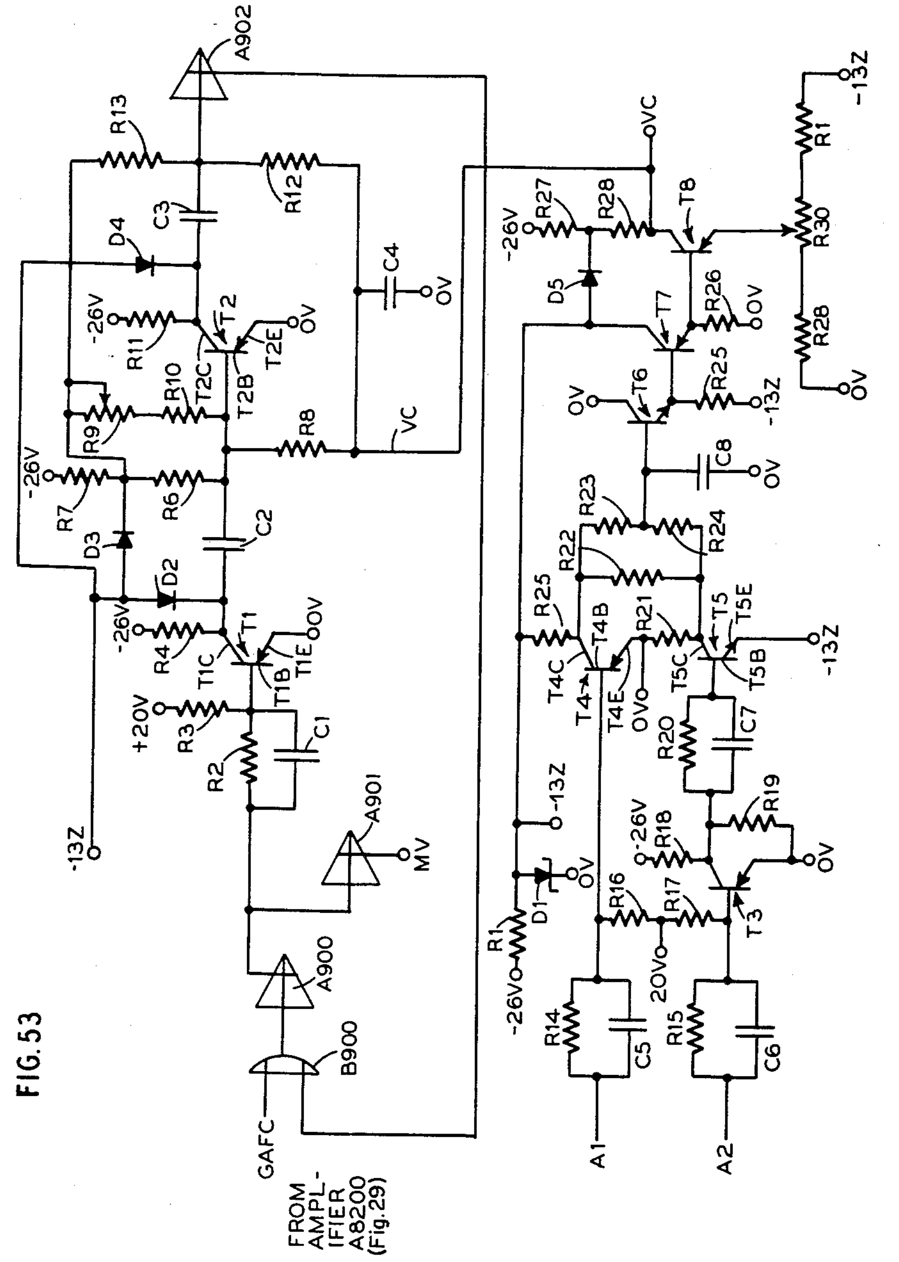

FIGURES 3 to 8 comprise the components of the magnetic tape system MTS of the master station, and in particular, FIGURE 3*a* shows schematically the magnetic tape in the magnetic tape unit;

FIGURE 3*b* shows diagrammatically a pair of read and write heads disposed opposite a portion of magnetic tape;

FIGURE 3*c* shows the read and write amplifiers connected to the read and write heads respectively of the magnetic tape;

FIGURE 4 shows logically tape store-1;

FIGURE 5 shows in logical units the tape store-2;

FIGURE 6 shows a logic diagram of a longitudinal parity accumulator;

FIGURE 7 shows in logical symbols the tape output unit;

FIGURE 8 shows the manual control unit for the magnetic tape system;

FIGURES 9 to 12 show the elements of the translator XLT and in particular,

FIGURE 9 is the logical representation of the decoder matrix;

FIGURE 10 shows the decoder amplifiers;

FIGURE 11 shows encoder-1;

FIGURE 12 shows encoder-2 of the translator;

FIGURES 13 to 16 show the elements of the memory MEM wherein;

FIGURE 13*a* shows symbolically a portion of the magnetic core storage;

FIGURE 13*b* shows one element of the magnetic core storage;

FIGURE 13*c* shows the row and column drivers of the magnetic core storage;

FIGURE 14 is a logical diagram of the memory addressing circuits;

FIGURE 15 shows the memory circuits;

FIGURE 16 shows in logical form the memory data control;

FIGURES 17 to 21 show the elements of the control KON;

FIGURE 17 shows logically tape controls-1;

FIGURE 18 shows in logical blocks tape control-2;

FIGURE 19 shows a logical diagram of a block counter;

FIGURE 20 shows in logical form data control-1;

FIGURE 21 shows the logic diagram of the data control-2;

FIGURES 22 to 33 show the elements of coupler DV wherein:

FIGURE 22 shows logically coupler controls-1;

FIGURE 23 shows logically coupler controls-2;

FIGURE 24 shows logically coupler controls-3;

FIGURE 25 shows logically the A and B buffers;

FIGURE 26 shows logically the parity circuits;

FIGURE 27 shows in logic form the character counter;

FIGURE 28 shows in logical diagram the serializer;

FIGURE 29 shows logically the synchronizer;

FIGURE 30 is the control panel;

FIGURE 31 is the maintainance panel;

FIGURE 32 is the relay panel;

FIGURE 33 is counter and time interval generator CTIG of slave station SS of FIGURE 2;

FIGURES 34A and 34B show respectively the logical symbol and the schematic diagram for a gate;

FIGURES 35A and 35B show respectively the logical symbol and the schematic diagram for a buffer;

FIGURES 36A and 36B show in logical symbols a mixer gate;

FIGURES 37A and 37B show respectively the logical symbol and the schematic diagram for an amplifier;

FIGURES 38A and 38B show the logical symbol and the schematic diagram for a counter clear amplifier;

FIGURES 39A and 39B show the logical and schematic diagrams respectively of a counter employed throughout the system. (When the portions thereof within the dotted lines are deleted, the element is termed a flip-flop);

FIGURES 40A and 40B show the logical symbols for a two stage binary counter;

FIGURES 41A and 41B show the logical symbol and the schematic diagram for a representation delay-flop;

FIGURES 42A and 42B show the symbols for a gated delay-flop;

FIGURES 43A and 43B show the logical symbols and schematic diagram for a retriggerable delay-flop;

FIGURES 44A and 44B show by means of logical symbols a "blocking oscillator" of the system;

FIGURES 45A and 45B show the block symbol and the logical details of a decoder of the system; and FIGURES 46A and 46B show the symbol and the logical elements of a parity checker employed by the system;

FIGURES 47A and 47B show the logical symbol and schematic diagram for a core driver;

FIGURE 48 shows the logical symbol for an Inhibit Driver;

FIGURES 49A and 49B show the logic symbol and schematic for a bilateral switch;

FIGURES 50A and 50B show the logical block and schematic for a sense amplifier;

FIGURES 51A and 51B show the logical symbol and schematic for a tape writing amplifier;

FIGURES 52A and 52B show the logic block and schematic for a tape reading amplifier;

FIGURE 53 shows a schematic diagram for the controlled multivibrator.

TABLE OF CONTENTS

| Title | Figure | Column |
|---|---|---|
| General Structure of Information | | 7 |
| Overall System | 1 | 9 |
| Long Block System | 2 | 20 |
| Detailed Description of the Elements of the Magnetic Tape System MTS | | 20 |
| Magnetic Tape Unit | 3 | 21 |
| Tape Store-1 | 4 | 21 |
| Tape Store-2 | 5 | 21 |
| Longitudinal Parity Accumulator | 6 | 22 |
| Tape Output Unit | 7 | 22 |
| Manual Control Unit | 8 | 22 |
| Detailed Description of the Elements of the Translator XLT | | 23 |
| Decoder Matrix | 9 | 23 |
| Decoder Amplifiers | 10 | 23 |
| Encoder-1 | 11 | 24 |
| Encoder-2 | 12 | 24 |
| Detailed Description of the Elements of the Memory MEM | | 24 |
| Magnetic Core Storage | 13 | 24 |
| Memory Addressing Circuits | 14 | 25 |
| Memory Circuits | 15 | 25 |
| Memory Data Control | 16 | 26 |
| Detailed Description of the Elements of the Control KON | | 27 |
| Tape Control-1 | 17 | 27 |
| Tape Control-2 | 18 | 27 |
| Block Counter | 19 | 30 |
| Data Control-1 | 20 | 31 |
| Data Control-2 | 21 | 32 |
| Detailed Description of the Elements of the Coupler DV | | 33 |
| Coupler Controls-1 | 22 | 33 |
| Coupler Controls-2 | 23 | 35 |
| Coupler Controls-3 | 24 | 39 |
| A and B Buffers | 25 | 41 |
| Parity Circuits | 26 | 44 |
| Character Counter | 27 | 46 |
| Serializer | 28 | 47 |
| Synchronizer | 29 | 48 |
| Control Panel | 30 | 49 |
| Maintenance Panel | 31 | 50 |
| Relay Panel | 32 | 50 |
| Detailed Description of Elements of the Slave Station SS' | | 50 |
| Control and Time Interval Generator | 33 | 51 |
| Appendix: | | |
| Tape Drive | | 52 |
| Mechanical Counter | | 53 |
| Transceiver DF | | 53 |
| Description of Symbols | | 53 |
| Gate | 34 | 54 |
| Buffer | 35 | 55 |
| Mixer Gate | 36 | 56 |
| Amplifier | 37 | 56 |
| Counter Clear Amplifier | 38 | 57 |
| Counter | 39 | 58 |
| Binary Counter | 40 | 60 |
| Monostable Multivibrator Type Circuits | | 61 |
| Delay-Flop | 41 | 61 |
| Gated Delay-Flop | 42 | 63 |
| Retriggerable Delay-Flop | 43 | 63 |
| Blocking Oscillator | 44 | 65 |
| Decoder | 45 | 65 |
| Parity Checker | 46 | 66 |
| Core Driver | 47 | 68 |
| Inhibit Driver | 48 | 68 |
| Bilateral Switch | 49 | 69 |
| Sense Amplifier | 50 | 69 |
| Tape Writing Amplifier | 51 | 70 |
| Tape Reading Amplifier | 52 | 70 |
| Controlled Multivibrator | 53 | 71 |
| Signal List | | 74 |

GENERAL STRUCTURE OF INFORMATION

The information, throughout the system, is represented by binary units or bits, conveniently indicated by one (1) and zero (0). In different portions of the system the indicia representing the bits is different. For example, when the information is recorded on paper tape, a binary one is indicated by the persence of a hole and a binary zero by the absence of a hole. When the information is recorded on magnetic tape a binary one is represented by one direction of magnetization and a binary zero by an opposite direction. In the couplers a binary one is indicated by a negative voltage, generally by minus six volts; and a binary zero is represented by the absence of a negative voltage, generally, zero volts. In the telephone line connector and over the telephone lines, a binary one is represented by a first frequency signal, generally twenty-two hundred cycles per second and a binary zero is represented by a second frequency signal, generally twelve hundred cycles per second.

The binary units are in coded combinations which are called characters. Generally a coded combination of eight binary units represents the basic character. However, the characters may be represented by a seven bit combination which is transferred bits-in-parallel, characters-in-series or by a five bit combination, which is transmitted bits-in-parallel, characters-in-series. On magnetic tape a coded combination of seven bits represent the characters. In a seven bit code, the six least significant bits represent information and the most significant bit represents parity. In a five bit code, the five bits represent information. Associated with each character on the paper tape, it is a sprocket hole.

In the telephone equipment, the characters comprise coded combinations of eight bits which are transmitted serially. The six least significant bits represent a unique character; the most significant bit, which is always a binary one, is in a sense a synchronizing bit, and the second most significant bit is a parity bit. Within the couplers which connect the paper tape devices to the telephone equipment, the characters are converted between bits-in-parallel representation and bits-in-series representation. The direction of conversion will depend on the direction of character flow. If the characters are flowing from a magnetic tape device to the telephone equipment, the bits-in-parallel representation of the characters will be converted to a bits-in-series representation, and vice versa.

The characters are grouped into units of varying length which are called records. The records are grouped into units of variable integral numbers of records called blocks. The entire number of characters or blocks transmitted at one time will be considered as a message.

Generally, the characters will be numeric characters or numbers, alphabetic characters or letters, punctuation characters, and control characters. The coded combinations of bits representing the numbers, letters and punctuation characters may be according to any currently available codes such as Teletype code, Univac code, IBM code, etc. The control characters are unique combinations of bits which occur at particular times during the message to activate particular control operations in the couplers.

The control characters can be divided into two classes: those preceding, not associated with, the actual transmission of data (mode characters) and those incorporated in the transmitted data (format characters). The mode characters are generally transmitted at the start of transmission and in the intervals between the transmission of blocks. The format characters are generally part of the records that are transmitted. Table 1 summarizes the mode characters. It should be noted that the least significant bit is on the right and during bits-in-series transmission occurs first in time.

*Table 1*

| | |
|---|---|
| Reference character | 10000000 |
| Receive information | 10000001 |
| Transmit information at 100 c.p.s. | 10000010 |
| Transmit information at 150 c.p.s. | 10000100 |
| The output device will be a punched card unit | 10001000 |
| End of Mode | 10010000 |
| Error | 10100000 |

The role of these mode characters is hereinafter more fully described.

Table 2 summarizes the format characters which also have their least significant bits on the right and are considered to occur first in time.

*Table 2*

| | |
|---|---|
| End sentinel Character ENA | 1P000010 |
| End sentinel Character EMA | 1P010001 |
| Fill character | 0P111100 |
| End of Block Character | 0P111110 |
| Continuation of Block Character | 0P111101 |
| Group Mark Character | 0P111111 |

The bit represented by P will be a one or zero in accordance with the type of vertical parity employed.

A first three-character combination of the ENA and EMA characters is always present at the end of every record to indicate the end of the record. A second three-character combination of ENA and EMA is always present at the end of a message to indicate the end of the message. A typical Message on the telephone line may take the following form:

9; 8; P; Q; ENA; EMA; ENA; LP; 9; 8; . . . ; P; Q; ENA; ENA; ENA; LP; EMA; EMA; EMA.

It should be noted that the particular serial combination of characters ENA; ENA; ENA indicates the end of a record. LP is a character indicating the vertical parity of the block. The serial combination of characters EMA; EMA; EMA indicates the end of the message.

In the following set of descriptions, only the primary purpose of the signals will be discussed for the sake of clarity. In addition, only those particular units of the system that are immediately pertinent will be included in the drawings. Similarly, there will be no specific regard to the polarity of the signals and, in fact, the signal and the line carrying the signal will have the same designation.

OVERALL SYSTEM (FIGURE 1)

Figure 1:
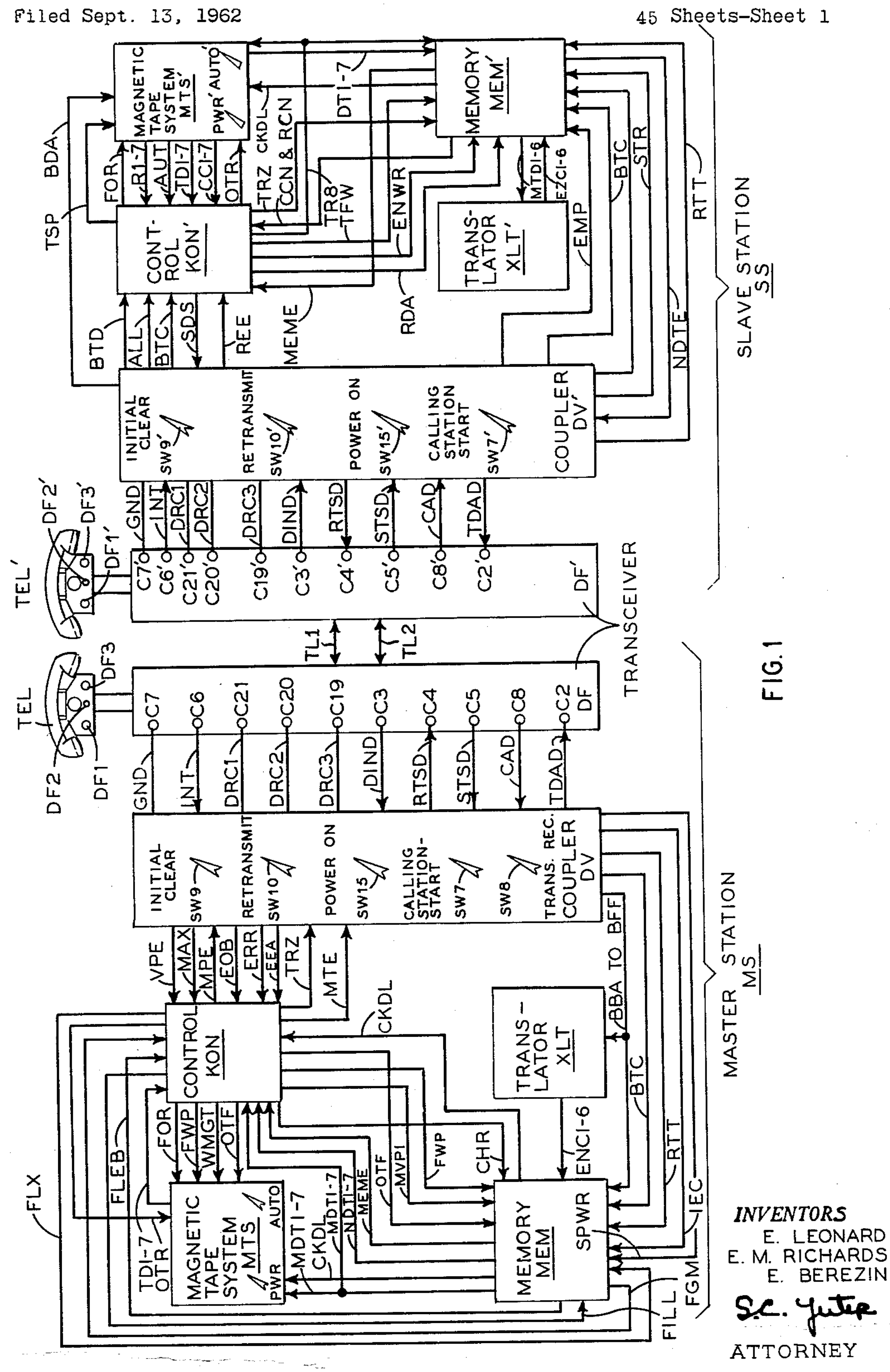
FIGURE 1 shows an overall block diagram of an information transfer system including a master station and slave station according to two aspects of the invention wherein each station includes a magnetic tape system, a translator, a control, a memory, a coupler and a transceiver.

Referring to FIGURE 1, the information transfer system according to the invention, is shown comprising a master station MS which is connected via conventional telephone lines TL1 and TL2 to a slave station SS. Master station MS and slave station SS are identical. The master station being designated as such because the connection between the stations was established there. Master station MS comprises a transceiver DF, a coupler DV, a Control KON, a magnetic tape system MTS, a memory MEM, and a translator XLT. Slave station SS comprises an identical transceiver DF′, an identical coupler DV′, an identical control KON′; an identical magnetic tape system MTS′, an identical memory MEM′; and an identical translator XLT′.

The transceiver DF is a unit which includes a conventional hand set TEL with a talk button DF1, a data button DF2 and an automatic button DF3. The transceiver DF can either transmit or receive voice communications or a frequency modulated carrier which represents bits of information via the telephone lines TL1 and TL2. The transceiver DF, a standard unit of apparatus of the American Telephone and Telegraph Company, called a Dataphone, a subset 202A, is hereinafter more fully described in the Appendix. For the present description, the following is necessary:

Information in the form of serially occurring electrical pulses is transferred from the transceiver DF via the DIND signal line to the coupler DV, and at other times, information in the form of serially occurring electrical pulses is transferred via the TDAD signal line from the coupler DV to the transceiver DF. A control signal of relatively long time duration is fed from the coupler DV via the RTSD signal line to the transceiver DF. Control signals as voltages of relatively long time duration are sent from the transceiver DF via the INT, STSD and CAD signal lines.

The lines DCR1, DCR2 and DCR3 are leads of a normally closed holding circuit in the transceiver DF which are controllably open circuited by the coupler DV.

The memory MEM is a conventional magnetic core matrix type memory and its associated input, output and addressing circuits.

The magnetic tape system MTS includes a magnetic tape transport, control circuits for activating the transport and input and output circuits for controllably transferring information to and from the magnetic heads of the transport. The transport may be, for example, an Ampex FR 4000 Digital Tape System which is hereinafter more fully described. For the immediate discussion it is only necessary to know that:

(a) There is a power switch which applies power to the system; and (b) There is an automatic switch which when depressed places the system in automatic operation.

The translator XLT is basically a group of encoding and decoding circuits which permit translation for one code at the transmitter to another code at the receiver. If, however, both stations employ the same code the translator is not required.

The control KON is a group of control circuits which time and control the flow of information between the magnetic tape system MTS, the memory MEM and the coupler DV. Control KON also includes some error detecting circuits.

The coupler DV serves as a coupling device between the transceiver DF and the magnetic tape system MTS. When the magnetic tape system MTS serves as an input device at one of the stations, the coupler DV accepts characters whose bits are in parallel and transfers these characters with their bits in series to the transceiver DF. When the coupler DV is at a receiving station, information is received bits-in-series from the transceiver DF and transmitted with the bits of the characters in parallel to the magnetic tape system MTS. There are means included in the couplers DV and DV′ to insure that the coupler which is at the receiving station is in synchronization with the coupler at the transmitting station. Furthermore, the coupler DV generates control signals, which when received by the coupler DV′ prepares it for the transmission or reception of information. Similarly, the coupler DV′ returns control signals to prepare the coupler DV for complementary functions. In other words, the couplers DV and DV′ generate control signals which prepare them for different types of information transfer modes. In addition, the coupler DV, and its mate, coupler DV′, include many error detecting and checking circuits which insure maximum reliability of information transfer and which will interrupt communication between the two stations whenever it is found that the telephone lines TL1 and TL2 are undesirable for reliable information transfer.

In the overall description of the information transfer system, it will be assumed that initially the power is applied to all units of both the master station MS and the slave station SS, and the power switch and the AUTO switch of the magnetic tape system MTS have been actuated. In addition, solely to facilitate the explanation of the system, it will be assumed that the slave station SS is to act as a transmitter whereas the master station MS is to act as a receiver. Accordingly, the switch SW8 of the coupler DV at the master station MS is placed in the receive position causing the generation of the RECV signal therein. It should be noted that it is equally convenient for the master station MS to act as a transmitter, that is, to send information to the slave station SS which acts as a receiver. Since there will be described a system which permits the retransmission of data by the slave station SS whenever an error in the data received by the master station MS is detected, the retransmit switches SW10 and SW10′ on both couplers DV and DV′ are thrown to the appropriate positions which generate the RTO signals therein.

During attended operation, the operator at the master station depresses the talk button DF1 on the transceiver DF, raises the receiver of the associated telephone TEL and dials the telephone number of the slave station SS. He also turns on power in the magnetic tape system MTS by placing the power switch to the on position and the automatic switch to the AUTO position. When the operator at the slave station SS hears the usual ringing signal he raises the receiver TEL′ which is in the talk position with the switch DF1′ depressed. At this time, the operator at the master station MS will also tell the operator at the slave station SS that he should push the initial clear button SW9′ in the coupler DV′. The operator at the slave station SS actuates the power switch and the AUTO switches of the magnetic tape system MTS′. Then the operator at the slave station SS pushes the data button DF2′ on the transceiver DF′ and leaves the receiver off the cradle of the telephone TEL′. After the operator at the master station MS hears a click when the operator at the slave station SS depresses the data button DF2′, the master station's operator presses the clear push button SW9 of the coupler DV′ places the receiver next to the telephone TEL pushes the calling station start switch SW7 of the coupler DV generating the MAL signal and the system proceeds completely independent of any further interference by either operator.

Up until this time, both the coupler DV and the coupler DV′ are in the Idle mode and generating the IDLE signals. However, when the calling station start switch SW7 is pushed, the coupler DV will enter the BID mode and the coupler DV′ remains in the Idle mode. In response to the pressing of the calling station start switch SW7 the transceiver DF sends back an interlock INT signal which cooperates with the MAL signal to generate the MSR signal that causes the coupler DV to go into the Bid mode, characterized by the BID and BDA signals. The BDA signal causes generation of the RTS, RTT and RTSD signals. The MRS signal also cooperates with the RECV signal to generate the REC signal. Coupler DV then transmits a RTSD signal via the terminal C4 to the transceiver DF which, in response to this "request to send signal" RTSD, transmits approximately two hundred milliseconds of carrier on the telephone lines TL1 and TL2 to perform echo-suppression. Following this two hundred millisecond interval, transceiver DF transmits via the terminal C5 a "start to send" signal STSD to coupler DV. For four hundred milliseconds, coupler DV transmits reference characters via the TDAD signal line to the terminal C2 of the transceiver DF. These reference characters are transmitted to the slave station SS to establish both bit synchronization and character synchronization between the coupler DV and coupler DV′. Following the reference characters, a single character is transmitted which instructs the coupler DV′ that it is to be either a transmitter or a receiver.

Following the transmission of this character, another single character, the end of mode character (see Table 1) is transmitted to the coupler DV′. When this character is generated as an INE signal therein by the coupler DV, it terminates the BID signal whose termination starts the Connect mode characterized by the CON signal. This end of mode character is received by the coupler DV′ and decoded to an EOC signal which cause it to enter the Allow mode characterized by the ALL signal. In the Connect mode the coupler DV of the master station MS will act as a receiver and the coupler DV′ of the slave station SS will act as a transmitter. This is the start of a turnaround period and the coupler DV′ sends a "request to send" signal RTSD to the transceiver DF′ which then transmits approximately two hundred milliseconds of carrier along the lines TL1 and TL2 to perform an echo-suppression operation. Following the two hundred milliseconds of echo-suppression, the transceiver DF′ sends a start to send signal STSD from the terminal C5′ to the coupler DV′ which transmits via the line TDAD to the terminal C2′ of the transceiver DF′ approximately four hundred milliseconds of reference characters so that the coupler DV′ forces the coupler DV to come into synchronization. The four hundred milliseconds of reference characters are followed by a first control character on the line TDAD which indicates whether the coupler DV is to be a transmitter or a receiver.

It should be noted that the coupler DV was initially preset to be a transmitter or a receiver. Hence, if the first control character returned does not indicate that the coupler DV is to be what it was initially set at, then the coupler DV senses a connect error for disconnecting the transceiver DF from the transceiver DF′. This is provided so that when the telephone line between the two stations is noisy or unreliable then the stations do not remain on the line and waste time and money. In such a case, the operator at the master station MS will again initiate the operation. In the case under discussion, coupler DV′ should send back a receive control character.

Following the transmission of the receive control character, coupler DV′ then transmits a second control character, the end of mode character. When the end of mode character is generated by the coupler DV′ as an INE signal which terminates the ALL signal ending the Allow mode it then assumes either the Transmit or the Receive mode in accordance with the previously received first control character which had instructed it in what role it should assume (for the present example, the Transmit mode). More particularly, the first control character received by coupler DV′ during the idle mode caused generation of the TRS signal which cooperates with termination of ALL signal at the end of the allow mode to cause generation of TRM and TRD signals characteristic of Transmit mode. Similarly, when the end of mode character is received by the coupler DV, assuming there was no connect error, coupler DV assumes the role to which it was designated in accordance with the positioning of the receiver-transmit switch SW8. If it so happens that the master station MS is to be a transmitter, then it is again necessary to initiate a turnaround period. However, for the sake of simplicity, it has been assumed that the slave station SS is to transmit information to the master station MS. Therefore, the termination of the CON signal at the end of the connect mode cooperates with the REC signal to generate the RCV characteristic of the receive mode. Since the coupler DV′ of the slave station SS has been transmitting, it is not necessary to go into this turnaround period.

When the slave station went into the allow mode coupler DV′ transmits an RTT signal to memory MEM′ to clear its addressing circuits to their initial or home position. Also when the slave station SS entered the bid mode a minus BDA signal was fed from coupler DV′ to magnetic tape system MTS′ where it cooperated with an AUTO signal generated by the AUTO switch to cause generation of an AUT signal which is fed to control KON′. At the end of the allow mode the ALL signal fed to control KON′ from the coupler DV′ cooperates with the AUT signal to cause generation of the STRD, TFW, FOR and FWP signals therein, provided a —ABRD signal (whose generation is hereinafter more fully described) is present. The TFW signal is fed to memory MEM′ to permit it to accept signals from magnetic tape system MTS′. The FOR signal is fed to magnetic tape system MTS′ causing generation of a FWD signal therein which activates the tape transport to move forward. And reading of the information on the magnetic tape begins.

As the magnetic tape moves under the heads, R1 to R7 signals are generated and fed to control KON′ to generate TSP and TR8 sprocket pulses. The R1 to R7 signals represent the seven bits of the character being read. For each combination of these signals that is read a sprocket pulse is generated. The TSP sprocket pulses are fed to the magnetic tape system MTS′ when they cooperate with the R1 to R7 signals to generate therein the TD1 to TD7, and TR1 to TR7 signals which in turn cooperate with a TR8 sprocket pulse to cause the generation of the DT1 to DT7 signals which are transmitted to memory MEM′. At the same time, the TR8 sprocket pulses are fed to memory MEM′ to generate a cycle of sequential clock pulses which cause insertion of the character represented by the DT1 to DT7 signals into a position of the memory MEM′ and step the addressing circuits of the memory MEM′ to a new position for accepting the next character. The last of the sequential clock pulses in each cycle generated by a TR8 is a CKOL pulse which steps the memory MEM' to the next position and is also fed back to the magnetic tape system MTS' to terminate the DT1 to DT7 signals associated with the entered character.

The TD1 to TD7 signals and the minus CC1 to CC7 signals derived therefrom are fed to control KON' for transverse and longitudinal parity error checking respectively. If a transverse parity error is detected a TEP pulse signal is generated causing the generation of a PET signal therein.

The read into memory MEM' continues until the end of the block is reached as indicated by a gap of characters equivalent to at least 350 microseconds on the magnetic tape. After no coded combination of R1 to R7 signals have been read for 75 microseconds, and consequently no generation of a TR8 sprocket pulse for that time an LPCK signal is generated. The LPCK signal cooperates with the minus CC1 to CC7 signals from magnetic tape system MTS' to check for longitudinal parity error and if one exists to cause the generation of the PET signal indicating there has been a parity error either transverse or longitudinal in reading of characters from the magnetic tape system MTS' to the memory MEM'.

It is possible to read in several blocks before the capacity of the memory MEM' can overflow so that the end of the read-in cycle is actually controlled by the capacity of the memory MEM'. Basically, a count of the number of characters inserted is kept and the read-in cycle is terminated upon detecting the first end of block after a predetermined character count is reached. The character count is derived from the CCN and RCN signals which control sequential addressing in the memory MEM'. It should be noted that N is an integer from 1 to 7. These signals are fed to control KON' and when a predetermined combination is generated, control KON' starts generating a MXM signal therein.

When the end of any block is reached as described above the absence of TR8 sprocket pulses for the given number of microseconds causes the generation of an ERV pulse signal indicating the end of block. The ERV signals are accumulated to keep track of the number of blocks read-in during the read-in cycle. The ERV and MXM signals cooperate to generate an ENWR signal therein which indicates the end of the read-in cycle terminating the TFW and FOR signals and clearing the addressing circuits of the memory MEM' to the home position.

If there had been no parity error the cycle which causes the transfer of the contents of the memory MEM' via the translator XLT' to the coupler DV' would begin. Assume, however there was a parity error as indicated by the presence of the PET signal. In such a case, the magnetic tape is reversed and reread. In particular, the PET signal cooperates with the ENWR signal in control KON' to cause generation of the OTR, OTRP and minus OTR1 signals which are indicative of magnetic tape reversal. The OTR signal is fed to magnetic tape system MTS' to cause generation of the REV signal which is fed to the magnetic tape transport which now moves the magnetic tape in the reverse direction.

As the magnetic tape moves in the reverse direction the characters are read in the usual manner. However, since the TFW signal is no longer present the memory MEM' will not accept the characters read in. However, the ERV signals are generated and are de-accumulated until the original first read-in block is reached causing the generation of the ENRV signal by control KON'. The ENRV signal cooperates with the next occurring ERV signal to indicate the start of the first read-in block by generating the ENR signal which terminates the OTR and minus OTR1 signals ending the reverse drive to the magnetic tape transport. The ENR signal causes the generation of the STD signal which causes the regeneration of the STRD signal within control KON' and a read-in cycle begins and proceeds in the manner described above.

If four consecutive erroneous read-ins are performed control KON' generates, through the agency of an AFW signal, an SDS signal fed to coupler DV' to initiate a disconnect routine wherein the connection between the master station MS and slave station SS is broken.

At the end of an error free read-in cycle as indicated by the generation of the ENWR signal and the absence of the PET signal control KON' starts generating an RDA signal indicative of the transfer of the contents of the memory MEM' to the coupler DV' via translator XLT'. Signal RDA is fed to memory MEM' to cause the generation of cycles of sequences of clock pulse, one sequence occurring for each timing signal received from coupler DV'.

It should be noted that the memory MEM' includes a magnetic core matrix of the recirculation type. In other words as each character is read out of its address in the memory it can be reinserted into the read-from address. During this read-out cycle from the memory the characters are recirculated.

As each character is read from memory MEM' it is fed via the MTD1–6 signals to the translator XLT' for possible translating and then back to memory MEM' as EZC1–6 signals the EZC1–6 signals cooperate with STR strobing pulses from coupler DV' to cause the character to be transmitted via the NDT1–6 signals lines to the A Buffer and thence to the B Buffer of coupler DV' and serializer for transmission via the TDAD signal line to transceiver DF' for transmission via lines TL1 and TL2 to master station MS. An EMP signal is fed from the coupler DV' to memory MEM' whenever the A Buffer is empty. The presence of the EMP signal permits the BTC signal to generate a cycle of sequented clock pulses.

It should be noted that translator XLT' is not logically required when the coding of the characters handled by the master station MS is the same as the coding of the characters handled by the slave station SS and is only included for flexibility.

As the characters are read from the magnetic core storage of the memory MEM' their parity is checked and if erroneous memory MEM' transmits an MEME signal to control KON' which starts generating a COE signal by setting a bistable circuit to remember that there has been an error in one of the characters read from the magnetic core storage to coupler DV'.

It should be noted that the characters transferred to the coupler DV' are represented by the NDT1 to NDT6 signals or a coded combination of six bits. The parity bit has been stripped from it and a new parity bit is inserted within the coupler DV' depending upon whether the characters should be transmitted over the telephone lines with odd or even parity. However, memory MEM' does a parity count on six bits and, if odd, an NDTE signal is fed to coupler DV' so that it can generate the desired parity bit for insertion in the character when it is transmitted over the line. If there was an error in a memory character as indicated by the occurrence of the MEME signal, this signal is fed to the circuits generating the NOTE signal within the memory MEM' to force the generation of erroneous parity by these circuits to insure the detection of the character in error by the receiver.

As the characters pass through the coupler DV' they are counted and checked for coded combinations of end sentinal characters indicating either end of record or end of message. When a predetermined count is reached coupler DV' starts generating a MAX signal. When during the occurrence of the MAX signal three ENA characters enter the coupler DV' indicating an end of record, an EOB signal is generated therein which terminates the transmit mode, and causes the generation of the ACK signal starting the acknowledge mode. At the end of the acknowledge mode when ACK disappears the MAX signal is terminated.

In this manner, each character of the block during the transmit mode is received with its bits-in-parallel by coupler DV′ which converts it to a serial representation and feeds it via the line TDAD to transceiver DF′ The character is then fed from transceiver DF′ via telephone lines TL1 and TL2 to the transceiver DF, and via the DIND signal line to coupler DV.

It should be noted that at the receiver, that is at the master station MS, the bid mode caused the generation of the RTT signal by the coupler DV which is fed to the memory MEM to clear the addressing circuits to the home or initial position preparatory to the reception of information by the memory MEM from the coupler DV via the translator XLT. The master station MS then entered the receive mode.

Within the coupler DV of the master station MS during the receive mode the characters of information pass from the A Buffer to the B Buffer for transmission to the translator XLT. When the characters are in the B buffer a transverse parity check is performed and if a character is received with erroneous parity there is generated a VPE pulse signal fed to control KON which in turn generates an MPE pulse signal fed back to coupler DV causing the generaion of an ERR signal which remembers an error has occurred at the receiver.

In any event, coupler DV transfers the character stripped of its parity bit via the BBA to BBF signal lines to translator XLT. After translation, if necessary, the character is transferred via the ENC1 to ENC6 to memory MEM. All characters are stored in the magnetic core storage of the memory MEM with odd parity. Memory MEM does a parity count on signals derived from the ENC1 to ENC6 signals and generates the appropriate parity bit.

When a character enters the B Buffer of coupler DV at least one of the BBA to BBF signals will be present and is transmitted to memory MEM where it cooperates with a periodically occurring timing signal BTB from coupler DV to generate one PADM signal per character received. The PADM signal within memory MEM generates a sequence of clock pulses to cause the character to be stored in the magnetic core storage of memory MEM.

During the receive mode as the characters pass through the coupler DV they are counted and checked for coded combinations of end sentinal characters indicating either an end of message or end of record in the same manner as described for the transmitter. When the predetermined count is reached the MAX signal is generated by coupler DV and fed to control KON followed, in the manner described, by the generation of the EOB signal which initiates the acknowledge mode at the receiver.

The EOB signal is also fed to control KON which generates FILL signal to start a fill routine which ends with generation of an FGM signal therein to cause the generation and insertion of an end of group marker character in memory MEM.

In particular, the FILL signal is fed to memory MEM where it generates an FLBL signal which in turn generates an FLIG signal. In general, blocks will be padded out to modulo 5, therefore a recycling five counter continuously counts characters inserted in the memory MEM. The FLIG signal cooperates with the absense of an SPWR signal to generate fill characters that pad out the memory. Each time this counter reaches the count of four it generates a BLC signal. The BLC signal cooperates with the FLIG signal to generate an FLEB signal which inserts an end of block character in the memory. The FLEB signal is also fed to control KON where it cooperates with the MAX signal to generate an FLX signal which is fed to memory MEM to cause generation of the FGM signal which causes insertion of the group mark character in the memory. At this point, two possibilities arise at the receiver. If the coupler DV did not detect an error the contents of the memory MEM will be transferred to the magnetic tape system MTS; however, if an error was detected this transfer will not take place, but instead coupler DV will transmit an error control signal via transceiver DF to the slave station SS calling for a retransmission of the block.

In any event during the Acknowledge mode, the slave station SS assumes the role of a receiver and the master station MS, that of a transmitter. Therefore, since these stations are interchanging roles, there is a turnaround cycle. In this case, coupler DV′ remains passive and coupler DV of the master station MS transmits a "request to send signal" on the RTSD line to the transceiver DF which then generates approximately two hundred milliseconds of carrier to suppress echoes on the lines TL1 and TL2. Following this two hundred millisecond period, transceiver DF then sends a "start to send signal" via the STSD line to coupler DV which begins transmitting approximately four hundred milliseconds of reference characters along the TDAD line. Following these four hundred milliseconds of reference characters, coupler DV may transmit a first control character, an error character (see Table 1), if it has detected an error in the information received up to this point. It will be assumed for the present, that an error was detected. Following first control character time, a second control character, an end of mode character, is transmitted via the TDAD line to transceiver DF. Coupler DV then returns to the Receive mode. When the end of mode character is received by coupler DV′ it enters the retransmit mode.

It should be noted that at this time the memory MEM is loaded with the received record containing at least one erroneous character. When coupler DV received the erroneous character it started generating the ERR signal which is fed to control KON to prevent the start of a transfer from memory MEM to magnetic tape system MTS.

At the slave station SS, when the error character is received by the coupler DV′ it generates an REE signal. Two possibilities arise. The first is that the error in the erroneous character received by the coupler of the master station MS was generated on the lines TL1 and TL2. The second is that the error was generated when the character was transferred from memory MEM′ to the coupler DV′ before transmission by transceiver DF′ to the lines TL1 and TL2. In the later case it will be recalled control KON′ will be generating a COE signal.

In the first case the contents of memory MEM′ are again transmitted in the usual manner. In the second case, the record is reread from the magnetic tape system MTS′ to the memory MEM′ and then transmitted in the usual manner. In particular for the first case the REE signal is fed from coupler DV′ to control KON′ causing the generation of the RDA signal therein which initiates the cycle which transfers the contents of MEM′ to coupler DV′ for transmission by transceiver DF′ to master station MS as described above.

In the second case the REE signal is also received by control KON′ but now the COE signal is present therein. The REE and COE signals cooperate to generate the OTR signal which initiates the reversal of the magnetic tape transport followed by a reread from the magnetic tape system MTS′ as described above.

During the retransmission the master station MS whose memory MEM still contains the block with the erroneous character attempts to reconstruct an error-free block by accepting error-free characters received by coupler DV to replace the characters stored in memory MEM and rejecting erroneous characters received by coupler DV and retaining the characters already stored therein by virtue of the previous transmission. It should be noted that when the master station MS returned to the receive mode coupler DV again transmits the RTT signal to memory MEM which clears the addressing circuits to their initial position. It should further be recalled that the memory has the ability to recirculate.

The ERR signal which indicated the error will in turn generate an EEA signal which remembers after the acknowledge mode ended that there is a retransmission because the ERR signal then terminates. Signal EEA is fed to control KON to cause the generation of the COM signal characteristic of reconstruction. As each retransmitted character passes through coupler DV its transverse parity is checked in the usual manner. If it has correct transverse parity it is fed into an address of the magnetic core storage in the usual manner and replaces the character previously stored. If, however, the character passing through coupler DV has a transverse parity error coupler DV transfers a VPE signal to control KON where it cooperates to cause initiation of a CHR signal which is fed to memory MEM to block insertion of this character from coupler DV via translator XLT and instead permits the previously stored character to recirculate; the CKDL clock signal associated with the character then terminates the CHR signal. As each character is read out of the magnetic core storage in an attempt to recirculate its parity is checked as described above and if in error memory MEM generates an MEME signal which is fed to control KON. If there is a coincidence of an MEME signal and a VPE signal in control KON indicating that both the retransmitted character and the previously transmitted character are both in error, control KON generates an MPE signal which is fed to coupler DV. Coupler DV accordingly generates an ERR signal which during the acknowledge mode at the end of the entire retransmission will initiate another retransmission. In this manner, as long as one character is correct and its associated character is erroneous it is possible to reconstruct the record in two transmissions. If both are erroneous, at least another transmission is required. However, it is possible that if both are correct an ambiguity arises. In such a case, the presence of the COM signal (reconstruction), the absence of the CHR signal (incoming character correct) and the absence of MEME signal (memory character correct) cooperate in control KON to permit comparison of the character stored in the magnetic core storage (MDT1 to MDT7) with the character to be stored if correct (NDT1 to NDT7). If an equality exists the incoming character is stored. If an inequality exists control KON generates a CMER signal forcing an MPE signal which operates in the usual manner for another retransmission. However, in such a case another reconstruction is not attempted but transmission starts from scratch, that is, the rereceived information is treated as if it were being received for the first time. In particular the CMER signal causes the generation of a CMHB signal which prevents any further generation of the COM signal.

It should be noted that to insure that during reconstruction the character in the memory which had previously been received in error does actually show up erroneously it is purposely forced to have incorrect parity. When such a character is initially received it will be recalled that coupler DV generated the VPE signal. This signal causes the generation of the IEC signal in coupler DV which is fed to memory MEM to force an incorrect parity count for the character so that the improper parity bit is stored with the character.

It should be noted that if there are four unsuccessful retransmission the system will disconnect.

In any event, assume that there has finally been a loading of memory MEM with all correct characters.

During the acknowledge mode which follows there is no request for a retransmission and the contents of the memory MEM are transferred via translator XLT to magnetic tape system MTS. In particular it should be recalled that, at the start of the acknowledge mode the control KON at the master station MS was generating the FGM signal. This signal causes the generation of the STWR signal therein which in turn causes the generation of the OTF, FOR and FWP signals. The FOR signal is fed to memory MEM to start the tape transport moving in the forward direction. The FWP pulse signal is also fed to magnetic tape system MTS to clear the addressing circuits of the magnetic core storage to their initial position. At the same time, within control KON the FWP and OFT signals cooperae to generate the JAM, STPW, WMGT and MVPI signals.

The MVPI signals, 4 microsecond pulses occurring at a given repitition, are fed to memory MEM. Each of these pulses initiates a sequence of clock pulses which cause the reading of one character out of the magnetic core storage. One of the clock pulses in the sequence is a CKDL pulse. The OTF signal is also fed from control KON to memory MEM to permit recirculation of the characters in the memory, i.e. in addition to the characters being read out they are returned to their original positions in the magnetic core storage. As each character is read from the magnetic core storage it is transmitted from the memory MEM as a combination of MDT1 to MDT7 signals that are fed to magnetic tape system MTS and are converted to TW1 to TW7 signals therein under control of the WMGT signal from control KON with the CKDL pulses from memory MEM acting as strobing pulses. While the characters are read from the magnetic core storage their parity is checked and if erroneous an MEME pulse is generated which is fed to control KON which starts generating a COE signal and a PET signal to remember that one of the characters in the block is in error. The TW1 to TW7 signals pass through to tape writing amplifiers, under the control of the OTF signal from control KON, which drive the writing heads of the respective channels of the magnetic tape.

Immediately after each character is written on the magnetic tape it is read by a set of read heads for error checking purposes and to control tape motion. The characters are read from the tape in the same manner as at the transmitter and are fed to control KON as the TD1 to TD7 signals from the magnetic tape system MTS where a transverse parity check is made. If such a character has a parity error control KON generates a TPE pulse signal which causes the start of the generation of a PET signal to store the fact that a read after write error has been detected. It should be noted that as each character is read control KON also generates TSP and TR8 sprocket pulses in the same manner as occurs during a read-in at the transmitter.

The last character read from the memory is the group mark character which when detected by control KON generates the ENBL pulse signal which terminates the WMGT and MVPI signals therein. It should be recalled that MVPI caused the generation of the sequences of clock pulses in the memory MEM which permitted reading from the magnetic core storage. Since this reading ends no more characters are transferred to the magnetic tape system MTS and characters are no longer read from the magnetic tape. Therefore, no TSP nor TR8 signals are generated. After a lapse of a given period of time during which no TR8 signals are generated control KON generates an ERV signal which in turn cooperating with a MAX signal which will be present at that time causes the generation of an ENWR signal to terminate the OTF, OTF–1 and FOR signals therein. When the FOR signal ends, the forward motion of the tape transport stops. At this point there are two possibilities: no error had been detected as indicated by the absence of a PET signal or an error had been detected as indicated by the presence of the PET signal. It should be recalled that the transfer of the contents of memory MEM to the magnetic tape system MTS takes place during an acknowledge mode. Therefore, for the first case when the acknowledge mode terminates the slave station SS enters a transmit mode and the master station MS a receive mode and the next block is transferred in the usual manner. For the second case there are two possibilities. The first is that the PET signal was caused only by an improper writing on the magnetic tape. The second is that the PET signal was caused at least by the detection of an error in a character read from the magnetic core storage as indicated by the generation of the COE signal as described above.

In the first case, the PET signal cooperates with the ENWR signal to generate the OTR signal in control KON which when fed to the magnetic tape system MTS causes the reversing of the tape which is read in the same manner as during the reversal after the read-in cycle at the transmitter until the start of the block is reached. That is, characters are read and TR8 sprocket pulses are generated. Finally after the first record in the block is reached ENRV is generated and when TR8 sprockets are no longer generated the ERV signal is generated to give the ENR signal which terminates the OTR signal. In addition, ENR causes the generation of the STU signal which in turn causes the generation of the STWR signal. The STWR signal in turn generates the OTF, FOR and FWP signals and another transfer from memory MEM to magnetic tape system MTS begins as described above. In the second case, the reversing of the tape proceeds as in the first case however, the presence of the COE signal inhibits the generation of the STU signal and the STWR signal therefore no re-writing on the magnetic tape is begun. Instead the COE signal cooperates with the ENR signal generated at the end of the magnetic tape reversal to generate an MTE signal which is fed to coupler DV causing the generation of the ERR signal therein. Therefore, as the acknowledge mode ends coupler DV transmits via transceiver DF the error character in the usual manner which calls for a retransmission from the slave station SS. It should be recalled that when the slave station SS is directed to retransmit two things can happen therein. One, it may only transmit the contens of its memory MEM′ if its control KON′ is not generating a COE signal indicating that there was an error free reading of the contents of the magnetic core storage of memory MEM′. Two, if there was such an erroneous reading then the COE signal will be present and control KON′ will call for a rereading of the block from the magnetic tape system MTS′ to memory MEM′ before the contents of memory MEM′ are read out to coupler DV′ for retransmission.

Finally, magnetic tape system MTS′ transmission characters, which when received at the coupler DV′ and the coupler DV initiate a final Acklowledge mode. At the end of this Acknowledge mode, if no error has been detected by coupler DV, coupler DV′ interrupts the internal connection of the lines DCR2 and DCR3 to disconnect transceiver DF′ and similarly coupler DV interrupts its lines DCR2 and DCR3 of transceiver DF causing the disconnection of the stations from the telephone line. If, during this last Acknowledge mode an error had been detected by coupler DV, there would be the initiation of another Retransmit mode but provided there was no error, the above described disconnect procedure would follow.

Incorporated in each of the couplers DV and DV′ is error-detection circuitry which permits a disconnect when a plurality of successive errors are detected. For example, if an error is detected at the end of an Acknowledge mode causing the initiation of a Retransmit mode and, after the retransmission, the following Acknowledge mode again indicates an error and this occurs three consecutive times, there will be an automatic disconnect so that the stations go off the line and stop paying toll charges for an unreliable telephone line.

Whenever the disconnect occurs, both stations revert to the Idle mode, awaiting the establishment of a new connection the operator at the master station MS.

In the system as described up to this point, it has been assumed that the blocks transmitted always have a number of characters less than the capacity of the memory. However, it may happen that the transmitter includes an input device which transfers blocks which would exceed the capacity of the memory, particularly if the transmitter includes a paper tape reader such as shown in copending E. Leonard et al. application. In such a case facility is provided for handling such "large" blocks. More specifically referring to FIG. 2 there is shown a transmitter which is substantially identical to the slave station SS′ of said co-pending application and a master station identical to the master station MS herein described.

After connection has been established between master station MS and slave station SS′ as described above with the slave station SS transmitting for master station MS and slave station SS, a PTFW signal is fed from reader controls RC in response to the ALL and TRS signals fed from Buffers and mode controls BAMC. Tape reader TR′ starts reading into buffers and mode control characters via the PTA1 to PTA7 signal lines under control of sprocket pulses PTST. As each character passes through the buffers an SPL signal is transmitted to counter and time interval generator CTIG which starts accumulating a count. When a predetermined count is reached the REF and IA691 signals are generated in counter and time interval generator CTIG and fed to reader controls RC. The IA691 signal causes the termination of the PTFW signal by resetting a bistable circuit therein. The REF signal which is generated by a time interval generating circuit although present at this time has no effect on reader controls RC. However, at the end of the time interval the REF signal terminates and its termination causes the bistable circuit to again set causing the reappearance of the PTFW signal which causes the tape reader TR′ to again start transmitting characters on the PTA1 to PTA7 signal lines via coupler DV′ and transceiver DF′ over the telephone lines TL1 and TL2 to master station MS.

During this time interval master station MS unloads its memory MEM into the magnetic tape system MTS and appends a continuation of block character after the last character read from in the memory MEM.

In particular, coupler DV counts the characters received and when the predetermined count which is greater than the count which caused the generation of the MAX signal is reached coupler DV generates an MXC signal which after a three reference character count starts generating an SPWR signal which is fed to memory MEM causing the generation of a FILL signal and the normal normal memory pad to modulo 5 takes place except that, instead of inserting fill characters, continuation of block characters are inserted. (A minus SPWR prevents the FLIG signal from generating of FILL characters and an SPWR cooperates with the FLIG signal to insert the continuation of block characters). The end of block character and the group mark characters are then respectively inserted by the FLEB and FGM signals. The FLIG signal cooperates with BLA and BLB signals generated by the five counter of memory MEM in coupler DV to terminate the SPWR signal which in turn terminates the MXC signal. The FGM signal generates the STWR signal and particularly the FOR signal which is fed to magnetic tape system MTS to start tape movement and the transfer of the contents of memory MEM to the magnetic tape system proceeds in the usual manner at the MDT1 to MDT7 signals.

MAGNETIC TAPE SYSTEM

The magnetic tape system includes a magnetic tape unit MTU comprising a tape transport for moving a seven channel magnetic tape past an array of read heads and write heads. The information as seven-bit characters is read from read heads and after amplification by tape reading amplifiers is fed to tape store-TS1 and then to tape store-2 TS2 for buffing. At the same time, tape store-1 TS1 transmits the bits of the characters in parallel to longitudinal parity accumulator LPC for error checking at the end of each block. The information is transferred from tape store-2 TS2 to memory MEM.

When characters are to be written on magnetic tape they are received from memory MEM by the tape output section TOS and fed via tape writing amplifiers to the write heads in the magnetic tape unit MTU.

MAGNETIC TAPE UNIT MTU (FIG. 3)

In particular FIGURE 3A shows the magnetic tape unit MTU which includes a tape transport means 400 for driving a magnetic tape 402 bidirectionally past a magnetic head assembly 404. When the magnetic tape 402 is to be driven in the forward direction, during the presences of the FWD signal, pinch rollers 406 pull magnetic tape 402 off reel 408 past head assembly 404 onto take up reel 410 which is driven in the clockwise direction. When the magnetic tape 402 is driven in the reverse direction pinch rollers 412 pull the tape off reel 410 onto reel 408 which is being rotated in the counter clockwise direction.

The head assembly 404 comprises seven pairs of read heads and write heads. Each pair of heads is opposite one channel of the magnetic tape 402. FIGURE 3*b* shows a typical pair for channel 1. It will be noted that the read head-1 is downstream from the write-head-1 and longitudinally displaces therefrom by a fraction of an inch. A magnetic shield 412 is interposed between the write heads and the read heads so that it is possible to read after writing with a minimum of cross talk.

FIGURE 3*c* shows the tape reading amplifiers TRA-407 to TRA413, each of which amplifies the signals read by their associated read heads to generate R1 to R7 signals respectively that are fed to tape store-2 TS2. In addition, there is shown the tape write amplifiers TWA-400 to TWA406 which receive respectively the TW1 to TW 7 signals from tape output section TOS for recording by the write heads 1 to 7 respectively.

It will be noted that each of the tape write amplifiers receives the LAL signals from manual controls MKM to insure these amplifiers only operate during a desired write time. Similarly the WEN and OTF signals fed to mixer gate M100 insure that amplifier A400 only allows operation of the tape writing amplifiers when the transport is driving the tape forward (the OTF signal) and an interlock is not energized on the transport (the WEN signal).

TAPE STORE-1 TS1 (FIG. 4)

FIGURE 4 shows tape store-1 TS1 is basically seven identical units each associated with a particular bit of the characters read from the magnetic tape. Only one unit will be described, in the unit associated with the most significant bit. Each time an R7 signal is received by magnetic tape unit MTU it is inverted by amplifier A313 to set flip-flop F306 whose one's output is amplified by A321 to become the TD7 signal and whose zero's output is the minus TD7 signal. The zero's output is also amplified and inverted by amplifier A314 to become the TR7 signal.

After the character is stored in flip-flop F306 it is cleared by a pulse from amplifier A300 in response to a TSP sprocket pulse from control KON. The JAM signal also fed to amplifier A300 is an initial clear from control KON at the start of forward tape motion.

TAPE STORE-2 TS2 (FIG. 5)

FIGURE 5 shows tape store-2 TS2 which is basically seven identical units each associated with a particular bit of the characters read from the magnetic tape. Only one unit will be described in detail, i.e. the unit associated with the most significant bit. Each time a TR7 signal is received at mixer gate M112 it passes there through a TR8 pulse to amplifier A113 and A114. The output of amplifier A114 recirculates through mixer gate M113 to amplifier A113 and the DT7 and minus DT7 signals are generated.

After a period of time a signal from amplifier A115 stops the recirculation and the DT7 signals terminate.

It should be noted that the unit acts as a flip-flop with the TR8 and TR7 signals cooperating at mixer gate M112 to set flip-flop and the output of amplifier A115 resetting the flip-flop the TR8 signals are sprocket pulses from control KON. Amplifier A115 is driven by amplifier A100 which receives either the initial clear JAM signal from control KON at the start of forward tape movement or the CKDL from memory MEM which is an intercharacter clear signal.

The diode matrix DM100 is used generally to generate an end of block character which is generated when the magnetic tape is being read (the TFW signal) after the longitudinal parity charatcer is generated at the end of a block (the LPCK signal). These two signals cooperate to generate an EB signal which inturn generates a combination of FEB–N signals. Basically the EB signals line is connected by diodes to several of the FEB-1 to 7 signal lines which are then fed to inputs of amplifiers A101, 103, 105, 107, 109, 111 and 113. And gate G100B generates the FCER signal at the transmitter (the TRS signal) when four consecutive errors have been sensed (the FCE signal).

LONGITUDINAL PARITY ACCUMULATOR LPA (FIG. 6)

This unit comprises seven binary counters each of which modulo 2 counts the bits of the characters read from the magnetic tape. For example, counter C200 counts the least significant bits represented by the TD1 signals from the tape store-1 TS1 and indicates by means of the minus CC1 signal whether the total number of least significant bits in a block of characters read from the magnetic tape is odd or even.

The —JAM signal fed via blocking oscillator BO200 and counter clear amplifier A200 initially clears the binary counters.

TAPE OUTPUT SECTION TOS (FIG. 7)

This unit generally receives the characters serially from memory MEM and permits them to be written in a non-return-to-zero pattern by the write amplifiers onto the magnetic tape unit MTU. The six least significant bit units centering around counters C1400 to C1405 inclusive are identical and only one will be described in detail.

In particular counter 1400 is acting a binary counter and changes state each time a pulse is transmitted from mixer gate M1400. One input to this gate is the MDT3 signal representing the third least significant bit of the characters. When this signal is present it will pass pulses received from amplifier A1408. Said amplifier passes a pulse each time a clock pulse (CKDL signal) is received from memory MEM during the time writing is to be performed as indicated by a WMGT signal from control KON at gate G1400.

Mixer gates IJ24E and IJ24D which fed pulses via inverting amplifier A1407 to counter C1406 insure that all characters written on the magnetic tape have odd parity.

The FWP signal to counter clear amplifier A1400 acts as an initial clear of the counters while the WLPC signal which occurs at the end of a block resets all those counters that are set and effectively causes the writing of a longitudinal parity character for the block.

The STPW signal which is present during the writing operation will gate and EFCH signal through gate G1401 to cause the generation of a WREP signal that is fed to DM1400 causing the generation of an end of file character as a combination of WREP-1 to 7 signals fed to amplifiers A1401 to 1407 respectively when it is desired to write an end of file character as indicated by the transmission of the EFCH signal from manual control MKM.

MANUAL CONTROL MKM (FIG. 8)

The circuits of this unit generally are associated with movement of the magnetic tape.

In particular the circuits associated with flip-flop F501 generate an ROB signal in response to the receipt of an OBRA signal from the control panel CP to generate the ROB signal which will cause the magnetic tape to move back one block. Similarly the flip-flop F502 will generate an ONEB signal to cause the magnetic tape to advance one block in response to receipt of an OBFA signal from control panel CP.

When the EDFA signal is generated at control panel CP flip-flop F503 is set to cause generation of the EFCH signal which causes an end of file character to be written on the magnetic tape.

The circuitry associated with the flip-flop F505 is used solely for maintenance and causes the deletion of certain operations. Blocking oscillator B0502 generates an ERS signal in response to an ERSA signal from the maintenance panel MP to reset certain error conditions during maintenance. The blocking oscillator BO501 generates a PROC signal in response to the PROA signal from maintenance panel MP to start operation during non-automatic operation.

The circuitry associated with flip-flop 500 generates the AUT signal during automatic operation. During normal automatic operation the AUTO signal is present at one input of gate G502 so that when the minus BDA signal from coupler DV terminates, at the end of bid or allow modes, flip-flop F500 sets. Normal resetting is performed by the EOTR signal from coupler DV at the end of transmission or by the SDS signal from control KON if an error has been detected.

The LAL and minus LAL signals are generated by amplifiers A500 and A510 to permit operation of the write amplifiers in magnetic tape unit MTU. Mixer Gate M500 operates when magnetic tape is to be erased as indicated by the FER signal. During the receive mode the REC signal causes generation of the LAL signal by activating mixer gate 501. When an end of file character is to be written the EFCH signal passes through mixer gate M502 to generate the LAL signal.

Amplifier A501 amplifies the OTR signal from control KON as an REV signal fed to magnetic tape unit MTU to cause reverse movement of the tape. Similarly the FOR signal from control KON is transmitted by amplifier A502 as the FWD signal to magnetic tape unit MTU to cause forward motion of the tape.

TRANSLATOR XLT

This unit is interposed between the memory MEM and the coupler DV to permit translation from one code to another. For example, the characters received from the line by the coupler DV may be in teletype code whereas the characters on the magnetic tape should be in IBM code for data processing, or the reverse. Therefore, six bit characters are fed from the memory MEM and decoded by decoder matrix DM into their 64 different signals which are amplified by decoder amplifiers DA and fed either to encoder–1 ENC1 for encoding for information flow to the magnetic tape and to encoder–2 ENC2 for information flowing to coupler DV. It should be noted that the translator XLT only permits greater versatility in the system.

DECODING MATRIX (FIG. 9)

Amplifiers A800 to A811 receive the bits of the characters in parallel as the DTA1 to DTA6 from encoder–2 ENC2 and after amplification generates the DTE1 to DTE6 signals that are fed to matrices D800 to D807. These matrices are effectively pluralities of and gates which permit the generation of one of the DE00 to DE63 signals for each of the sixty-four different combinations of DTA1 to DTA6 signals. It should be noted that the matrices of FIGURE 9*b* specifically decode the unique characters associated with case shifting required in teletype codes.

DECODER AMPLIFIERS DA (FIG. 10)

These 64 amplifiers are used to invert the DE00 to DE63 signals and transmit them as minus XA00 to minus XA63 signals.

ENCODER–1 ENC1 (FIG. 11)

This unit receives the 64 different XA signals and by conventional diode matrix techniques in the matrices D1500 to D1504 encodes each signal into a different combination of ENB1 to ENB6 signals which are inverted and amplified by amplifiers A1502 to A1507 respectively to become the ENC1 to ENC6 signals fed to memory MEM. The LOZ signal generated by counter C1500B indicates the detection of a forbidden character.

ENCODER–2 ENC2 (FIG. 12)

This unit includes diode matrices D1800 to D1804 for encoding each of the XA signals to a unique combination of the EZB1 to EZB6 signals that are inverted by amplifiers A1816 to A1821 to become the EZC1 to EZC6 signals that are fed to memory MEM. The encoding is performed by well known diode matrix techniques.

In addition the unit includes six identical elements each handling a different bit position of a character without parity. These units can be considered the input to the translator XLT. A typical element is the one associated with the least significant bit of a character and results in the generation of the DTA1 signal. The DTA1 signal is either BBA signal from coupled DV or the MDT1 signal from memory MEM. During the transfer from coupler DV to memory MEM to REC–1 signal is present alerting mixer gate M1803 to accept the BBA signals from coupler DV. During the transfer from memory MEM to coupler DV the RDA signal is transmitted by control KON to gate G1803 causing amplifier A1824 to alert mixer gate M1802 to pass MDT1 signals from memory MEM.

GENERAL DESCRIPTION OF MEMORY MEM

The memory MEM is centered around a magnetic core matrix storage and includes rows and column drivers for selecting addresses. Included in the memory MEM are control circuits for performing specific fill operations at the end of blocks of characters.

MAGNETIC CORE STORAGE MCS (FIG. 13)

FIGURE 13*a* shows generally the magnetic core storage which is a seven plane, 32 row x 32 column array of conventional magnetic cores. Each intersection of a row and column define an address for storing the seven bits of a character with one bit in each plane. Each core such as core 130 in FIG. 13 is threaded by four windings, a row winding 134, a column winding 132, an inhibit winding 136, and a sense winding 138. The cycle is read followed by write. Therefore, the address is selected by energizing the appropriate bilateral switches, for example, if the address is selected as shown in FIG. 13*b* the bilateral switches are energized. Then write driver 2000 is energized by a CKRE pulse to set the core 130 to the zero state. If core 130 was in the one state, a pulse is fed into winding 138 and amplified by sense amplifier S1900. Then a CKWR clock pulse energizes driver 2001 which will set the core 130 to the one state if inhibit driver I1900 has not been energized to pass inhibit current through winding 136.

It should be noted that there is one inhibit driver and one sense amplifier for each plane. In the example shown in FIG. 13*b* winding 136 threads all the cores in the plane associated with the least significant bits of the character address. The sense winding 138 similarly threads the same cores. A row winding such as winding 134 threads all cores in the same row of each plane. A column winding such as winding 132 threads all cores in the same column of each plane.

The 32 row windings all have one end connected to driver 2000 and have the other ends connected respectively to the outputs of bilateral switches BS1 to BS32 (see FIG. 13*c*). Each of the column windings has one end connected to driver 2001 and the other ends respectively connected to the outputs of bilateral switches BS33 to BS64. When a bilateral switch such as BS1 is energized it permits the flow of current therethrough in either direction. Each row bilateral switch is energized by one of the MR signals from the memory addressing unit MAU, similarly each column bilateral switch is energized by one of the MC signals from said unit.

MEMORY ADDRESSING UNIT MAU (FIG. 14)

The addressing of the magnetic core storage is sequential and performed by a five stage binary counter comprising counters C1605 to C1609 inclusive which count clock pulses represented by CKDL signals. At the occurrence of each thirty second such clock pulse all of the counters C1605 to C1609 are set and their one's outputs are gated together in diode matrix D1600 to generate the RCCT signal. The RCCT signals are counted by the counters C1600 to C1604. In other words, the first address is row 1, column 1; the second address is row 1, column 2; . . . ; the thirty-second address is row one, column 32; the thirty-third is row 2, column 1; . . . ; the last address is row 32, column 32. The outputs of the column counters, as the CC01, CC02, CC04, CC08 and CC16 signals, are decoded into 32 unique signals MC01 to MC32 by the decoders 1604D8U to 1607D8U. Similarly, the outputs of the rows counters, as the RC01, RC02, RC04, RC08 and RC16 signals, are decoded into 32 unique signals MR01 to MR32 by the decoders 1600D8U to 1603D8U and fed to the bilateral switches in the memory core storage MCS.

Initial clearing of the counters is performed by clear amplifiers A1600 and A1601. It will be noted that initial clearing is performed: when the magnetic tape is first moved forward (the FWP signal from control KON is fed to both, buffer B1600 and B1601); at the start of transmitting or receiving (the RTT signal from coupler DV); at the end of reading or writing on magnetic tape (the ENWR signal from control KON); or at the end of a fill operation (the FGM signal at mixer gates 2E1A and 2E1B fron control KON).

MEMORY CIRCUITS MCK (FIG. 15)

The sequential clock pulse generator for memory MEM is shown on the upper right of FIGURE 15. Each pulse transmitted by amplifier A1914 causes the generation of the following sequence of clock pulses; a read pulse CKRE; a CLME pulse, a stroke pulse CKST beginning after the CKRE pulse; a CKHB inhibit pulse after the end of the CKRE pulse; a CKWR write pulse centered within the CKHB pulse starting at the end of the CKHB pulse.

Amplifier A1914 will pass a pulse: each time a TR8 sprocket pulse is gated through mixer gate M1918 under control of the TFW1 signal from control KON when the contents of the magnetic tape are being read into the memory MEM; each time the Buffers in coupler DV contain information (the EMP signal fed from coupler DV to gate G1919) during the transfer from memory MEM to coupler DV (the RDA signal from control KON); with the occurrence of a PADM pulse at buffer B1900 from control KON during the transfer coupler DV to memory MEM; and with the occurrence of an MVP1 pulse at buffer B1900 from control KON during the transfer from memory MEM to the magnetic tape system MTS.

The characters as they are read from the magnetic core storage are parity checked by the parity checker 2C25A and if there is a parity error the MEME signal is generated.

The remainder of the circuitry is concerned with reading the characters into or out of the memory and may be divided into seven substantially identical elements each associated with one bit of a character and its related memory plane. For example, Inhibit driver I1900 associated with the least significant bits of the characters is energized by either mixer gate 1900, mixer gate 1901 or mixer gate 1922. Mixer gate M1922 operates during transfer from the magnetic tape system MTS to the memory MEM to permit insertion of a least significant bit represented by minus DTI signal under control of, basically, the TFW signal from control KON which passes through gate G192D and amplifier A1916. Mixer gate M1900 is operative to recirculate the least significant bit being read out as the minus MDT1 signal under control of amplifier A1900. Recirculation is permitted: during transfer from memory MEM to coupler DV when the RDA signal is present at mixer gate M1915; during transfer from memory MEM to magnetic tape system MTS when the OTFI signal is present at mixer gate M1916; and during the reconstruction of data when the received character is in error (the CHR signal at mixer gate M1914). Mixer gate 1901 is operative to permit the least significant bit of the character being received by coupler DV, after translation, to enter memory MEM under control of amplifier A1901. Mixer gate M1917 controls operation of amplifier A1901 to open mixer gate M1901 during transfer from coupler DV to memory MEM during retransmission, provided the character received by coupler DV is error-free.

Mixer gates 2E12C and 2E12D insure that odd parity is always inserted in the parity plane of the memory. With this exception all of the bit inputs are identical.

At the read-out side all the plane output circuits are the same, therefore only the output circuit associated with plane 1 containing the least significant bits of the characters will be described in detail. The output of sense amplifier S1900 is sampled at mixer gate M1900 by a strobe pulse CKST. The output of this gate is amplified, inverted and fed to the set input of counter C1900. Just after this a CLME signal from amplifier A1910 is fed via mixer gate 2J19H and clear amplifier A1909 to the reset terminal of the counter C1900 so it can receive the next read-out bit. The other input of the mixer gate 2J19H is derived from the RDA signal to provide an initial clear.

MEMORY DATA CONTROL MDC (FIG. 16)

This unit contains the circuits which funnel the characters from the translator XLT to the magnetic core storage and also circuits for generating fill characters.

The circuitry centered around amplifiers A1700 to A1706 selects which encoded characters are fed from the translator XLT to the magnetic core storage MCS. Since each of the seven units are substantially identical only that associated with the least significant bit will be described. Amplifier A1700 which generates the minus NDTI signal has three possible inputs: the mixer gate M1700 will pass the EZC1 signal from the translator XLT, during transfers from memory MEM to coupler DV as characterized by the RDA signal from control KON; the mixer gate M1701 will transmit and ENC1 signal from translator XLT during presence of the RECI from coupler DV during transfer from coupler DV to memory MEM provided no fill characters are being inserted (the absence of the signal minus FGL); and the signal FLBA associated with the least significant bit of the fill characters.

The circuitry associated with counters C1700, C1701 and C1702 is a modulo five counter which counts the CKDL clock pulses from the memory MEM. On each count of four the BLC signal is generated by amplifier A1708C and fed to mixer gate M1714 where it gates the next (fifth) clock pulse to clear the counters to zero through the agency of clear amplifier A1708. The modulo five counter as described above ensures that block written on the magnetic tape are multiples of five characters even if padding characters are required.

The generation of the padding or fill characters is performed by the circuitry associated with amplifiers A1709 and A1710. In particular a FILL signal from control KON sets flip-flop F1703 which causes the generation of the minus FLBL signal which in turn causes the generation of the FLIG signal by amplifier A1709. While the FLIG signal is present padding characters will be inserted as is described below. The occurrence of a BLC, at the count of four, will terminate the FLIG signal causing generation of the FLEB signal which causes the insertion of an end of block character. The BLC and FLEB signals gate a CKDL signal through gate G1702C to reset the flip-flop F1703 to end the fill operation.

The actual encoding of the padding or fill characters is performed by the diode matrix DM1701 which by conventional diode matrix techniques generates parallel combinations of FLBA to FLBF signals that are fed to the respective inputs of the above described amplifiers A1700 to A1705. In particular, a convention pad character is inserted when the FLIG signal is present at gate G1705C the other two signals being absent. A "long" block fill or continuation of block character is generated when there is a coincidence of the FLIG signal and the SPWR signal from coupler DV which indicates that a "long" block is being handled and continuation of block characters should be inserted as fill characters. The FLEB signal at the L input to diode matrix DM1701 will generate the end of block character. The FGM signal, to be described below, at the D input will generate the group mark character.

The counters 2B6A and 2B6B binary count BLC signals to insure that a minimum number of characters is included in every block.

The parity bit for each character inserted in the memory is generated by parity counter PCK 1700 which generates an NDT7 signal when the parity count of the six least significant bits is even, so that the characters in the magnetic core storage have odd parity. Note that if a character is received by the coupler DV with incorrect party it will generate an IEC signal which cooperates with the REC signal at mixer gate 2E15E to pass a pulse into the parity counter PCK1700 to insure that this character is stored with even or incorrect parity.

Blocking oscillator BO1701 generates PADM signals which are used to generate clock pulses in memory MEM during transfer from coupler DV to memory MEM. Each time a character is in the B buffer of coupler DV, a pulse passes through gate G1702 pulse during the presence of the RCV signal from coupler DV (the received mode) via buffer B1709 to blocking oscillator BO1701. When fill characters are generated the FGL signal acting through gated multivibrator GMV1700 passes pulses through buffer B1709.

The flip-flop F1702C generates the FGM signal when it is set by the FLX signal from control KON to cause the insertion of the group mark character.

CONTROL KON

The control KON has the function of controlling the sequencing and transfer of information between the memory MEM, the magnetic tape system MTS and the coupler DV.

TAPE CONTROL–1TC–1(FIG. 17)

The circuitry associated with the amplifier A600 and the amplifier A615 is associated with generating sprocket pulses when the characters are read from the magnetic tape. In particular, as each character is read from the magnetic tape, at least one bit will be read. Therefore, at least one of the minus R1 to minus R7 signals will be present at gate G600, causing the triggering of blocking oscillator BO600 which feeds a pulse to the plurality of mixer gates M605, M606, M607 and gate G606. During the forward movement of tape an OTF signal will be present at another input of mixer gate M605, causing the pulse from blocking oscillator BO600 to pass through to amplifier A600, generating the TSP sprocket pulse which in turn is fed via amplifier A610 and buffer B600 to amplifier A601 which in turn feeds amplifier A615 to generate a TR8 sprocket pulse. Similarly, when the TFW1 signal is present at an input of mixer gate G606 a pulse is passed to amplifier A600 to cause the generation of the sprocket pulses. When the magnetic tape is moving in the reverse direction the OTR signal at mixer gate M607 will cause the passage of a pulse generated by blocking oscillator B600. It should be noted that the minus JAM signal which is fed to mixer gates M605, M606, M607 and gate G606 prevent the generation of spurious sprocket pulses for a period of time after the start of magnetic tape movement.

The circuitry terminating at amplifier A607 which generates the BTP signal, indicates that the magnetic tape is unreliable for some reason. The generation of the BTP signal causes the shutting down of the system. Since the blocks are read from the magnetic tape in an intermittent manner, that is a block is read, the tape transport stopped, then the next block is read; and since the time of tape movement for each block is considerably less than one second there will be an error in the tape system if the TFW1 signal is present at amplifier A611 for at least two seconds. It should be noted that the TFW1 signal will be present only while the magnetic tape is moving in the forward direction. Therefore, if the signal TFW1 is present for greater than two seconds, the retriggerable delay-flop RD603 will pass a pulse to amplifier A606 which will set flip-flop F600 generating the BTP signal. Similarly if the tape is moving in a reverse direction for greater than two hundred milliseconds the OTR signal will be present at one input of gate 1H24D causing the amplifier A612 to allow the retriggerable delay-flop RDF604 to pass a pulse to amplifier A606. If the WMGT signal is present when the ERV signal is generated at gate G601, indicating that a writing from memory MEM to magnetic tape is being performed even after an end of block character is detected which is clearly erroneous, a pulse is passed via buffer B603 to amplifier A606. Whenever the magnetic tape is started up there is allowed a given period of time in which a length of tape is erased. This is perforemd by the generation of the EST signal by delay-flop DF602. In particular, after the BID or ALLOW mode, the BDA signal from coupler DV sets the flip-flop F600F generating the TLM signal which is fed to one input of mixer gate M601F where it cooperates with FWP and OTF signals to trigger delay-flop DF602 generating the EST signal. The BTPS and ETPS signals generated respectively by amplifiers 600F and 601F are associated with detecting the physical beginning and end of the magnetic tape. In particular, the ETPS signal is fed to one input of gate G610 to set the flip-flop F605 which generates the ENDT and ENDTL signals to indicate that the physical end of a magnetic tape has been detected. The circuitry associated with the diode matrix DM600 is used to detect an end of file character which when detected passes a pulse through gate 1J27C to set the flip-flop F601. The flip-flop F606 is set whenever the diode matrix BM600 detects the character related to upper case characters used in teletype code and is not pertinent for the present discussion.

When reading from the magnetic tape, if no TR8 sprocket pulses are sensed for one hundred and fifty microseconds, the retriggerable delay-flop RDF600 passes a trigger to the delay-flop DF600 which will pass a pulse causing the generation of the LPCK signal by the blocking oscillator 601. The LPCK signal will be fed to the tape control–2 TC–2 so that the longitudinal parity check may be performed on the block just read from the magnetic tape.

The STU signal generated by blocking oscillator BO602 is used to restart the magnetic tape in the forward direction after it has been reversed. In particular, the presence of the OTR signal indicating reverse movement along with ENR and AFW signals at gate G600 causes delay-flop D601 to pass a pulse via amplifier A603 to trigger blocking oscillator BO602.

TAPE CONTROL-2 TC-2 (FIG. 18)

The circuits associated with amplifier A700 which generates the TPE signal basically are concerned with checking the vertical or transverse parity of the characters being read from the magnetic tape. The parity checker PCK700 receives the bits of the characters and performs a parity check to indicate whether the parity is either even or odd. Generally the normal parity of the characters read from the tape is even. Therefore, if odd parity is counted a pulse will pass through mixer gate M700, strobed by a TR8 pulse to amplifier A700 giving the TPE signal indicating a transverse parity error. Note, if odd parity is being checked the even signal will not be present and mixer gate M701 will be disabled. The circuits associated with flip-flop F700 are basically the parity error circuits. When the flip-flop F700 is set its zero's output passes a signal via buffer B703 to give the PET signals via amplifiers A705 and A706. The flip-flop F700 will be set by a pulse passing from the mixer gates M702, M703 and M704. The mixer gate M702 will pass a pulse during the longitudinal parity check time indicated by the presence of the LPCK signal if the LPER signal is not being generated. The LPER signal will be generated if either the gates G700 or G701 pass a pulse. The Gates G700 and G701 will pass a pulse if any of the elements of the longitudinal parity accumulator LPA is in the "one" state. In other words, at longitudinal parity check time, this accumulator should contain all zeros. The mixer gate M703 will pass a pulse whenever there is a transverse parity error indicated by the presence of the TPE signal. The mixer gate M704 will pass a pulse whenever there is a transverse parity error in the character read from the memory, as indicated by the presence of the MEME signal; during forward magnetic tape movement, indicated by the presence of the FOR signal.

The counter C702 will be set and generate the OTF signals whenever an STWR pulse is received, provided there is no error as indicated by the ERR signal received at its allow set terminal. Similarly, the counter C703 will set whenever the STRD signal is received at its set input terminal. When the counter C703 is set, it will generate the TFW and TFW1 signals. The TFW and the OTF signals, either of which pass through gate G703 acting as a buffer, yield the FOR and FWP signals which will initiate forward movement of the magnetic tap transport.

The circuitry associated with the counter C701 which generates the OTR, OTRP and OTR1 signals is concerned with reversing the direction of the magnetic tape. Whenever the counter C701 is set, the magnetic tape is controlled to move in the reverse direction. Counter C701 will be set by a pulse from delay-flop DF701 which is triggered by one of the mixer gates 1J21E, M706, M707 or 1J1, or buffer diode 1J13C. The mixer gate M706 will pass a pulse whenever an error is detected in the memory MEM, indicated by the presence of the COE signal, and the transmitter receives an error character from the receiver as indicated by the presence of the REE signal from the coupler DV'. Similarly the mixer gate M707 will pass a pulse whenever a transverse parity error is detected (the PET signal) during the reading of the characters from the magnetic tape.

Actually, in this case, the reversal will start after the block has been completely read as indicated by the presence of the ENWR signal. The counter C701 will be reset by the generation of an ENR signal by amplifier A708 which receives a pulse from delay-flop DF702. Generally, the resetting will take place upon the occurrence of an ERV signal at one of the mixer gates M713 to M716 inclusive.

When the contents of the memory MEM is being written on the magnetic tape, the last character detected will generate an ENBL signal, indicating the end of block. The coincidence of the ENBL signal and the WMGT signal at gate G702 triggers the delay-flop DF700 which after two hundred and sixty-seven microseconds causes amplifier A703 to trigger blocking oscillator BO700 generating the WLPC signal. This signal is fed to the tape output section TOS to reset the counters therein. As these counters are reset they effectively generate the longitudinal parity character which gets stored with the block.

The chain of circuitry ending with blocking oscillator BO703 which generates the MVP1 pulse is associated with generating the sequences of clock pulses used when writing the contents of the memory MEM on the magnetic tape of the magnetic tape system MTS. When the tape transport is energized to move in the forward direction, the FWP and OTF signals cooperate at mixer gate M711 to trigger delay-flop DF704 which after six milliseconds generates the JAM signal. This time delay is used to permit an initial erasing of the tape before characters are written. The JAM signal then cooperates with the OTF signal at gate G705 to trigger blocking oscillator BO702 which generates the STPW signal which in turn sets flip-flop F705 to generate the WMGT signal. During the presence of the WMGT signal gated multivibrator 1J6A periodically, that is, every sixty-seven microseconds, transmits a pulse to blocking oscillator BO703 which generates an MVP1 pulse that is fed to memory MEM to generate one sequence of clock pulses which are used to gate the contents of the memory to the magnetic tape.

BLOCK COUNTER BC (FIG. 19)

The counters C900 to C903 inclusive comprise a four stage cascaded binary counter which can count by unit adding or by unit subtracting. As each unit record is read from the magnetic tape, either in the forward or reverse direction, an ERV signal is received by amplifier A900. It is the ERV signals that are counted. When the magnetic tape is moving in the forward direction the OTR signal will be absent and the mixer gates M901, M903, M905 will be alerted. During this time the counters will act as a unit adder and as each ERV occurs a count will be accumulated. When the tape is moving in the reverse direction the OTR signal will be present at gates M900, M902 and M904 and as the ERV signals are received the previously accumulated count during the forward motion of the tape will be unit subtracted. During unit subtraction when the accumulated count decreases to the value of one, the amplifier A905 will generate the ENRV signal to alert the control circuitry to stop when the next ERV signal is generated. The counters C900 to C903 are initial cleared by a pulse from clear amplifier A901. In the usual case the occurrence of the FWP signal at the start of forward tape movement will pass through mixer gate M926 to the input of amplifier A901. Mixer gate 2A3B will perform clearing at the end of an error free acknowledge mode.

The circuitry feeding into amplifier A913 with generates the CMER signal is used during the reconstruction of data, to insure that the proper character is inserted into the memory. In particular, during the reconstruction, that is, during a retransmission indicated by the presence of the minus COM signal when there is no error in the character received by the coupler DV, indicated by the absence of the CHR signal, and when there is no error in the character in the memory as indicated by the MEME signal, the CMER signal will be generated if amplifier A911 transmits a pulse. Amplifier A911 is effectively connected to the parallel array of mixer gates M908 to M921 which perform an equality comparison between the character from the memory as represented by the MDT1 to MDT7 signals and the character being received by the coupler DV as indicated by the NDT1 to NDT7 signals.

Diode matrix DM900 may be considered to include a gate which detects the coded combination of MDT1 to MDT6 signals unique for the end of block character, which when detected causes the generation of the ENBL signal by the amplifier A910. The CKDL signal fed to gate diode matrix DM900 is used as a strobing pulse.

Amplifier A915 which is effectively fed by a gate which detects the combination of the MDT signals, generates a UCGH when the unique coded combination representing an upper case character is detected.

The TZR signal generated by amplifier A907 is used to prevent the termination of the Acknowledge mode. The TRZ signal will start to be generated upon the occurrence of the FGM signal at mixer gate M922 provided no error has been detected by the coupler DV (the absence of the minus ERR signal). The TRZ signal will remain present until the end of the block has been written on the magnetic tape as indicated by the ERV signal fed to gate G901. However, if an error has been detected in the writing of the block in the memory MEM onto the magnetic tape, a PTE signal will be present at gate G901 and override the effect of the ERV signal. Therefore, the TZR signal will remain present while the block is re-read. The TZR signal can be terminated by a signal from amplifier A909. This amplifier will generate a signal to permit the termination of the TZR signal if there have been three re-readings; then the buffer B902 triggers blocking oscillator BO904 which generates the URW signal. If after the three erroneous re-reads from the magnetic tape during the presence of a memory error, the mixer gate M906 will pass a pulse to amplifier A909 permitting the termination of the TZR signal. It should be noted that whenever the amplifier A909 transmits a pulse to terminate the TZR signal, it also causes the generation of the minus MTE signal by amplifier A908 indicating that there is an error in the magnetic tape writing which signal is fed to the coupler DV. Mixer gate M907 will also pass a pulse to amplifier A909, on any reread if there is a core error.

DATA CONTROL-1 DC-1 (FIG. 20)

During conventional automatic operation the presence of the AUT signal at mixer gate M1008, M1009 or M1010 cooperating with either the ACK, CON or ALL signals, passes a pulse via amplifier A1007 to trigger blocking oscillator BO1000 which generates the EACK signal that is fed to amplifier A1004 generating the STRD and setting the counter C1002 which generates the EXTI signal to start the reading of the magnetic tape at the transmitter. Mixer gate M1008 operates at the end of the Acknowledge mode. Mixer gate M1009 and M1010 operate at the start of operation, depending on whether the master or the slave is to be the transmitter. The STRD signal will also be generated by an STU signal fed to the buffer B1002 after the reversal of the magnetic tape. Normally the start of the Acknowledge mode will reset the counter C1002.

Amplifier A1002 generates the SDS signal which is fed to the coupler DV to indicate an error under certain conditions. Mixer gate M1003 will transmit a pulse to amplifier A1002 if, at the receiver, an attempt has been made to read from the memory onto the magnetic tape four times unsuccessfully as indicated by the generation of the URW signal in cooperation with the TPE signal. Mixer gate M1001 will transmit a pulse if the memory overflows. That is, the entire magnetic core storage has been filled and still the end of block has not been reached. Mixer gate M1004 will transmit a pulse if at the transmitter four unsuccessful attempts have been made to read from the magnetic tape to the memory. Mixer gate M1005 will transmit a pulse if the memory had an error at the transmitter and no error signal was received from the receiver to indicate that it received a character in error.

The ABRD signal generated by the amplifier A1003 only functions at the transmitter to permit the reading from magnetic tape. It should be noticed that this minus ABRD signal is fed to the allow set terminal of the counter C1002 and will prevent setting of this counter and the inhibition of the reading from magnetic tape if there has been an error-free end of transmission marked by the presence of the minus ETT signal at an input of gate G1006 or by the occurrence of the disconnect signal marked by the presence of the minus DCL signal at another input of this gate. Furthermore, if the minus REE signal is received, flip-flop F1000 is set and the gate G1006 is blocked. The receipt of the minus REE signal will normally lead to a re-reading of the contents of the memory, provided no core or memory error has occurred.

The FLX signal generated by amplifier A1000B normally occurs with the coincidence of the FLEB signal and the MAX signal at mixer gate M1000B, and is used during the fill operation as previously described. The fill signal FILL is generated by diode matrix 2C20 in response to either the CLE or minus SPWR signals.

The start write signal STWR is normally generated by the FGM signal cooperating with the AUT signal at mixer gate M1015. At the receiver, the coincidence of the STU and REC signals at mixer gate M1017 will also generate the STWR signal which initiates the transfer of the contents of the memory MEM to the magnetic type system MTS.

The MXM signal generated by amplifiers A1009 and A1010 is used as an alert for the ending of the block to be written in the memory MEM. The MXM signal is basically generated from the zero's output of flip-flop F1001. This flip-flop is set by a coded combination of CC01 to CC16 signals and RC01 to RC16 signals generated by the diode matrices D1000 and D1001. It occurs when a predetermined count is reached. The MXM signal is fed as one input to mixer gate M1020 where it cooperates with the ERV signal occurring at the end of a block to generate the ENWR signal which ends the read or write cycle associated with the magnetic tape.

DATA CONTROL-2 DC-2 (FIG 21)

Amplifier A1319 generates the STR strobe pulses which are used in the coupler DV for strobing the contents of the A buffer. These strobe pulses are normally generated during the transfer from memory MEM to coupler DV by the RDA signal present at one input of gate G1302 which permits the gating of the BTF timing signals from gate G1302 via amplifier A1305 through buffer B1312 to amplifier A1306 and amplifier A1319. The mixer gates M1300 and M1301 generate strobe pulses when case shift characters are sensed. A STR strobe pulse will also be generated upon the occurrence of a —EMP signal received at buffer B1312 from coupler DV.

The RDA signal generated by amplifier A1315 under the control of counter C1301 controls the transfer of the contents of the memory MEM to the coupler DV. Counter C1301 is set by a timing pulse BTB which passes through gate G1306 under the control of signals present at its S and R input lines. The R input line will alert the gate upon the setting of counter C1303 which occurs at the end of the transmission of reference characters at the start of the connection between the master and slave stations. Amplifier A1307 will alert gate G1306 generally via mixer gate M1303. During the coincidence of the TFW1 and ENWR signals provided no parity error has been detected on reading the block from the magnetic tape into the memory MEM as indicated by the absence of the minus PET signal. It will be recalled that the ENWR signal occurs at the end of the reading of the block from the magnetic tape; the reading taking place as the magnetic tape moves forward as indicated by the TFW1 signal.

The counters C1300 and C1302 are concerned with the generation of the upper and lower case shift characters, when teletype code is being handled by the system. It should be noted that the diode matrix DM1300 generates a combination of MGA to MGG signals which are used to form these case shift characters.

Amplifier A1316 generates the COE signal indicating that there was an error in one of the characters received in memory MEM. The COE signal is effectively generated by the zero's output of flip-flop F1301 which is set upon the detection of a memory error as indicated by the MEME signal fed as an input to gate G1302.

The COM signal generated by amplifier A1317 is associated with the attempt to store an error-free block in memory MEM by virtue of the retransmission of the block and by the selective storing of correct characters, with the reconstruction of data routine. Therefore, during retransmission, the RTO signal is fed via diode 2F26L to inputs of mixer gates M1308 and M1309. The RCV signal received by both of these mixer gates insures that it only occurs at the station which is the receiver. The EEA and EEB signals respectively fed to these gates indicate the fact that an error had been detected during the previous transmission. Therefore under this set of circumstances there is an attempt made to reconstruct the block under the control of the COM signal.

Flip-Flop F1300 will be set upon the detection of a transverse parity error by coupler DV which accordingly sends a minus VPE signal to gate G1305 to set the flip-flop.

Amplifier A1311 generates the minus MPE signal indicating an error whenever it receives a pulse from the mixer gates M1306, M1307, M1311 or M1312. Mixer gate M1311 will transmit a pulse at the receiver, provided the received character and the character in the memory are not identical as indicated by the presence of the CMER signal at the T input of this gate. Mixer gate M1306 will transmit a pulse whenever the coupler DV detects an error in the character received from the line, provided the reconstruction is not being attempted as indicated by the absence of the —COM signal at the N input of mixer gate M1306. Mixer gate M1312 will transmit a pulse whenever a longitudinal parity error is detected by coupler DV as indicated by the generation of the —LPR signal fed to amplifier A1314 provided reconstruction is not being attempted as indicated by the absence of the —COM signal at mixer gate M1312. Mixer gate M1307 will pass a pulse, at the receiver, if a memory error is detected during the reconstruction of data as indicated by the coincidence of the RCV, MEME and COM signals received respectively at the U, V and X input terminals of this gate. The CMHB signal generated by flip-flop F1303 prevents any further possible reconstruction whenever it is found that the character being received from the coupler DV is not the same as its associated character in the memory MEM as indicated by the generation of the CMER signal which is fed to the set input terminal of flip-flop F1302 whose zero's output is fed to the allow set input terminal of flip-flop F1303.

Amplifier A1309 generates periodically recurring CLB signals, at the receiver, by gating BTF timing signals under the control of the RCV signal at gates G1304.

GENERAL DESCRIPTION OF COUPLER DV

Coupler DV comprises those elements of the system which establish and terminate connections between the stations and step the stations through their various modes. In addition, coupler DV includes buffers and means for transforming characters from a bits-in-series representation to a bits-in-parallel representation and vice versa.

COUPLER CONTROLS–1 CK–1 (FIG. 22)

At the start of operation, when the calling station start switch is depressed, the MAL signal is received at the allow set input terminal of counter C2700 to set the counter C2700, causing the generation of the MSR signal indicating that the associated coupler DV is to be the master. With the setting of the counter C2700, a positive going signal is fed from its zero's output terminal to the set input terminal of counter C2704, causing the generation of the BID signal. The zero's output of counter C2704 at this time transmits a positive going transient signal via gate G2700 to amplifiers A2709 and A2710 causing the generation of the BDA and —BDA signals. The BDA signal is passed via buffer B2702 to cause the generation of the RTS and RTT signals by amplifier A2719 and blocking oscillator BO2701 respectively, which initiate a turnaround cycle and indicate to the associated coupler DV that a transmission is to start. The RTS signal is fed to the synchronizer SZ (FIG. 29) which generates the RTSD signal.

At the same time, the RTSD signal is fed to the transceiver DF, causing the usual generation of carrier for echo suppression followed two hundred and fifty milliseconds later by the generation of the STSD signal. The STSD signal is received by amplifier A2701 causing the generation of the STS and —STS signals which trigger delay-flop DF2700 to generate a signal lasting approximately six hundred milliseconds which is characterized as the TRF signal by amplifier A2703. During the occurrence of TRF signal the reference characters are transmitted.

After the generation of the reference characters, the two control characters are generated accompanied by the generation of the INE signal indicating the end of the mode. The INE signal received at the reset input of counter C2704, resets the counter in its initial or reset state, causing the termination of the BID signal. As the BID signal terminates, the one's output terminal of counter C2702 causes the generation of a positive going transient which is fed to the set input terminal of counter C2705, initiating the Connect mode. At the end of the Connect mode, the end of mode character is received and detected, causing the generation of an EOC pulse which is fed to the reset input terminal of counter C2705, terminating the Connect mode, and to the set input terminal of counter C2706. Since the allow set input of C2706 is at minus six volts the Allow mode will not be generated. It should be noted that the one's output of the counter C2705 is fed to one input terminal of mixer gate M2703 and one input terminal of mixer gate M2707. At this time, either the REC or TRS signals will be present in accordance with whether the master station MS is to be a receiver or a transmitter. If the master station MS is to be a receiver then the disappearance of the CON signal at the second input of mixer gate M2703 causes the transmission of a positive going transient via the amplifier A2711 to the set input terminal of counter C2701, causing the generation of the RCV and —RCV signals. If however, the TRS signal is being generated, indicating that the coupler DV is to be a transmitter, then the disappearance of the CON signal at mixer gate M2707 causes the transmission of a positive going transient via the amplifier A2713 to the set input terminal of counter C2702 causing the generation of the TRM and —TRM signals. The zero's output terminal of the counter C2702 passes a signal via buffer B2701 to the amplifiers A2715 and A2724, causing the generation of the TRD signal which alerts the serializer SZ to pass information from the B buffer BB to the transceiver DF.

If the coupler DV is at the slave station SS, then, initially, the counter C2703 will be set. The zero's output terminal of counter C2703 is connected to the input terminal of amplifier A2725 which generates the IDLE signal, indicating the Idle mode. When the slave station SS receives the end-of-mode character, the EOC signal is generated which is fed via gate G2700C to the set input terminal of counter C2706, to initiate the Allow mode. The zero's output terminal of counter C2706 generates a positive going signal which is fed via gate G150 to amplifiers A2709 and A2710, causing the generation of the BDA and —BDA signals. The BDA signal is fed via buffer B2702 to cause the generation of the RTS, RTSD and RTT signals, indicating the start of a turnaround cycle which had been previously described for the master station MS. When the end-of-mode control characters are generated by the coupler DV now acting as a transmitter, the INE signal, representing the end-of-mode character is received at the reset input terminal of the counter C2706, terminating the Allow mode. It should be noted that the ALL signal is fed to first input terminals of the mixer gates M2704 and M2708. At the termination of the Allow mode, the ALL signal shifts in a positively going direction, causing the generation of a positive going voltage via either one of these gates, depending on whether the coupler DV at the slave station SS is to be a receiver or a transmitter as described above for the master station MS, and causing the setting of either the counter C2701 or C2702.

When the Acknowledge mode begins because of the generation of the EOB or EOT pulses, the occurrence of either one of the pulses at amplifier A2712 resets the counters C2701 and C2702. At the end of the Acknowledge mode the ACK signal fed to one input of the mixer gate M2705 and to one input of the mixer gate M2709 terminates and a positive going transient is fed via either mixer gate M2705 or mixer gate M2709 depending on whether the coupler DV is to again be a receiver or a transmitter, and accordingly, setting the appropriate counter C2701 or C2702. Mixer gate M2700 will transmit a positive going signal during the Idle mode as indicated by the presence of the IDLE signal when carrier is detected as indicated by the presence of the CAD signal from the transceiver DF. The mixer gate M2701 will transmit a positive going signal when the REC signal is present and the ALL signal terminates or goes positive at the end of the Allow mode. At the end of the Bid mode, the BID signal which is fed to one input of the buffer B2700 switches from a negative voltage to a ground potential, causing the transmission of a positive going signal from the buffer B2700. Similarly, at the end of a Transmit mode, the TRM signal which is fed to the second input of buffer B2700 switches from a negative polarity to ground potential, causing the transmission of a positive going signal from the buffer B2700. Mixer gate M2702 transmits a positive going signal when the REC signal, indicating a receiver, is present and the ACK signal switches from a negative polarity to ground potential at the end of the Acknowledge mode. Any positive going signal received by amplifier A2705 is inverted to cause a negative going signal to trigger the four hundred millisecond delay flop DF2701, whose output is fed to amplifiers A2707 and A2708, to cause the generation of the INH and —INH siganls. The time constants within the delay-flop DF2701 are chosen so that a four hundred millisecond pulse is generated.

Whenever there is a disconnect, the DCL signal is generated and is amplified by amplifier A2721 to generate a BUZ signal that activates an alarm.

Whenever there has been an error-free transmission, the EOT signal, indicating the end of transmission, is fed to the set input terminal of flip-flop F2700, where it cooperates with the absence of an ERR signal at the allow set input terminal to set flip-flop F2700 which generates the ETT and the EOP signal by amplifier A2720.

The circuitry associated with delay flops DF2702 and DF2704 is used with a mechanical counter which counts blocks and is an optional feature of the system not related to the inventions.

COUPLER CONTROLS–2 CK–2 (FIG. 23)

The circuitry shown in the upper right hand corner of FIG. 23 may be considered a function assignor which assigns the roles to the couplers. It generates control signals indicating whether the associated coupler DV is to operate as a transmiter or as a receiver. At the master station MS it receives signals from the control panel CP of the associated coupler DV, indicating whether the coupler is to act as a transmitter or as a receiver. At the slave station SS, it receives a control character from its associated A buffer AB which sets flip-flops to indicate whether the coupler DV is to act as a transmitter or as a receiver. At the slave station SS, once the role of the coupler DV is indicated, complementary control signals are fed back to the master station MS for re-confirmation as to the role of the other station.

Referring more particularly to FIGURE 23, amplifiers A2118 and A2120 generate respectively the REC and TRS signals that are characteristic of a receiver and a transmitter respectively. At the start of operations at the master station MS the MSR signal is fed to a first input of the mixer gates M2111 and M2112 respectively. The second input terminals of these gates are connected respectively to the RECV and TRSM signal lines from the control panel CP. If the master station MS is to be a receiver then the RECV signal will be present at the second input of mixer gate M2111 which accordingly passes a signal to the input of amplifier A2118, causing the generation of the REC signal and if the control panel CP is transmitting a TRSM signal, indicating that the master station MS is to be a transmitter, then the mixer gate M2112 passes a signal to the input of amplifier A2120 causing the generation of the TRS signal. At the slave station SS, the flip-flops F2107 to F2110 inclusive are operative during the Idle mode as indicated by the presence of the IDLE signal which passes via buffer B2102, amplifier A2115, the buffer diode 2J15E and amplifier A2116 to the allow input terminals of said flip-flops. When the slave station SS recives a first control character during the Idle mode which indicates its future role, one of the BAA to BAD signals will be present, causing the settling of one of the flip-flops. For example, if the coupler DV at the slave station SS is to operate as a receiver, then, provided there is no error in transmission, the BAA signal only will be received and the flip-flop F2107 will be set, causing the generation of the CDA signal which is fed via buffer diode 2J5C to the amplifier A2118 causing the generation of the REC signal. If the coupler DV at the slave station SS is to be a transmitter, then one of the BAB to BAD signals will be present and its associated flip-flop will set, causing the generation of one of the CDB to CDD signals which are fed via buffer B2104 to the input of amplifier A2120, causing the generation of the TRS signal.

It should also be noted that the CON signal at a second input of buffer B2102 permits the setting of the flip-flops F2107 to F2110 during the Connect mode at the master station MS so that it can receive the complementary confirming control character from the slave station SS which indicates that the master station MS should be a receiver if the slave station SS has been instructed by the master station MS to be a transmitter, and vice versa. The operation takes place to insure the reliability of the telephone lines before a data transfer takes place.

The circuitry on the upper left of FIG. 23 is the error and clear circuitry which has two main functions. First, to record the fact that an error has occurred and second, to disconnect the transceivers DF from the telephone lines under certain conditions such as: when the end of transmission is reached; when it appears at the start of transmission that the telephone lines are noisy; during the transmission of information when there are four consecutive records in error when there is no retransmit operation in effect; when there are four consecutive transmissions of the same block, when the retransmit operation is in effect; when the system locks in the Connect or Acknowledge modes; or when no information passes through the A buffer AB for a given period of time.

The flip-flop F2100, when set, records the fact that an error has been detected. The errors recorded by the flip-flop F2100 are indicated by the occurrence of various signals at the input of gate G2103 which is operating as a negative buffer. If the minus ICE signal is present, indicating that an error character has been detected in the A buffer AB at the receiver, this is in effect an error and is recorded. Similarly, the presence of the minus CHE signal at the second input of gate G2103 indicates the fact that an ignore last block character has been detected in the B buffer BB and this in effect is an error. Similarly, the presence of the —REE signal indicates that during the acknowledge mode the transmitter has received from the receiver a character indicating that the receiver detected an error in the last block that had been transmitted. Note flip-flop F2106 records this fact. If a coupler parity error associated with the telephone line is detected, the minus MPE signal will be present at an input of gate G2103. The minus MTE signal at diode 2J15A indicates a parity error associated with the tape. Finally, if during the Receive mode a synchronization error is detected, then the occurrence of the SYE signal at an input gate G2100 causes the transmission of a signal from the negative output of amplifier A2100 (an SEE signal) and this error is recorded by the setting of the flip-flop F2100.

The flip-flop F2100 is reset by the generation of a signal by the blocking oscillator BO2100 which is triggered from the negative output of amplifier A2101. Amplifier A2101 will receive a pulse to initiate the clearing at various times during the operation. The GCL signal will cause the clearing via buffer diode 2J5L at the start of the operations. A clearing pulse will be fed from the mixer gate M2100 to the input of amplifier A2101 at the end of every record received or transmitted. The mixer gate M2101 will transmit a pulse at the end of the Acknowledge mode at the transmitter. At the end of the acknowledge mode at the receiver, the mixer gate M2102 will pass a pulse. Each time the flip-flop F2100 is set and then reset, a positive going signal is transmitted from the one's output terminal via the amplifier A2108 to the counter C2101. If another error is recorded, then the set and reset cycle of flip-flop F2100 is traversed causing a second error signal as a positive going transient to be recorded in the counter C2101 and the counter C2102. In this manner the counters C2101 and C2102 binary count the errors. When a third error has been counted, both the counter C2101 and the counter C2102 will be in the set conditions and generating the —EEA and —EEB signals respectively. These signals are fed to inputs of buffer B2101. If another error is recorded, then the —ERR signal will be present at the third input to buffer B2101 which operates as a negative gate. Finally, when the clear pulse is generated in the usual manner, that is, the rest pulse for flip-flop F2100, this signal from blocking oscillator BO2100 is transmitted via amplifier A2105 to effectively block the fourth input of buffer B2101 causing the generation of the FCE signal by amplifier A2112 which indicates there have been four consecutive errors. It should be noted that anytime an error is not recorded, the clear signal is transmitted by amplifier A2101 via amplifier A2102 to cooperate with the signal from the zero's output terminal of flip-flop F2100 (the minus ERR signal) to cause a clearing pulse to be fed via clear amplifier A2109 to the clearing terminals of counters C2101 and C2102, causing them to clear back to a count of zero. It should be noted that the occurrence of the GCL signal passes through buffer diode 2J5B to perform the initial clearing of the counters C2101 and C2102.

The chain of logical elements ending at amplifier A2113, amplifier A2111 and flip-flop F2103, is concerned with disconnecting the transceivers from the telephone lines and with reclearing the coupler DV to its initial condition. Amplifier A2113 generates the CLR signal which clears certain counters in the coupler DV. Similarly, amplifier A2111 generates the GCL signal which is a general clearing of other counters throughout the coupler DV. When the flip-flop F2103 is set, the DCL signal is generated, energizing a relay which opens its normally closed contacts causing an open circuit between the lines DCR–2 and DCR–3. The opening of this circuit causes the transceiver DF to disconnect itself from the telephone lines.

The above-described disconnect circuitry is energized by virtue of signals fed from the output of amplifier A2106, the DCM signal. Amplifier A2106 will transmit a signal under certain conditions. When the FCE signal is generated indicating that four consecutive errors have been recorded, a FCE signal is fed via buffer B2100 to the input of amplifier A2106. If a connect error is recorded the CNE signal from amplifier A2122 is fed to buffer B2100. A connect error occurs at the start of transmission when one of several conditions exist: if both the REC and TRS signals are present at mixer gate M2106 there is a connect error because these signals are mutually exclusive. Also, during the interchange of control characters to determine transmitters and receivers at the start of operation, one and only one of the CDB to CDD signals should be present at the receiver. Hence, if more than one of these signals is present, indicating conflicting transmission rates, then one of the mixer gates M2107 to M2109 will transmit a pulse to the amplifier A2122. Also, at this time, one of the CDA to CDD signals must be generated. If none of these signals is generated, then the station has not been told what its function is to be and an error has occurred. Accordingly, mixer gate M2110 transmits a pulse at the end of the mode during which the role of the stations should be established. Under any of these conditions the CNE signal is generated by amplifier A2122, resulting in the disconnect procedure. A disconnect procedure may be initiated if the coupler DV remains in the Connect or Acknowledge modes for a prolonged period of time. Normally, the coupler DV should remain in these modes for approximately two-thirds of a second. However, if the coupler DV remains in either of these modes for a period of time exceeding two seconds then the disconnect procedure will be initiated. To detect this condition, the retriggerable delay-flop RDF2100, having a two-second delay, is used. The retriggerable delay-flop RFD2100 will not initiate a delay period as long as its input is at a negative voltage. If its input goes to ground potential and remains at ground potential for two seconds, a signal is fed from its output via buffer diode 2J5E to initiate the disconnect procedure. The input of retriggerable delay-flop FRD2100 is the gate G2104 which is connected to the minus CON and minus ACK signal lines. During the Connect mode the minus CON signal is at ground potential and passes through gate G2104. Similarly, during the Ackowledge mode the minus ACK signal line is at ground potential and this potential is fed via gate G2104 to the input of retriggerable delay-flop RFD2100. During the absence of both the minus CON and minus ACK signals, their associated signal lines are at negative potentials and consequently the output of the gate G2104 is also at a negative potential. The ETOR signal passing through buffer diode 2J5F will also cause a disconnect; similarly, the SDS signal through buffer diode 2L27H. The last condition for causing the initiation of a disconnect procedure is if there is the absence of data in the A buffer AB for more than thirty seconds. If the A buffer AB contains information, the simultaneous occurrence of the minus EMP and BTH at gate G2101 set the counter C2104, causing a negative voltage to be fed from its one's output terminal via buffer B2105 to the input of retriggerable delay-flop RDF2101. When the A buffer AB is cleared, this is, when its contents are transferred to the B buffer BB, there will be the generation of the EMP signal and the simultaneous occurrence of the EMP signal and the BTH signal at gate G2102 cause the resetting of the counter C2104. The signal from the zero's output terminal of the counter C2104 causes the triggering of the gated delay-flop GDF2100 which now applies a negative voltage to the input of retriggerable delay-flop RDF2101 for two hundred milliseconds. If the A buffer AB did not receive another character, then the counter C2104 will not be set and after the two hundred millisecond period, the input of retriggerable delay-flop RDF2101 will be at a positive potential and if this potential remains for thitry seconds, retriggerable delay-flop RDF2101 will transmit a pulse via buffer diode 2J15M to amplifier A2106, initiating the disconnect procedure.

It should be noted that the gate G2118 has inputs connected to the minus CON, minus IDLE and minus ACK signal lines, assuring that the end-of-mode character from the station then transmitting is only received by the station then receving during the occurrence of the Connect, Idle or Acknowledge modes respectively, by controlling mixer gate M2116 which feeds the EOC signal amplifier A2125.

Either a minus EOB or a minus EOT passes through mixer gate M2106 and is fed to the set input terminal of Counter C2105, causing the generation of the ACK and the minus ACK signals, representative of the Acknowledge mode. At the end of the Acknowledge mode, the REC signal and INE pulse, at the receiver, transmit a pulse via mixer gate M2103 and amplifier A2123 to the reset input terminal of counter C2105. The counter therefore resets, ending the Acknowledge mode. At the transmitter the TRS and EOC signals at mixer gate M2104 perform this function. If the transmission of the block containing the end of transmission end sentinel characters was error-free, then the EOT pulse, in the absence of an ERR signal, generates the ETT signal which is fed to an input of gate G2107. At the end of the Acknowledge mode the pulse transmitted by amplifier A2123 in addition to being fed to the reset terminal of counter C2105, is fed to a second input gate G2107, causing the transmission of a BTH timing pulse to the amplifier A2104 which generates the EOTR signals that initiate the disconnect routine.

COUPLER CONTROLS–3 CK–3 (FIG. 24)

The cascaded chain of counters C2204 to C2208 across the top of the figure are connected to form a five stage binary counter.

The circuitry associated with the binary counter generates the time slots for the control characters which are generally transmitted immediately following the transmission of the reference characters. The counters C2204 to C2208 are initially cleared by a GCL signal fed to one input of buffer B2225 at the start of operations. However, the main clearing occurs when the RTT signal is generated at the start of a turnaround cycle. The RTT signal, when received by a second input of buffer B2225 is passed to clear amplifier A2239 whose ouput is connected to the clear inputs of the counters.

The counters count BTH signals which occur once per character time. The minus BTH signal line is connected to one input terminal of buffer B2202 whose output is connected via amplifier A2238 to the input terminals of counter C2204 acting as a binary counter. The minus BTH signals will not affect the counters until the disappearance of the TRF signal at buffer B2203 which is present during the transmission of reference characters. It should be noted that: the presence of the minus STS signal insures that counting occurs only during a turnaround time; the TRZ signal acts as a time delay interlock.

When the first BTH signal is counted, counter C2204 generates the CTA and minus CTA signals; at this time neither the CTB and minus CTB signals are generated by counter C2205, nor are the CTC and minus CTC signals generated by counter C2206, etc. This state of the signals is indicative of the first control character time during which a receive, transmit or an error character is generated. When the second BTH signal is generated the counter C2204 stops generating the CTA and minus CTA signals and the counter C2205 generates the CTB and minus CTB signals. The state of counter C2205 remains unchanged. This state of the signals is indicative of the second control character, i.e., the end of mode character. The absence of the CTA signal and the presence of the minus CTB signal at inputs to buffer B2216 causes the generation of the INE signal by amplifier A2210 to indicate the end of the mode to the coupler DV which has been transmitting. The IRF signals generated by amplifier A2211 are used when it is necessary to intersperse the data characters transmitted with reference characters when the receiver receives at a rate slower than the transmitter can transmit. In particular, mixer gate M2223 passes a pulse every second character transmitted to generate a reference character as every third character transmitted when the CDB signal indicates the receiver can only receive at two-thirds the rate of the transmitter. Note the minus IRF clears the counters C2204 to C2208 whenever they reach a count of two.

The circuitry at the upper right of the figure generates the bit timing pulses associated with each character. The decoder D8U–2200 decodes the TMA, TMB and TMC signals into their eight possible combinations BTA to BTH which are the outputs of amplifiers A2201 to 2208 respectively.

The remainder of the circuits of the figure may be considered as the end circuitry which receives the end sentinel characters from the B buffer as the BBA to BBF signals which are decoded in ENA and EMA signals by diode matrix DM2200 and has to determine whether they occur in the particular sequences to indicate whether the end of a record or the end of the transmission has been reached. It should be noted that it is possible for end sentinel characters to be imbedded in portions of the records. However, the particular combinations of three end sentinel characters, serially following each other, is unique for the end of a record and another particular combination is unique for the end of transmission. It is the function of the end circuitry to test for these unique sequential combinations.

The end sentinel characters are transmitted on the ENA, ENB, ENC, EMA, EMB and EMC signal lines. In the example under consideration ENA=ENB=ENC, and EMA=EMB=EMC. The end of record combination is three sequential ENA characters. This combination is tested for by the flip-flops F2225, F2226 and F2227. If an ENA character is first received, flip-flop F2225 will be set. The zero's output terminal of flip-flop F2225 is coupled to the allow set input terminal of flip-flop F2226. If the next character received is the end sentinel character, characterized by the ENA signal, the flip-flop F2226 will set. The zero's output terminal of the flip-flop F2226 is connected to the allow set input terminal of the flip-flop F2227. If the third end sentinel character is represented by an ENA signal, then the flip-flop F2227 will set, causing the generation of the EBD signal by diode matrix DM2201 which effectively coincidence gates the EBA, EBB and EBC signals. Since each succeeding flip-flop cannot be set unless the previous flip-flop had been set, it is apparent that the desired sequential combination of end sentinels and only that combination can cause the generation of the EBD signal. For example, if the ENA signal had not been received, but an ENB signal is then received, the flip-flop F2226 cannot set, because its allow set terminal is receiving at this time an inhibition signal.

Simultaneous with the generation of the ENA and EMA signals is the generation of the SPL pulses. An SPL pulse will pass through mixer gate M2234 to amplifier A2240. The output of amplifier A2240 is connected to the reset input terminals of the flip-flops F2225 to F2227. Therefore, it is possible that there will be a simultaneous set and reset of the flip-flops. However, the set condition predominates. It should therefore be noted that the flip-flops F2225 to F2227 operate somewhat in the manner of a shifting register.

The flip-flops F2228 to F2230 operate in the same manner as the flip-flops F2225 to F2227. The function of the flip-flops F2228 to F2230 is to detect the particular sequential combination of end sentinels which is indicative of the end of transmission. When this combination is detected by diode matrix DM2201 the ETD signal is generated, indicative of the end of transmission combination. Either the EBD or the ETD signal passes through buffer B2217 to cause the generation of the ENS signal by amplifiers A2213 and A2214. The ENS signal is a signal which indicates that either the end of a record or the end of transmission has been reached. It should be noted that the minus ENS signal is fed to the other input of mixer gate M2234 to prevent any further resetting of the flip-flops so that the end sentinel signal ENS remains present until the record containing its is completely processed. This occurs when a CLE signal is fed via buffer B2219 to the amplifier A2240. The second input the buffer B2219 receives, the GCL signal, which is the initial clear at start of the operation.

Whenever a MAX signal is being generated, indicating the capacity of the memory is being approached, it is received at gate diode 2K18D to gate the next occurring EBD end of record signal received at gate G2205 through to amplifiers A2215 to A2216 to generate the EOB signal. The occurrence of an ETD signal at gate G2206 causes the generation of the EOT signal by amplifiers A2217 and A2218. It should be noted that the CLE signal generated by blocking oscillator BO2203 is a strobing pulse for gates G2205 and G2206.

The coincidence of the EBD and MAX signals at gate G2207 passes a signal through buffer B2218 to cause generation of the STP signal by amplifier A2219. The ETD signal at the other input of buffer B2218 has the same effect.

The circuit centered around amplifiers A2225 and A2211 generates the EMP signals whenever the A buffer is empty as indicated by the absence of all the minus BAA to BAG signals at gate G2204.

A AND B BUFFERS (FIG. 25)

The extreme left hand portion of the figure is the A buffer AB which comprises seven bit storage units for receiving the bits of a character from one of three sources and transmitting these bits in parallel the next character time later to the B buffer BB. The bits of the character are received serially from the transceiver DF when the coupler DV is operating as a receiver and converts these bits of the character to a parallel representation. When the coupler DV is acting as a transmitter, the bits of the character are received in parallel from the memory MEM and are fed at the next character time later, in parallel, to the B buffer BB.

More particularly, a typical bit storage unit comprises the flip-flop F2311, whose set input terminal is connected to the output of amplifier A2301. The input of amplifier A2301 is connected to the outputs of mixer gate 2L16A, and the mixer gate M2299. The reset input terminal of flip-flop F2311 is connected to the BAR signal line. Flip-flop F2311 has its one's output terminal connected to the BAA signal line and its zero's output terminal to the minus BAA signal line.

When the coupler DV is operating as a transmitter, the mixer gate M2299 is operative. During this time the signals representing the least-significant bits of the character from the memory MEM are fed via the NDT1 signal line to a first input of mixer gate M2299. At the same time, there is transmitted a strobing pulse via the STR signal line to the second input of the mixer gate M2299. If at this time, a signal is present on the NDT1 signal line, a pulse is transmitted via the amplifier A2301 to the set input terminal of flip-flop F2311, causing the generation of the BAA and minus BAA signals. A similar phenomena occurs at the bit storage unit represented by flip-flop F2312, except that its associated mixer gate receives the second least significant bits from the memory MEM via the NDT2 signal line; in other words, the bit storage units simultaneously receive the bits via the NDT1 to NDT6 signal lines at their associated mixer gates. The other inputs of these mixer gates are strobed by the STR pulses. In this manner the character is stored in the seven flip-flops F2311 to F2317.

When the coupler DV is acting as a receiver, the mixer gate 2L16A of the least significant bit storage is operative. The first input terminal of the mixer gate 2L16A is connected to the output of amplifier A2346. The second input terminal is connected to the BTA signal line. The bits of the character being received are fed serially from the output of amplifier A2346 to the first input of mixer gate 2L16A. However, it should be noted that the BTA signal is a timing signal which occurs only when the least significant bit of the character is received. Therefore, when the least significant bit of the character is received, the BTA signal will be present at mixer gate 2L16A, causing this bit, if it is a binary one, to pass as a pulse via amplifier A2301 to set the flip-flop F2311. If this bit happened to be a binary zero, the flip-flop F2311 would not be set. At the same time the bits representing the character are also fed to the first input of the mixer gate M2298 of the second least significant bit storage. The second input to the mixer gate M2298 is the BTB pulse which is characteristic of the second least significant bit. If this bit is a binary one, a pulse passes through mixer gate M2298 at this time, causing the setting of the flip-flop F2312. If this signal is binary zero, then the flip-flop F2312 remains unset. A similar phenomena occurs for the remaining bit storages. It should be noted that the second input of their associated mixer gates receive respectively the BTC to BTG pulses which are indicative of unique bits of the character. In this manner, the characters that are received serially are converted to a parallel representation and temporarily stored in the flip-flops F2311 to F2317 for transmission to the B buffer BB during the next character time.

The signals representing the characters are received serially from the transceiver DF as the DIND signal and are amplified and inverted by amplifiers A2330 and A2331 to become the DIN signal so that their polarity conforms with the polarity of information transmitted throughout the coupler DV. The serial representations of the character are then fed via the minus DIN signal line to one input of buffer B2310. The combination of buffer B2310 and amplifier A2346 acts as a negative gate and will pass the bits representing the character provided the coupler DV is in synchronization and is not transmitting information, that is, as controlled by the absence of the RTS signal. The minus STB pulse at another input of buffer B2310 is to permit precise timed strobing of the informaton. The ILB signal at gate diode 2L27F prevents the reception of extraneous characters, after the longitudinal parity character has been received. This is a safeguard against noise on the line.

After the bits of the character have been set up in the flip-flops F2311 to F2317, it is necessary to clear these flip-flops. The clearing of the flip-flops performs two functions. As the flip-flops that were set, clear, the polarities of the signals on the lines BAA to BAG change direction. In particular, if any flip-flop is set, say for example, flip-flop F2311, when it is reset, its one's output will transmit a positive going change of voltage. These positive going changes of voltage are used to set another set of flip-flops which comprise the B buffer BB. In this manner, the information is transmitted from the A buffer AB to the B buffer BB. The resetting of the flip-flops F2311 to F2316 also prepares them to receive the bits of the next character.

The flip-flops F2311 to F2316 are reset by a BAR signal which is generated by amplifier A2308 whose input is connected to several outputs. The GCL signals feeding buffer diode 2K18E is used to clear initially at the start of operations. Gate G2320 is employed to generate the BAR signals when the coupler DV is acting as a receiver. Mixer gate M2303 is used to clear when the coupler DV is a transmitter.

It should be noted mixer gates M2320 and M2340 which feed amplifier A2307 insure that the desired parity is inserted in the character.

It should further be noted that the third inputs to the amplifiers A2301 to A2306 are the MGA to MGF signals respectively and are associated with case shifting characters.

The B buffer BB, occupying the middle of the figure, generally accepts the bits of the character in parallel from the A buffer AB and transmits these bits in parallel to the serializer SZ or to the memory MEM.

The B buffer BB comprises seven bit storage units which are similar to the bit storage units of the A buffer AB except that they include controls which regulate the times at which information may be accepted by the B buffer BB.

A typical bit storage unit for the least significant bit will now be described. Generally, information for storage in this bit storage unit is received via the BAA signal line from the A buffer AB and transmitted through the buffer diode 2L21A to the amplifier A2338 whose output is connected to the set input of flip-flop F2318. When, however, an ignore character is to be inserted, the least significant bit of the ignore character is fed via the ECA signal line to the amplifier A2338.

It should be noted that the output of amplifier A2337 is fed to the allow set inputs of each of the flip-flops F2318 to F2324. These flip-flops will not accept information while the signal on the output of the amplifier A2337 is at a negative potential. During Transmit mode the TRM signal will be present at inputs to buffer B2318. If, for example, the TRM signal is present, then the output of the amplifier A2337 is at ground potential and the flip-flops will accept information. When the coupler DV is acting as a receiver, the potential of the output of amplifier A2337 becomes dependent on gate G2312. The potential of the output of gate G2312 will normally be negative during the receive operation except for the single character time during which the LPT signal is received into the A buffer AB. At this time, the B buffer BB will not accept information when the A buffer AB is cleared.

Information is transmitted from the B buffer BB to the memory MEM, when coupler DV acts as a receiver or to the serializer SZ when the coupler DV acts as a transmitter, through the agency of the resetting of the flip-flops F2318 to F2324. The flip-flops F2318 to F2324 are reset by a signal from amplifier A2345, whose output is connected in parallel to the reset terminals of said flip-flops. When coupler DV is operating as a receiver the CLB signal from control KON is fed to buffer diode 2J15F for clearing. When the coupler DV is operating as a transmitter a pulse is transmitted by the gate G2315 during the coincidence of the BTG timing signal and the TRM signal which is present during the entire Transmit mode. The RTT signal fed to buffer diode 2L7L is an initial clear.

The circuitry on the upper right of the figure is a three stage binary counter which is used to count strobe pulses that become the character bit timing pulses.

More particularly, the three stage binary counter centered around cascaded counters C2300 to C2302 operates as follows: After the termination of the INH signal which is received at buffer B2304, the counters C2300 to C2302 start counting STB pulses. As the STB pulses are counted, combinations of TMA, TMB and TMC signals and their negative counterparts are generated. These signals are fed to a decoding matrix to cause the generation of the BTA to BTH pulses. The first STB pulse causes the counters to assume such a state that the BTA pulse is generated. The next STB pulse causes the generation of the BTB pulse, etc. The eighth STB pulse causes the generation of the BTH pulse and the cycle repeats.

When the coupler DV is to operate with a transmitter it is not necessary to constrain the counting of the STB pulses. However, when the coupler DV is operating with a receiver the counting must be synchronized with the coupler of the transmitter. The synchronization is accomplished in the following manner: When the coupler DV is in a receiver, the RTS signal is not generated and it will be assumed that there is no synchronization error. Therefore, the gate G2304 is dependent upon the minus BTH pulse and the DIN signals. The minus SYN signal only permits synchronization when the timer TM is initially out of synchronization. The STB pulse that is fed to this gate is only used as a sampling pulse. It should be recalled that at this time, reference characters are being received and that the reference characters are basically only BTH pulses; that is, a binary one in the most significant bit position and binary zeros in the remaining bit positions. If, when the most significant bit of the reference character is received, the counters are in such a state as to cause the generation of anything but the BTH pulse, the minus BTH signal line will be at a negative voltage, causing the passage of the eighth bit of the reference character via the DIN signal line to trigger the blocking oscillator BO2303 which transmits a pulse via the buffer diode 2J5H to the amplifier A2347, which clears the counters C2300 to C2302 to the state which would cause the generation of the BTH pulse. In this manner, synchronization by character is obtained. It should be noted that if the BTH pulse was being generated at the time the most significant bit of the reference character is received, no pulse would pass through gate G2304, but because the BTH pulse is being generated the counters C2300 to C2302 are in the cleared state anyway.

The remaining circuitry is a synchronization detector which indicates when the receiving coupler is in synchronization with the transmitting coupler, and if it loses synchronization, it generates a signal to indicate that there is a synchronization error. During the reception of reference characters, the above described synchronization occurs in the counters C2300 to C2302 so that they effectively cause the generation of a BTH pulse that occurs when the most significant bit of the reference characters are received. The minus BTH pulse is fed to the allow set input of the counter C2304. In other words, whenever the BTH pulse is present, the minus BTH pulse is at ground potential, allowing the setting of the counter C2304. When synchronization is attained at the coupler DV which is associated with a receiver, the most significant bit of the reference character passes through the gate G2301 causing the setting of the counter C2304 and the generation of the SYN signal.

If at any time thereafter, synchronization is lost, the BTH pulses will not occur simultaneously with the most significant bits and a pulse will pass through the gate G2302 to reset the counter C2304. The zero's output of the counter shifts from ground to a negative voltage, triggering the blocking oscillator BO2303, causing the generation of an SYE pulse which is fed to the buffer B2304 to force the counters back into synchronization.

The counter C2304 is initially cleared by either the RTT or GCL signals fed via buffer B2300 to clear amplifier A2301 whose output is fed to the clear input of said counter.

PARITY CIRCUITRY PC
(FIGURE 26)

The parity circuitry PC checks for longitudinal and vertical or transverse parity of characters passing through the coupler DV. It also accumulates the longitudinal parity count for the records. The parity circuitry PC further generates the signals characteristic of the transmission time of the longitudinal parity character, namely, the LPT time, the record count character time, i.e., the SPC time, the ignore character times, i.e., ILB-1, 2, 3 times, and the end of these suffix characters time denominated by the LPL signal.

Referring more particularly to FIGURE 26, the accumulation of the longitudinal parity for the blocks is performed by the counters C2400 to C2406. Each of these counters operate as a one stage binary counter which counts the bits recorded in respective bit positions of the characters. For example, the counter C2400 counts the bits recorded in the least significant bit position. Each of the counters C2400 to C2406 has its set input terminal coupled respectively to the BAA to BAG signal lines from the A buffer AB. At the end of the record the counters will record either a one or zero, indicating that the sum of the bits in the associated bit position is odd or even. The outputs of these seven counters form the longitudinal parity character. At the transmitter, this character is transmitted following the end sentinel of the record. It should be noted that the counters C2400 to C2406 are initially cleared by a signal from clear amplifier A2406. The initial clearing occurs at the end of a mode when the EOC signal is generated, and fed to buffer diode 2L21L, or after the longitudinal parity character has been utilized by the generation of the LPL signal which is fed to buffer diode 2L21H whose output is connected to the input of clear amplifier A2406.

At the receiver, a longitudinal parity count is accumulated and when the longitudinal parity character is received, the count plus the value of the longitudinal parity character should make the final count such that each of the counters C2400 to C2406 is in its reset stage, indicating that the total count is equivalent to all zeros. If there is an error in the count, then one of the counters will not be in this condition. Therefore, the zero's output of each of the counters C2400 to C2406 is fed as an input to the gate G2402. If during longitudinal parity time the above condition exists, an error will be indicated by the generation of the minus LPR signal by the amplifier A2402, indicating a longitudinal parity error.

Mixer gates M2400 and M2401 check for vertical or transverse parity of the characters in coupler DV. If the vertical parity is assumed to be even, the EVEL signal will be present at mixer gate M2400 causing it to be operative. If the vertical parity of any character is not even, then the EPE signal will be present at the second input to the mixer gate M2400 causing the transmission of a pulse to amplifier A2408. Similarly, if odd parity is being checked, the ODDL signal will be present at a first input to mixer gate M2401 and if a character is sensed not having an odd parity, the OPE signal will be present, causing a pulse to be transmitted to the amplifier A2408. It should be noted that each of these mixer gates is sampled by an SPL pulse which occurs during each character time. The SPL signal is derived from the EMP signal which indicates that a character has been transferred from the A buffer AB to the B buffer BB. The EBP signal is fed via blocking oscillator BO2400 and amplifier A2404 to blocking oscillator BO2401 which generates SPL pulses that are fed to amplifier A2409 which generates the minus SPL pulses fed to blocking oscillator BO2402 which generates the SPLD pulses.

The suffix character times are generated respectively by the flip-flops F2407 to F2410. When the ENS is generated, a pulse passes via gate G2411 to set flip-flop F2407 which generates the LPT and minus LPT signals. The LPT signal is connected to the SILB signal line by diode matrix DM2403. It should be noted that the flip-flop 2407 is set at BTG time. The next BTG pulse causes the resetting of the flip-flop F2407 and the setting of the flip-flop F2408 whose set input terminal is connected to the SILB signal line. With the flip-flop F2408 set, the ILB and minus ILB signals are generated. The next occurrence of the BTG signal resets the flip-flop F2408 and causes the setting of the flip-flop F2409 whose set input terminal is connected to the ILB signal line. When the flip-flop F2409 is set, the ILB2 and minus ILB2 signals are generated. The next occurring BTG resets the flip-flop F2409 and causes the setting of the flip-flop F2410 whose set input terminal is connected to the ILB2 signal line. The next occurring BTG resets flip-flop F2410 and sets flip-flop F2403 whose set input terminal is the LPLS signal line that is in fact the ILB3 signal line. The next occurring BTH signal causes the resetting of the flip-flop F2403. Flip-flop F2403, when set, generates the LPL and minus LPL signals, indicating the end of the suffix characters.

The flip-flop F2400B is concerned with a paper tape output system and is not pertinent for this discussion.

The remaining input circuitry associated with diode matrix DM2403 is associated with optional and paper tape output features of the system and is not pertinent for the present description of the inventions.

The diode matrix DM2401 detects particular characters and generates signals associated either with case shifting or with paper tape output systems and is therefore not pertinent for the description of the present inventions.

It should be recalled that whenever a transverse parity error is detected in the coupler DV, a minus VPE signal is generated which passes through gate G2409 to set counter C2410 which generates an IEC signal. The IEC signal for the present discussion is used to force incorrect parity in the character then being transferred and stored in the memory MEM.

CHARACTER COUNTER KK (FIG. 27)

During the Receive and Transmit modes the character counter KK counts the number of characters handled and when a predetermined count is reached, alerts circuitry to sense for the end of the record then being handled. When the end of this record is reached, signals will be generated which result in the initiation of the Acknowledge mode and establishment of a block.

Referring to FIGURE 27, a thirteen stage binary counter is shown comprising the counters C2505 to C2517 coupled in cascade to count the number of characters transferred. The input to the first counter C2505 is the amplifier A2500 whose input is fed by the output of buffer B2501. The actual counting input is the signal minus SPL which is a pulse that is generated as each character is transmitted from the A buffer AB to the B buffer BB. The ENS signal which is fed to the buffer diode 2K18E, inhibits counting when the end sentinel characters are detected. The output of mixer gate M2508 permits character counting only during the Receive mode and the Transmit mode. The binary counter is initially cleared by a GCL signal fed via one input of buffer B2503 to the clear amplifier A2501. The RTT signal clears the counter at the start of a Transmit mode. The second input to amplifier A2501 is connected to the output of blocking oscillator BO2500 whose input is connected to the minus EOB signal line. The third input to amplifier A2501 is the SPWR signal line.

The binary counter counts the characters passing through the coupler DV and generates combinations of the NTA to NTN signals for each different count. Two counts are important: a MAX count which is less than the number of characters than can be stored in the memory, say a count of 900 (the memory can store 1024 characters); and a MXC count of say 950. The MAX count is used to alert circuitry for the next end of record to create a block. The MXC count is used when unusually long records or blocks are handled, to insure that the memory doesn't overflow as described above. Diode matrices DM2500 and DM2501 detect the coded combinations of NTA to NTN signals representing the MAX and MXC counts and can be considered two gates, each decoding one of the appropriate combinations. The SPLD signal is used to probe the gates. When the MAX count is reached, a pulse passes through mixer gate M2500 to set counter C2500B to remember that the MAX count has been reached. When the ACK signal is terminated at the end of the Acknowledge mode, the counter is reset.

During the "long block" routine, the character count reaches the MXC count and an Acknowledge mode will be forced before the end of block or record is reached. When the MXC count is reached, a pulse passes through amplifier A2500B to set counter C2501B generating the MXC signal which is fed to gate G2500B which at the receiver (the RCV signal) causes counters C2502B and C2503B to count three characters for safety and then generate the SPWR signal by amplifiers A2501B and A2502B. The SPWR signal, as heretofore described, causes the writing of the continuation of block control character.

The counters 2F6A, 2F6C, 2F6B, 2F5A, 2F5B are connected to form a five stage binary counter which will count records as indicated by the ILB signal at gate 2F7A. The outputs of these counters are decoded to a particular count number by diode matrix 2F4B to generate the FMAX signal which will set counter C2500B under a particular condition. This condition is associated with paper tape options and only comes into play when the number of characters in a record is so small that the total number of characters in all the records of a block is less than the MAX count.

The EVEL and ODDL signal lines from diode matrix DM2501 are predeterminedly connected to minus 6 volts or ground to indicate the type of parity to be used in the coupler. The LPLS signal line is connected to the ILB3 signal line by diode matrix DM2F4B.

Parity checker PCK2500 checks the parity of the characters in the B buffer and depending on the parity of the six least significant bits generates either an EPE or OPE signal.

SERIALIZER SZ (FIG. 28)

The serializer SZ generally receives the characters with their bits in parallel from various units of the coupler DV and transmits them serially to the transceiver DF.

The contents of the B buffer BB is fed in parallel to the various mixer gates of the serializer SZ. In particular, the least significant bit, as the BBA signal, is fed to one input of mixer gate M2600. The second least significant bit, as the BBB signal, is fed to one input of the mixer gate M2603. The third least significant bit, as the BBC signal, is fed to one input of the mixer gate M2606. The next more significant bit is fed to one input of the mixer gate M2609 as the BBD signal. The BBE signal, representing the next more significant bit is received at one input of the mixer gate M2611. Mixer gate M2615 receives the next more significant bit as the BBF signal. The BBG signal is fed to one input of the mixer gate M2618. It should be noted that each of these mixer gates has a second input terminal which receives the TRD signal so that these mixer gates can only pass signals during the Transmit mode. It should also be noted that each one of these mixer gates has a third input connected to one of the BTA to BTG signals. It should be recalled that these signals occur sequentially, one bit time apart, and represent the bits of a character, with the BTA signal representing the least significant bit, the BTB representing the next more significant bit, etc. Therefore, during the Transmit mode when the B buffer BB is presenting the bits in parallel to the serializer SZ, if the bit in the least significant bit position is a binary one, then a pulse is passed from mixer gate M2600 through a buffer diode to amplifier A2604 and is transmitted on the TDAD signal line to the transceiver DF. During the next bit time, the BTB signal will gate the bit present at mixer gate M2603 through a buffer diode to the TDAD signal line which is the output of amplifier A2604. Following the occurrence of the BTG signal, there is generated the BTH signal which is considered the most significant bit of the eight bit characters. The BTH signal is always fed through buffer diode 2L7M. In other words, regardless of the character being transmitted, there will always be a binary one in the most significant bit position.

At the end of each block, the longitudinal parity count is also transmitted to the receiver. The longitudinal parity count is received from the parity circuitry PC by the parallel combination of the LPA to LPG signals which are fed to one input respectively of the mixer gates M2602, M2605, M2608, M2620, M2614, M2617 and M2619. It should be noted that each of these mixer gates has a second input connected to the LPT signal line which controls the time of transmission of the bits. In addition, each one of these mixer gates receives respectively the BTA to BTG signals which serialize the bits in the same manner that the bits from the B buffer BB are serialized.

The mixer gate M2607 transmits a pulse indicating the other station is to be a transmitter. The mixer gate M2601 will transmit a control character to indicate to the other station that it is to act as a receiver. Mixer gate M2612 transmits an end of mode pulse during the Bid or Allow modes and the mixer gate M2613 transmits an end of mode pulse at the end of the Acknowledge mode. If an error had been received during the reception of the information, then during the Acknowledge mode the mixer gate M2616 will transmit an error character.

Amplifier A2601 amplifies and inverts the DCL signal to become the DCLR signal to activate a disconnect relay on the relay panel RP.

The remaining circuitry is concerned with energizing various indicator lights and is not pertinent to the description of the inventions.

THE SYNCHRONIZER SK (FIG. 29)

Synchronizer SK is basically a clock or strobe pulse generator for generating the basic timing for each station.

The synchronizer SK is dependent on two sources for the strobe pulses STB. When the coupler DV operates as a transmitter, during the Transmit mode, the strobe pulses are generated from a crystal control oscillator CLK which has a precisely controlled frequency of 1200 pulses per second, wherein each of said pulses has a duration of four microseconds. Thus, it is seen that the crystal control pulse generator CLK has its output coupled to a first input of the mixer gate M2800. The second input of the mixer gate M2800 is coupled to the positive STS signal. Thus, during a Transmit mode, the STS signal will be present and the mixer gate M2800 will pass the pulses from the crystal control pulse generator CLK to the input of amplifier A2803 causing the generation of the strobe pulses STB. During this time the minus STS signal blocks the mixer gate M2801. When the coupler DV is in the Receive mode the STS and minus STS signals will not be present and mixer gate M2801 will pass STBR signals to the amplifier A2803. The STBR signals are the second source of strobe pulses and are generated to be in synchronism with the strobe pulses generated by the transmitter.

It is necessary that there be bit synchronization between the timer of the transmitter and the timer of the receiver because of the scheme employed in transmitting the information. The information is transmitted according to a non-return to zero method, wherein a voltage of one polarity is transmitted for a binary zero and a voltage of another polarity is transmitted for a binary one.

The remainder of the synchronizer SK provides means for obtaining bit synchronization during the reception of data. In particular, signals representing the received information are received in inverted and uninverted form as the DIN and minus DIN signals by the synchronizer SK. When the first voltage transition from ground to a negative voltage is present on the minus DIN signal line, the blocking oscillator BO2800 is triggered, generating the DT signal, causing the setting of the flip-flop F2800 whose set input is connected to the output of blocking oscillator BO2800. The zero's output of flip-flop F2800 goes to zero volts and this voltage is passed via buffer B2800 and amplifier A2800 to the input of multivibrator CMV1. The positive going voltage turns the multivibrator CMV1 on and it starts free running at a pulse repetition rate of twenty-four hundred pulses per second. The pulses generated by the multivibrator CMV1 are fed to the set input terminal of the counter C2802 which acts as a binary counter. The first pulse causes the one's output of the counter C2802 to shift from a negative voltage to ground, triggering the blocking oscillator BO2804 which generates a PE pulse. When the next pulse is received from the multivibrator CMV1, the zero's output of the counter C2802 switches from ground to a negative voltage, triggering the blocking oscillator BO2805 which generates a STBR pulse. In this manner, alternate pulses from the multivibrator CMV1 cause the generation of two series of pulses; one denominated PE pulses, the other denominated STBR pulses. It should be noted that the first of the PE pulses occurred substantially simultaneous with the first received data edge and these pulses will therefore be an indication of the predicted edges of each of the succeeding received bits. It should also be noted that the STBR pulses were generated approximately at the middle of the received data pulses and these STBR pulses will be used for strobing received information, as was described above.

Whenever a data edge is received, either blocking oscillator BO2800 or blocking oscillator BO2801 will transmit a pulse via the buffer diodes to trigger blocking oscillator BO2802 which transmits a pulse to the set input terminal of counter C2800. The STBR pulses are fed to the reset terminal of counter C2800. Therefore the one's output of counter C2800 will transmit a pulse starting with the reception of a data edge and terminating with the receipt of an STBR pulse. Whenever the counter C2800 is reset it will transmit a positive going transient which triggers the counter C2801 to the set state. The next occurring predicted edge signal, PE pulse, will reset the counter C2801. Therefore, the one's output of the counter C2801 will transmit a pulse having a duration which is precisely equal to the time duration between two pulses generated by the multivibrator CMV1. The one's output of counter C2800 is fed to one input of the voltage comparator CMV2 while the one's output of counter C2801 is fed to the other input of voltage comparator CMV2. This comparator essentially subtracts the two voltages to generate an error and correction signal. If the pulse widths are exactly equal, no error or correction voltage will be generated. However, if the pulse widths are different, an error voltage is generated which is fed via the VC signal line to the multivibrator CMV1 causing it to speed up or slow down as indicated by the polarity of this voltage. In this manner, the STBR pulses and therefore the STB pulses are forced into synchronization with the strobe pulses of the transmitter. It should be noted that the details for the multivibrator CMV1 and the voltage comparator CMV2 are both fully described in the appendix.

It should be noted that amplifier A2802 amplifies and inverts the RTS signal which becomes the RTSD signal for transmission to transceiver DF.

CONTROL PANEL CP (FIG. 30)

The control panel CP as shown in FIGURE 30, comprises primarily a plurality of switches whose purpose is to set initially the coupler DV to particular modes of operation.

More particularly, the control panel CP includes the calling station start switch SW7 which is a switch of the spring-return type. The switch SW7 is shown in its normal position with the moving contact in contact with the upper fixed contact returned to minus six volts. When the switch SW7 is depressed the moving contact is connected to ground potential and this potential is fed via the MAL signal line to initiate the operation at the master station MS. On its second bank the DCR–1 and DCR-2 leads from transceiver DF are close circuited.

The switch SW8 is a toggle switch which determines whether the coupler DV is to operate as a transmitter or a receiver. When the moving contact of the switch SW8 is in the position as shown, the coupler DV will act as a transmitter and the TRSM signal line will carry a voltage of minus six volts, whereas the RECV signal line will be at ground potential. With the switch SW8 in the down position, the coupler DV will operate as a receiver and the voltages on the TRSM and RECV signal lines are interchanged. The switch SW9 is an initial clear switch of the spring-return type. When the switch is depressed and released, a transient voltage is fed via the plus 20S signal line to all counters and flip-flops of the system to perform an initial clear. The retransmit switch SW10 is a toggle switch which, when the moving contact is in the down position, causes the system to perform retransmissions of blocks whenever an error is sensed.

The copy switch SW11 and the continuous/one block copyswitch SW12 are concerned with a punch paper tape module and are not pertinent in the present system.

The forward one block switch SW1 is concerned with moving the magnetic tape one block forward. The reverse one block switch SW2 is concerned with reversing the magnetic tape one block.

The depression of the write end data switch SW4 permits the automatic writing of an end of file special character on the magnetic tape.

The alarm off switch SW14 is provided to disconnect power to an audible alarm on the relay panel RP.

The power on switch SW15 is the main power switch for the system.

The write on switch SW5 is provided to controllably permit erasing of portions of the magnetic tape.

It should be noted that the remainder of the control panel CP includes a plurality of indicator lamps to give a visual indication of many conditions in the system.

MAINTENANCE PANEL MP (FIG. 31)

This panel contains a plurality of switches that are used solely during test operations and are not pertinent to the present discussion but are shown for the sake of completeness.

RELAY PANEL RP (FIG. 32)

Alternating-current power for the system is received at terminals AC–H and AC–N. Power is actually applied by closing the power on switch on the control panel CP which close circuits the lines PSW–1 and PSW–2 energizing relay K1, causing the feeding of power into the system.

The alternating-current power also passes through transformer T1 to provide indicator lamp power at terminals TB2–1 and TB2–2.

Relay K3 is concerned with providing an automatic initial clear to the flip-flops and counters of the system.

Relay K2 is the disconnect relay for the transceivers. In the deenergized state the contact 6 is connected to the contact 7 causing a connection between leads DRC-2 and DRC–3 of the transceivers. These leads maintain a holding circuit therein, which as long as it is present keeps the transceivers on the telephone lines. However, if because of previously described error detections a disconnect routine is initiated a DCLR signal is generated which energizes relay K2. Accordingly, the connection between contacts 6 and 7 open, causing the disconnection of the transceivers from the telephone lines TL1 and TL2.

The circuitry in the upper right of the figure is concerned with an electromechanical block counter which is not pertinent to the present inventions.

SLAVE STATION SS'

The Slave Station SS' includes the following elements:

(1) Transceiver DF' which is identical to the transceivers described herein as well as in the copending application of E. Leonard et al.

(2) Tape Reader TR' is identical to the tape readers described in the copending application of E. Leonard et al.

(3) Reader Controls RC is identical to the reader controls shown in FIGURE 20 of said copending application except that the input terminal of amplifier A691 is also connected to the IA691 signal line.

(4) Buffers and mode controls BAMC includes all of FIGURES 8, 9, 10, 11, 12, 13, 14, 16, 17, 18, 19, 20, 21, 22, 23, and 24 of said copending application.

(5) Counter and time interval generator CTIG is shown and described in detail in FIGURE 33 of the instant application.

CONTROL AND TIME INTERVAL GENERATOR CTIG (FIGURE 33)

During the Receive and Transmit modes the control and time interval generator CTIG counts the number of characters handled and when a first predetermined count is reached, alerts circuitry to sense for the end of the record being handled. When the end of this record is reached, signals are generated which result in the initiation of the Acknowledge mode. It should be recalled that the Acknowledge mode may also be initiated by end sentinel signals which indicate the end of transmission instead of the end of a record. The control and time interval generator CTIG also includes circuitry for sensing the occurrence of these end sentinels. In addition there is included means for detecting a second predetermined character count which is greater than the first so that if a "long" block is being read a time interval can be generated during which controls suspend the reading of characters from the tape reader TR'. At the end of the Acknowledge mode, if the transmission had been error-free, a signal will be generated initiating the sequence which ends with the stations being disconnected from the telephone lines.

Referring to FIGURE 33, the N-stage binary counter BC300 counts the number of characters transferred. It should be noted that the N-stage binary counter BC300 may have any desired number of stages since the predetermined count can be selected to have any value to provide an optimum record length. The input to the binary counter BC300 is the amplifier A367 whose input is fed by the output of buffer B301. The actual counting input is the signal minus SPL which is a pulse that is generated as a character, transmitted from the A buffer AB to the B buffer BB. The ENS signal which is fed to a second input of the buffer B301, inhibits counting when the end sentinel characters are detected. The third input to the buffer B301 is the output of gate G308 which permits character counting only during the Receive mode, the Transmit mode or the search-edit operations. The N-stage binary counter BC300 is initially cleared by a GCL signal fed via one input of buffer B303 to the clearing amplifier A368. The RTT signal clears the counter at the start of a Transmit mode. The third input to buffer B303 is connected to the output of blocking oscillator BO4–310 whose input is connected to the output of mixer gate M367. Mixer gate M367 transmits a pulse at the end of the reversal of the paper tape during the retransmit operation. Solely by way of example, the predetermined count when the retransmit operation is to be performed, is $2^{N-1}$. Accordingly, when a count of $2^{N-1}$ is reached, a pulse passes via mixer gate M334 to set counter C341 which generates the MAX signal. Also, solely by way of example, if the retransmit operation is not to be performed the counter C341 receives a signal from mixer gate M333 when the predetermined count reaches one, so that a block will contain only one record.

Mixer gate M393 is used during the retransmit operations to ensure that no more than a maximum number of blocks is included in a record. If the number of blocks exceeds 15 then a MAX signal is automatically forced.

In any event, the MAX signal is fed to one input of gate G205. The EBD signal which is received at the second input of gate G205, indicates the end of a record. The CLE signal is basically used as a strobing signal. Thus, when the end of a record is reached, a pulse passes through gate G205 to cause the generation of the EOB pulse provided the MAX signal is present. The —EOB signal is fed to mixer gate M363 triggering Blocking Oscillator BO4–343 giving RMAX signal which is fed via buffer B303 to clear binary counter BC300 and is also fed to the reset terminal of counter C341 to terminate the MAX signal. If, however, the end sentinels indicate an end of transmission, then a pulse passes through gate G206 causing the generation of the EOT pulse. Either the EOB or the EOT pulse is transmitted to the general mode control GM to end the Transmit or Receive modes. The general mode control GM in turn feeds back an ENBT pulse which is fed to the set input terminal of counter C139, causing the generation of the ACK and the minus ACK signals, representative of the Acknowledge mode. At the end of the Acknowledge mode, the REC signal and INE pulse, at the receiver, transmit a pulse via mixer gate M152 and amplifier A153 to the reset input terminal of counter C159. The counter therefore resets, ending the Acknowledge mode. At the transmitter the TRS and EOC signals at mixer gate M151 perform this function. If the transmission of the block preceding the end of transmission end sentinel characters was error-free, then the EOT pulse sets the flip-flop F117. An error-free condition will exist when the ERR signal at the allow set input of the flip-flop F117 is at ground potential. The flip-flop F117 generates the ETT signal which is fed to an input of gate G151. At the end of the Acknowledge mode the pulse transmitted by amplifier A153 in addition to being fed to the reset terminal of counter C139, is fed to a second input of gate G151, causing the transmission of a BTH timing pulse to the amplifier A155 which generates the EOTR signals that initiate the disconnect routine.

As long as no EBD signal is received indicating an end of record, the —SPL signals, one per character, are received and counted by N-stage binary counter BC300 and when the count reaches $2^N$, for example, i.e., a predetermined count higher than the count causing the generation of the MAX signal a pulse passes via mixer gate M387 to amplifier A390. At this time the output of amplifier A390 cooperates with the SPL signal to cause the setting of flip-flop F390. The one's output of flip-flop F390 is fed to one input of mixer gate M666 to pass the next occuring sprocket pulse PSTP of the tape reader TR' which is represented by a PSP pulse from reader controls RC as a pulse signal on the IA691 signal line. When this pulse is received by reader controls RC it resets a counter (C606) therein terminating the PTFW signal. The one's output of flip-flop F390 also passes via gate 382 and amplifier G382 to the allow input terminal of flip-flop F391 whose set input terminal receives an SPLD pulse from blocking oscillator BO4–303. Flip-flop F391 sets and starts generating the REF signal from its one's output terminal. The REF signal is fed to reader control RC but does nothing at this time. The REF signal is also fed to the input terminal of delay-flop DF390 which generates a pulse having a one hundred and forty millisecond duration. At the end of this time interval, the output of delay-flop DF390 after inversion by amplifier A391 causes a BTH timing pulse to pass through gate G391 to reset flip-flop F391 ending the REF signal. The trailing edge of the REF signal when received at mixer gate M620 of reader control RC causes the setting of the counter C606 which again generates the PTFW signal causing tape reader TR' to again transmit characters to coupler DV'.

APPENDIX.—TAPE DRIVE

The magnetic tape drive may be one of many commercially available tape drives which handles seven channel magnetic tapes and includes separate read and write heads. A typical tape drive is the Series FR400 Digital Tape Handler manufactured by the Ampex Data Products Company. Such a tape drive is completely described in the service manual entitled Digital Tape System published by the Ampex Data Products Company, Redwood City, California. If such a tape drive is employed the following connections are made between the remainder of the system and the Series FR400 Digital Tape Handler.

*Table 3*

| FR400 input: | Signal leads of system |
|---|---|
| Terminal R; plug P3 | FWD. |
| Terminal M; plug P3 | REV. |
| Terminal T; plug P3 | GROUND. |
| Terminal 2; plug P6 | TERS. |
| Terminal 7; plug P6 | TBRS. |
| Terminal 1; plug P6 | GROUND. |
| Terminal 1; plug J7 | 0 volts. |
| Terminal 2; plug J7 | LAL. |
| Terminal 10; plug J114 | Write Head 1. |
| Terminal 3; plug J114 | Write Head 2. |
| Terminal 9; plug J114 | Write Head 3. |
| Terminal 2; plug J114 | Write Head 4. |
| Terminal 8; plug J114 | Write Head 5. |
| Terminal 1; plug J114 | Write Head 6. |
| Terminal 7; plug J114 | Write Head 7. |
| Terminal 10; plug J115 | Read Head 1. |
| Terminal 3; plug J115 | Read Head 2. |
| Terminal 9; plug J115 | Read Head 3. |
| Terminal 2; plug J115 | Read Head 4. |
| Terminal 8; plug J115 | Read Head 5. |
| Terminal 1; plug J 115 | Read Head 6. |
| Terminal 7; plug J115 | Read Head 7. |

MECHANICAL COUNTER

The mechanical counter may be of the type manufactured by the Sodeco Geneve Company under the name of a printing impulse counter "Sodeco-Print."

TRANSCEIVER DF

The transceiver DF is a digital subset model 202A, having the options Z, K, J, G, D and N as manufactured by the American Telephone and Telegraph Company. The digital subset is described completely in a book entitled, Bell System Practices Section 592–012–200, Issue 1, November 1961. The subset operates in a frequency shift manner between a frequency of 1200 cycles per second and a frequency of 2200 cycles per second. The subset includes a telephone that may be used in the normal manner to establish the connection between the sending and receiving ends of a telephone line. It includes at least three buttons, a data-button, an automatic button and a talk-button. It functions as an ordinary telephone whenever the talk-button is pressed. When the automatic button is pressed the subset can receive data transmission calls without the receiver being off the cradle.

The subset is provided with a Cinch connector for connection to the customer's equipment. It is necessary to employ a Cinch connector DB–19604–432 having a hood DB–51226–1. The following table indicates the connections of the leads from the coupler DV to the terminals of the connector.

*Table 4*

| Connector terminals: | Signals from coupler |
|---|---|
| 2 | TDAD. |
| 3 | DIND. |
| 4 | RTSD. |
| 5 | STSD. |
| 6 | INT. |
| 7 | Signal Ground. |
| 8 | CAD. |
| 19 | DRC3. |
| 20 | DRC2. |
| 21 | DRC1. |

DESCRIPTION OF SYMBOLS

The schematic equivalents of the symbols which are hereinafter employed to simplify the detailed description of the units of the system which have been illustrated in block form are shown in FIGURES 26 to 38. For convenient reference, all positive and negative supply buses will generally be identified with a number corresponding with their voltage. The circuitry terminals corresponding to the same symbol terminals are identified by the same character reference numbers.

GATE (FIGURE 34)

The gates ("and" gates) used in the disclosed system are of the "coincidence" type, each comprising a crystal diode network which functions to receive input signals via a plurality of input terminals and to pass the most positive signal.

The symbol for a representative gate 1001, having by way of example, three input terminals 1002, 1003, and 1004 is shown in FIGURE 34A. Since the signal potential levels in the system are minus six volts and zero volts, the potentials of the signals which may exist at the input terminals 1002, 1003, 1004 are thereby limited.

If a potential of zero volts is present at one or more of the input terminals 1002, 1003, 1004, a potential of zero volts will exist at the output terminal 1005. Therefore, if one of the input signals to the input terminals 1002, 1003, 1004 is "negative" (minus six volts) and one or more of the other signals are "positive" (zero volts), the positive signals are passed and the negative signal is "blocked."

When there is a coincidence of negative signals at all three input terminals 1002, 1003 and 1004, a negative signal is transmitted from the output terminal 1005. In such case, it may be stated that a negative signal is "gated" or "passed" by the gate 1001. When all of the input signals to a gate except one are made negative, in preparation for passing a negative signal when the remaining input signal is made negative, the gate may be described as being "primed."

The schematic details of the gate 1001 are shown in FIGURE 34B. Gate 1001 includes the crystal diodes 1012, 1013 and 1014. The input terminals 1002, 1003, 1004 are respectively coupled to the crystal diodes 1012, 1013, 1014. The latter diodes comprise respectively in order: anode 1012A and cathode 1012C, anode 1013A and cathode 1013C, and anode 1014A and cathode 1014C. More particularly, the input terminals 1002, 1003, 1004 are respectively coupled to the anodes 1012A, 1013A, 1014A of respective crystal diodes 1012, 1013, 1014. The cathodes 1012C, 1013C, 1014C are interconnected at the junction 1015, which in turn is connected to the negative voltage bus —26 via a resistor 1016.

The negative supply bus —26 tends to make the cathodes 1012C, 1013C, 1014C more negative than the anodes 1012A, 1013A, 1014A, respectively, causing all three crystal diodes 1012, 1013, 1014 to conduct.

When negative six volt signals are simultaneously present at all three input terminals 1002, 1003, 1004, the crystal diodes 1012, 1013, 1014 are conductive, and the potential of the cathodes 1012C, 1013C, 1014C approaches the potential of the anodes.

If the potential at one of the input terminals 1002, 1003, 1004 increases to zero volts, the potential at the junction 1015 approaches zero volts level, as this voltage is passed through the conducting diode 1012, 1013 or 1014 to which the zero volt potential is applied. The other two diodes stop conducting, since their anodes become more negative than the junction 1015. As a result, a "positive" potential of zero volts appears at the output terminal 1005.

If zero volt potentials are simultaneously fed to two or all three of the input terminals 1002, 1003, 1004, a zero volt potential will appear at the output terminal 1005, since respectively two or all three diodes 1012, 1013, 1014 will remain conducting. Thus the gate 1001 functions to pass the most positive signal received via the input terminals 1002, 1003, 1004.

In the above described manner, the gate 1001 is frequently used as a switch to govern the passage of one signal by the presence of one or more signals which control the operation of the gate 1001.

It should be understood that the potentials of zero volts and minus six volts used for purpose of illustration are approximate, and the exact potentials will be affected in two ways. First, they will be affected by the value of the resistance 1016 and its relation to the impedances of the input circuits connected to the input terminals 1002, 1003, 1004. Second, they will be affected by the fact that a crystal diode has some resistance (i.e., is not a perfect conductor) when its anode is more positive than its cathode. Nevertheless, the assumption that signal potentials are either zero or minus six volts is sufficiently accurate to serve as a basis for the description of the operation taking place in the disclosed system. Although the gate 1001 is shown as having three input terminals 1002, 1003, 1004 connected through diodes 1012, 1013, 1014 respectively to junction 1015, it will be understood that any reasonable number of terminals may be similarly connected through diodes to junction 1015 and that the junction will remain at the voltage of the most positive source connected to any of the input terminals. Many of the gates in the following description are shown as having two or more than three input terminals and such gates are to be taken as having a similar number of diodes connected to an output terminal as 1015.

It should be noted that the disclosed system employs "negative" logic. Therefore, the "and" gate described in this section is deemed "open" when all its input signals are negative, whence its output signal will also be negative. The "and" gate is "closed," when at least one input signal is positive, whence the output signal is also positive. The "and" gate thus corresponds to an "or" gate (buffer) of "positive" logic systems. Conversely, the buffer of the disclosed negative logic system corresponds to the "and" gate of positive logic systems. The buffer utilized in the disclosed system is described in the next section.

BUFFER (FIGURE 35)

The buffers utilized are also known as "or" gates. Each buffer comprises a crystal diode network which functions to receive input signals via a plurality of input terminals and to pass the most negative signal.

The symbol for a representative buffer 1021, having by way of example three input terminals 1022, 1023, 1024, and output terminal 1025, is shown in FIGURE 35A. Since the signal potential levels of the system are minus six volts and zero volts, either one of these potentials may exist at the input terminals 1022, 1023, 1024.

If a potential of minus six volts is present at one or more of the input terminals 1022, 1023, 1024, a potential of minus six volts exists at the output terminal 1025. Therefore, if one or more of the input signals to input terminals 1022, 1023, 1024 is negative, the negative signal is passed to the output terminal 1025, and the "or" gate is said to be open, notwithstanding the fact that the input signals to the remaining input terminals are "positive" (zero volt potential).

When there is coincidence of "positive" (zero volt) signals at all three input terminals 1022, 1023, 1024, a "positive" signal is transmitted from the output terminal 1025, and the "or" gate is said to be closed.

The schematic details of the buffer 1021 are shown in FIGURE 35B. Buffer 1021 includes the crystal diodes 1032, 1033, 1034. The input terminals 1022, 1023, 1024 are respectively coupled to the crystal diodes 1032, 1033, 1034. The latter diodes comprise respectively in order: cathode 1032C and anode 1032A, cathode 1033C and anode 1033A, and cathode 1034C and anode 1034A. More particularly, the input terminals 1022, 1023, 1024 are respectively coupled to the cathodes 1032C, 1033C, 1034C of respective diodes 1032, 1033, 1034. The anodes 1032A, 1033A, 1034A of respective diodes 1032, 1033, 1034 are interconnected at the junction 1035 which is coupled to output terminal 1025, and which connects to the positive supply bus +20 via a resistor 1036.

If negative potentials are simultaneously present at all three input terminals 1022, 1023, 1024, all three diodes 1032, 1033, 1034 will conduct, since the positive supply bus +20 tends to make the anodes 1032A, 1033A, 1034A more positive. The voltage at the junction 1035 will then be minus six volts since, while conducting, the anodes 1032A, 1033A, 1034A of the crystal diodes 1032, 1033, 1034 assume the potentials of the associated cathodes 1032C, 1033C, 1034C.

When a positive signal is fed to one or two, but not all three of the input terminals 1022, 1023, 1024, the respective one or two of cathodes 1032C, 1033C, 1034C are raised to potential of zero volts and therefore more positive than their respective anodes. However, the cathode of the remaining one or two crystal diodes remains at the negative potential of minus six volts, and therefore the potential of the junction 1035 also remains at minus six volts.

When the signals present at all three input terminals 1022, 1023, 1024 are positive, the anodes 1032A, 1033A, 1034A are raised to approximately the same potentials of zero volts as their respective cathodes 1032C, 1033C, 1034C, and the potential at the junction 1035 rises to zero volts.

The potential which exists at the junction 1035 is transmitted from the buffer 1021 via the connected output terminal 1025.

The showing herein of a buffer with two or more than three input leads is to be understood to mean that there are as many diodes having their anodes connected to an output terminal as there are input leads.

MIXER GATE (FIGURE 36)

The symbol for a representative mixer gate 1040, having by way of example three input terminals 1041, 1042, 1043, and output terminal 1044, is shown in FIGURE 36A. The schematic details are shown in FIGURE 36B, wherein a regular gate 1045 is illustrated in the symbolic form previously employed. The practice of representing the circuit details of a unit shown in symbolic form, by symbols representing previously described units, will be followed hereinafter.

As may be seen from FIGURE 36B, the input terminals 1041, 1042, 1043 serve as input terminals for gate 1045, and the output of gate 1045 is coupled to the cathode of a diode 1046, whose anode is in turn coupled to the output terminal 1044. The mixer gate is generally utilized in conjunction with one or more further mixer gates each having two or more input terminals. The output terminals of the several mixer gates are coupled together. Hence the individual gates (corresponding to gate 1045) of the several mixer gates function in the usual "and" circuit fashion. The several diodes corresponding to diode 1046 constitute a buffer common to the individual gates.

AMPLIFIER (FIGURE 37)

The symbol for a representative amplifier 1050 having input terminal 1051A, "negative" output terminal 1052A, and "positive" output terminal 1052B, is shown in FIGURE 37A. Output terminal 1052A is negative in the sense that it delivers an output signal that is reversed in polarity with respect to an input signal applied to input terminal 1051A. By the same token, the output signal at positive output terminal 1052B will be in phase with an input signal applied to terminal 1051A.

The circuitry of amplifier 1050 is shown in FIGURE 37B. Amplifier 1050 is essentially a two-stage transistor amplifier. It comprises pnp transistors 1060A and 1060B, each connected as a grounded emitter stage. Consistent with the usual convention, pnp junction transistors, such as transistors 1060A and 1060B are illustrated with an arrow at the emitter electrode pointing toward the base electrode. On the other hand, npn junction transistors encountered hereinafter are shown with the arrow at the emitter electrode pointing away from the base electrode. The type of transistor, that is pnp or npn may be recognized from the illustration and will not be explicitly stated except where warranted.

The two stages of amplifier 1050 are structurally similar. The members of the first stage are identified by reference numerals followed by the letter A, and the corresponding parts of the second stage are represented by like reference numerals followed by the letter B. Only the first stage will be described explicitly; the description of the second stage is by way of implicit substitution of the letter B for the letter A. It should be observed that the output terminal 1052A of the first stage constitutes the input terminal 1051B of the second stage.

The input signal that is to be amplified is applied from a source external of amplifier 1050, to input terminal 1051A, from which it is transmitted to the base of transistor 1060A via series connected resistors 1053A and 1055A. These signals utilized in the disclosed system are generally of the pulse type, and as such have steep leading and trailing edges. To maintain the sharp pulse shape, there is provided a speed-up capacitor 1057A which shunts the series combination of resistors 1053A and 1055A. Quiescent base current is established by means of a resistor 1059A, which intercouples the base of transistor 1060A and the +20 volt bus.

The emitter of transistor 1060A is grounded, whereas its collector connects through load resistor 1061A to the —26 volt bus. To limit the negative voltage swing of the collector to —6 volts, the collector of transistor 1060A is coupled to the cathode of a clamping diode 1063A, whose anode connects to the —6 volt bus. Positive voltage swing of the collector is reduced by means of a diode 1064A whose anode is coupled to the collector of transistor 1060A and whose cathode is coupled to the junction of resistors 1063A and 1055A. Diode 1064A thus provides unidirectional and therefore non-linear degenerative feedback for positive output signals at the output terminal 1052A which is tied to the collector of transistor 1060A.

COUNTER RESET (FIGURE 38)

The "counter reset" is a special purpose amplifier which is utilized in the disclosed system as a source of clearing signals for flip-flops and counters described in the following sections, and occasionally for other purposes. It is a non-inverting amplifier in the sense that the output signal is in phase with the input signal. The symbol for a representative counter reset 1070, having a single input terminal 1071 and a single output terminal 1072, is shown in FIGURE 38A.

The circuitry of counter reset 1070 is shown in FIGURE 38B. The counter reset is also a two-stage direct coupled common emitter amplifier; however, the two stages are somewhat dissimilar; in particular, the first stage includes pnp transistor 1076, whereas the second stage includes npn transistor 1080. Therefore both stages will be explicitly described.

Input signal applied to input terminal 1071 is transmitted to the base of transistor 1076 via the shunt combination of resistor 1073 and speed-up capacitor 1074. Quiescent base current is established by means of a resistor 1075 which intercouples the base of transistor 1076 and the +20 volt bus. The collector load impedance is formed of a voltage divider that includes resistors 1077 and 1078, which are connected serially from the —26 volt bus to ground and whose junction is tied to the collector of transistor 1076. The emitter of transistor 1076 is grounded.

The amplified output voltage appearing at the collector of transistor 1076 is inverted with respect to the input signal at terminal 1071, and is reinverted by means of the second stage of the counter reset 1070. The collector output signal of transistor 1076 is coupled to the base of transistor 1080 via resistor 1079. The emitter of transistor 1080 is returned to the —6 volt bus. The collector load impedance for transistor 1080 consists of a voltage divider which is comprised of serially connected resistors 1081 and 1082 which span the +20 volt and —6 volt buses. The collector of transistor 1080 is coupled to the junction of resistors 1081 and 1082, and also to the output terminal 1072.

COUNTER (FIGURE 39)

The symbol for a representative counter 1090 is shown in FIGURE 39A. Counter 1090 is provided with a set (S) input terminal 1091A, a reset (R) input terminal 1091B, an allow set (AS) input terminal 1092, a "1" or set output terminal 1093A, a "0" or reset output terminal 1093B, and a clear (CL) input terminal 1094. It is a bistable device; that is, it admits of two stable states of operation, the set state and the reset state. When the counter 1090 is in the reset state, the output signal at the "0" terminal 1093B will be "negative" (at a potential of —6 volts) and the output signal at the "1" terminal 1093A will be "positive" at a potential of 0 volt). The counter output signals are also specified as complementary pairs upon occasion, as for example by Z for the set terminal output signal 1093A and by —Z at the reset output terminal 1093B in FIGURE 39A. In the reset condition of the counter 1090 the —Z signal is deemed to be present or "on." The Z signal is deemed to be absent or "off," although then "positive." In the set state, the —Z signal will be "positive" (at a potential of 0 volts) and deemed absent or "off"; the Z signal will be deemed present or "on," even though then "negative."

The "normal" potential prevailing at the set input terminal 1091A, the reset input terminal 1091B, and the allow set input terminal 1092, is 0 volt. Under these conditions the set and reset signals are deemed to be absent, and the allow set signal to be present. The clear input signal is "normally" absent and at a potential level of 0 volt. When present, the clear signal terminal 1094 assumes a negative potential value of —6 volts, or even below —6 volts.

While in the reset state, changes in the conditions of the reset or allow set input signal levels will not alter the reset state of counter 1090. Assuming that the allow set signal has been present for at least four microseconds, application of a (negative) set pulse at input terminal 1091A of at least four microseconds duration will transfer the counter 1090 to the set state at the termination of such set pulse, that is at its positive-going trailing edge. The Z signal will be "on" and the —Z signal will be "off."

Once in the set state, changes in the conditions of the set and allow set input signals will not alter the set state of counter 1090. However, application of a (negative) reset input signal to terminal 1091B of at least four microseconds duration will transfer flip-flop 1090 to the reset state at the termination of such reset pulse, that is at its positive going trailing edge. The Z signal will be "off" and the —Z signal will be "on." Application of the (negative) clear signal will place flip-flop 1090 in the reset state.

The schematic details of counter 1090 are shown in FIGURE 39B. The circuit is a transistor type Eccles-Jordon circuit which includes grounded emitter connected transistors 1111A and 1111B. Regenerative cross-coupling is provided between the collector of each transistor and the base of the other transistor. The counter circuit is composed of two half-circuits, one associated with transistor 1111A and the other with transistor 1111B. The half circuits are to greater extent symmetrical; the symmetrical components of the two half-circuits may be recognized by inspection in that a component of the left half-circuit is identified by a given reference numeral followed by the letter A and its symmetrical component in the right half-circuit is identified by the same reference numeral followed by the letter B. Therefore the following explicit description of the half-circuits is basically given for only one half-circuit, and the description of the other is given implicitly by substitution of "A" for "B," and "B" for "A." Unsymmetrical parts are labeled by reference numeral without suffix letter, and are explicitly described for both half-circuits.

In the reset state transistor 1111A conducts at collector current saturation, and its collector electrode which constitutes the "1" terminal is at 0 volt potential. Such collector potential is transmitted via series resistors 1115A and 1117A to the base of transistor 1111B, thereby placing transistor 1111B in a non-conducting state (collector current cut-off). The collectors are coupled to the −26 volt bus through respective resistors 1121A and 1121B. To limit the potential of the collector of transistor 1111B to −6 volts, such collector connects to the −6 volt bus through the cathode and then the anode of a clamping diode 1113B. The collector of transistor 1111B constitutes the "0" output terminal 1093B. The series combination of resistors 1115A and 1117A is shunted by a speed-up capacitor 1118A to accelerate switching from one counter state to the other. To prevent deep saturation of the conducting transistor, the collector of transistor 1111A connects through the anode and then the cathode of a diode 1119A to the junction of resistors 1115B and 1117B, so as to provide nonlinear degenerative feedback for positive-going collector potential from collector to base of transistor 1111A via diode 1119A and resistor 1117B.

The set signal is applied at set input terminal 1091A via differentiating capacitor 1095A and the anode and then the cathode of diode 1101A to the base of transistor 1111A. A differentiating resistor 1099A connects from the anode of diode 1101A to the −26 volt bus. Diode 1101A blocks the differentiated negative-going leading edge of the incoming set signal, and transmits the positive-going leading edge to initiate the flipping action, assuming that the the counter is then reset. The rise in base potential decreases the collector current of transistor 1111A, so that its collector potential decreases. Such decrease in collector potential is coupled via resistors 1115A and 1117A to the base of transistor 1111B to initiate its collector current flow and rise in collector potential. Such latter rise in collector potential is coupled via resistors 1115B and 1117B to the base of transistor 1111A to reenforce the initial action of the set pulse. The effect is cumulative and ultimately transistor 1111A is cut off and transistor 1111B is saturated. The counter 1090 is now in the set state. It may be reset by application of a reset pulse to the reset input terminal 1091B through an analagous chain of events, noting the symmetrical components 1095B, 1099B, 1101B. When a set and a reset pulse are applied concurrently, the counter 1090 will change its state. This is because the set pulse will not affect a previously set counter, but the reset pulse will. Similarly the reset pulse will not affect a previously reset pulse, but the set pulse will. This phenomenon forms the basis of the operation of a binary counter, described in the next section.

The allow set terminal 1092 is coupled to the anode of diode 1011A through a resistor 1092. Application of a −6 volt potential to the allow set terminal 1092 will place the anode of diode 1101A at a potential below that of its cathode and thereby preclude the set pulse from reaching the base of transistor 1111A, and consequently setting of the counter 1090. The allow set signal thus may be used to gate the set signal.

The clear terminal 1094 is coupled to the base of transistor 1111A via resistor 1105 and the anode and then the cathode of diode 1103. Application of the (negative) clear signal will initiate conduction of a previously cut-off transistor 1111A. This will be followed by the usual regenerative flipping action previously described to reset counter 1090. The clear signal will override a concurrent setting signal, noting the clear signal is applied without differentiation.

The base of transistor 1111A is additionally coupled through a resistor 1109 to a potential source +20S, which is normally maintained at a potential of +20 volts. However, when power is first turned on to the system, or at any other time when it is desired to clear the flip-flop, the potential of source +20S is momentarily changed to −26 volts through a suitable switch (not shown) to clear initially the counter 1090 to the reset state.

The collector of transistor 1111B is coupled to the anode of diode 1101B through a resistor 1107 to off-set the unbalance of the two half-circuits due unsymmetrical components 1097, 1105, 1109 in the left half-circuit.

The system also includes units called flip-flops such as flip-flop F117. The flip-flops are identical to the described counter C1090 except that the CL terminal is deleted along with its associated diode 1103 and resistor 1105.

BINARY COUNTER (FIGURE 40)

The exemplary binary counter 1130, sometimes referred to simply as counter, is shown symbolically in FIGURE 40A and in block form in FIGURE 32B as composed of two stages 1131 and 1132. It has a counting capacity of four numbers (zero to three). A counter may be composed of a single stage with a counting capacity of two numbers (zero to one). Each additional stage doubles the capacity of the counter; thus a three-stage counter will have a capacity of eight numbers (zero to seven).

As may be seen from FIGURE 40B, each counter stage includes a flip-flop whose set input and reset input terminals are tied together, and whose set output ("1") terminal and allow set terminal are tied together. The "1" output of a given stage is tied to the set input terminal of the next higher stage in the counting chain. The input terminal 1133 of counter 1130 is also identified as input signal; it is connected to the set and reset input terminals of the initial stage 1131. The "1" and "0" terminals of stage 1131 are deemed to be the sources of signals A and −A respectively; those of stage 1132 the source of signals B and −B respectively, and so forth for any added stages. The alphabetically ordered signals are a concept that is useful in the description of counter 1130 and of the decoder and parity checker units given in subsequent sections.

The several counter stages are cleared to zero by application of a negative signal to the input terminal 1137 of counter clear 1138, whose output terminal is coupled via line 1139 to the clear terminals of the several counter stages, thus clearing (resetting) them. The fact of reset states prevailing in all counter stages is interpreted as the number zero. In such reset state, each counter stage is in an allow set condition by virtue of intercoupling of the "1" and allow set terminals. Therefore the positive-going trailing edge of the next incoming signal applied to terminal 1133 will set stage 1131, even though it is applied to both the set and reset input terminals of stage 1131. This follows from the discussion of simultaneous application of set and reset signals to a flip-flop given in the preceding section.

The "1" terminal of stage 1131 is now at negative potential; that is, the A signal is now present. This is of significance in several respects. The A signal serves as setting signal for the second stage 1132, but not at this time as yet, recalling that it is of the positive-going trailing edge of a setting signal which is effective to set. Thus stage 1132 remains reset, and the fact of stage 1131 set and stage 1132 reset is interpreted as the number one. Secondly, the allow set terminal of stage 1131 is now at negative potential, so that the positive-going trailing edge of the next incoming second signal cannot set stage 1131, but will reset it.

The resetting of stage 1131 by the second signal terminates the A signal, which is now positive-going and therefore sets stage 1132, even though the A signal is applied to both the set and reset terminals of stage 1132. The fact of stage 1132 set and stage 1131 reset is interpreted as the number two. It is seen that stage 1132 is in exactly the same condition as stage 1131 upon receipt of the first signal. The B signal is now present. Also stage 1131 is now in exactly the same condition as it was prior to the first A signal. Therefore the next (third) signal will set stage 1131. The attendant initiation of the A signal does not affect stage 1132 (termination of the A signal subsequently will). Stage 1132 therefore remains set, and the fact of both stages 1131 and 1132 being set is interpreted as the number three. It is seen that the counter 1130 counts the number of signals.

The counter 1130 has now reached the limit of its two-stage capacity. The next (fourth) signal will reset stage 1131. The attendant termination of the A signal now also resets the second stage 1132, so that we have reverted to the initial condition corresponding to the count of zero. However, the attendant termination also of the B signal would set a third counter stage coupled to stage 1132, and such set state coupled with the reset state of stages 1131 and 1132 would be interpreted as the number four. Stages 1131 and 1132 are now ready for another cycle of counts one, two, three, zero as before. In the case of an added third stage, such counts would be interpretable as five, six, seven, zero respectively.

MONOSTABLE MULTIVIBRATOR TYPE CIRCUITS

The disclosed system utilizes several monostable type multivibrator circuits, namely a delay flop (FIGURE 41), a gated delay flop (FIGURE 42), a retriggerable delay flop (FIGURE 43) and a blocking oscillator (FIGURE 44). These circuits function generally in the same manner, in that upon receipt of an input trigger signal they will generate an output pulse of predetermined duration. Structurally the circuits are also similar to a certain extent. The delay flop circuit shown in FIGURE 41B is composed of two blocks designated as 1144 and 1145A. The retriggerable delay flop circuit of FIGURE 43B is composed of two blocks designated as 1207 and 1145B. The blocking oscillator circuit of FIGURE 44B is composed of block 1144 of the basic delay flop circuit and of a block 1145C which is essentially a simple modification of blocks 1145A and 1145B. The blocks 1145A and 1145B contain similar structure and corresponding components therein are designated by like reference numeral followed by suffix letters A and B respectively. Components individual to the blocks are designated by reference numeral without suffix letter. The following description will be simplified having regard to the noted similarities.

THE DELAY FLOP (FIGURE 41)

The symbol for a representative delay flop 1140 is shown in FIGURE 41A. The delay flop includes input terminal 1141 and output terminal 1142.

The schematic details of the delay flop 1140 are shown in FIGURE 41B. The input signal to terminal 1141 proper for operation of the delay flop 1140 is a positive signal of at least four microseconds duration. The delay flop responds to the negative-going trailing edge of such trigger input signal. The negative-going trailing edge must have a fall time of less than 0.5 microsecond. The mentioned time limitation of four and 0.5 microsecond will assure reliable triggering.

The proper operating level at input terminal 1141 is established by a resistor 1146, which connects from terminal 1141 to the +20 volt bus. The input signal is coupled by means of a capacitor 1148 to the base of transistor 1156 which is connected as an emitter follower. However, the input signal is modified by the action of a network which is connected from the base of transistor 1156 to ground and includes resistor 1154 shunted by the series combination of diode 1150 and resistor 1152. The anode of diode 1150 is tied to the base of transistor 1156. The positive-going leading edge of the incoming trigger pulse is presented with a short-time constant differentiating network including capacitor 1148 and resistor 1152, and is therefore attenuated. The negative-going trailing edge cannot pass through diode 1150, and therefore the impedance it sees is that of coupling capacitor 1148 and resistor 1154 in shunt with the input impedance of the emitter follower transistor 1156, whose time constant is substantially greater. The negative-going trailing edge is therefore not attenuated to substantial degree.

The collector of transistor 1156 is coupled to the −6 volt bus, whereas its emitter is coupled through load resistor 1158 to the +20 volt bus. This completes the description of the elements constituting block 1144. The emitter of transistor 1156 produces a replica of the signal voltage appearing at its base, and this is passed to the cathode of a diode 1160A in block 1145A.

Diode 1160A suppresses transmission of the residual positive swing of the signal developed at the emitter of transistor 1156, but passes the negative-going trailing edge part to an integrating network composed of shunt-connected resistor 1162A and capacitor 1164, whose ends are respectively connected to the anode of diode 1160A and the base of transistor 1166A, which is connected as a grounded emitter amplifier. Proper operating potential for transistor 1166A is established by means of a resistor 1165A which intercouples the transistor base and the +20 volt bus. The collector load resistor 1168A of transistor connects to the −26 volt bus. Transistor 1166A is normally biased to collector current cut-off, but is turned on by the incoming base signal.

The inverted (positive) integrated signal developed at the collector of transistor 1166A is passed through capacitor 1170A to the base of transistor 1176A, which functions as the monostable multivibrator proper. Capacitor 1170A in cooperation with series-connected resistors 1172A and 1174A constitute a charging network, which determine the duration of the output pulse at output terminal 1142. Capacitor 1170A is selected to provide the desired pulse duration which is expressed for a given delay flop in milliseconds (MS) in the symbolic form shown in FIGURE 41A.

Resistors 1172A and 1174A intercouple the base of transistor 1176A and the −26 volt supply. The base of transistor 1176A is grounded, while its collector is coupled through load resistor 1178A to the −26 volt bus and is conductor coupled to the output terminal 1142. The negative excursion of the collector potential is limited to −6 volts by means of a clamping diode 1180A whose anode is tied to the collector and whose cathode is tied to the −6 volt supply.

Resistors 1172A and 1174A normally bias transistor 1176A to saturation, so that its collector is at most positive potential. The positive signal applied to its base via capacitor 1170A initially reduces the collector current, so that the collector potential begins to drop, and such drop is regeneratively enhanced by means of a feedback diode 1182A whose anode is coupled to the collector and whose cathode is tied to the cathode of diode 1160A. The diodes 1160A and 1182A are connected as a buffer. By virtue of the regenerative feedback provided by diode 1182A through the integrating network (resistor 1162A and capacitor 1164), transistor 1166A, and capacitor 1170A, transistor 1176A is practically instantly driven to collector current cutoff. Its collector voltage drops and remains at the level of −6 volts until the circuit recovers. Such recovery is due to the charging of capacitor 1170A through resistors 1172A and 1174A. As capacitor 1170A charges, collector current begins to flow once more in transistor 1176A, and it rapidly returns to saturated condition. The regenerative feedback action ends. The collector voltage goes positive again, and to minimize overshoot, a non-linear negative feedback diode 1184A is provided. The anode of diode 1184A is tied to the collector of transistor 1176A, and its cathode to the junction of resistors 1172A and 1174A. The negative feedback path is from the collector via diode 1184A and resistor 1172A to the base of transistor 1176A. The circuit recovery is not complete until capacitor 1170A is charged to normal voltage and such charging depends on the resumption of normal collector potential of transistor 1166A, which in turn depends on the time constant of the integrating network composed of resistor 1162A and capacitor 1164.

GATED DELAY FLOP (FIGURE 42)

The symbol for the representative gated delay flop 1190 is shown in FIGURE 42A. The gated delay flop is similar to the basic delay flop described in the preceding section, and corresponding parts are designated by like reference numerals followed by the suffix letter C. In particular, the gated delay flop 1190 is provided with an input terminal 1141C and output terminal 1142C, and with an additional gating input terminal 1192.

The schematic details of the gated delay flop are shown in FIGURE 42B. It comprises a delay flop 1140C intermediate input and output terminals 1141C and 1142C. The delay flop is of the kind described in the preceding section, except that the conductor connection (FIGURE 41A) between output terminal 1142 and the anode 1182A is broken, and is replaced in the gated delay flop (FIGURE 42B) by a diode 1193, whose cathode is tied to the cathode of diode 1182A. Gating input terminal 1192 connects via the anode and then the cathode of diode 1196 to the cathodes of diodes 1182A and 1193, and operating potential is established by means of resistor 1194 which connects the cathodes of the three diodes 1182A, 1193, 1196 to the −26 volt supply.

The gated delay flop operates normally in the same manner as the basic delay flop. It would appear that diode 1193 is poled in opposition to the transmission of the negative pulse regeneratively fed back via diode 1182A; however, it should be remembered that the output terminal 1142C is clamped to −6 volts, whereas the cathode of diode 1193 is biased to −26 volts, so that normally the feedback signal is transmitted. However, upon application of a positive inhibiting signal to gating input terminal 1192 diode 1193 is blocked, regeneration is interrupted, and the gated delay flop is prematurely reset. Stated conversely, normal delay flop action is possible, so long as the normal negative gating signal is applied to input terminal 1192, and is otherwise inhibited or interrupted prematurely.

RETRIGGERABLE DELAY FLOP (FIGURE 43)

The symbol for the representative retriggerable delay flop 1200 is shown in FIGURE 43A and comprises input terminal 1202, and output terminals 1204 and 1206. The retriggerable delay flop 1200 functions generally as follows. In response to receipt of a negative input pulse at terminal 1202, a positive output pulse will be delivered at output terminal 1206. This output pulse will have a predetermined duration; however, if an additional negative input pulse is applied at terminal 1202 before termination of the output pulse, such positive output pulse will be sustained beyond its normal predetermined duration, and will continue to be sustained upon receipt of additional negative input pulses at terminal 1202. Upon cessation of such negative input pulses, the positive output pulse at terminal 1206 will terminate, and such termination will induce generation of a negative output pulse of predetermined duration at terminal 1204.

The schematic details of the retriggerable delay flop 1200 are shown in FIGURE 43B, and are shown in two blocks 1207 and 1145B, for convenience. The negative input pulse applied at terminal 1202 is coupled via resistor 1208 to the base of a grounded emitter connected transistor 1214, which functions as an inverting stage. Base operating potential is established by means of a resistor 1210 which intercouples the base of transistor 1214 and the +20 volt supply. The collector load resistor 1216 connects to the −26 volt supply. The negative excursion at the collector is limited to a level of −6 volts by means of a clamping diode 1218, whose cathode connects to the collector of transistor 1214 and whose anode is tied to the −6 volt supply.

The resultant positive signal at the collector of transistor 1214 is transmitted through the anode and then the cathode of a diode 1220 and resistor 1226 to the base of a transistor 1228, modified however by the action of a charging network which includes capacitor 1222 and resistor 1226. The upper ends of the latter two elements are connected to the anode of diode 1220; the other ends of capacitor 1222 and resistor 1224 are respectively connected to ground and to the −26 volt supply. The values of resistor 1222 and of capacitor 1224 are selected in accordance with the expected frequency of input pulses in accordance with the following considerations.

Transistor 1228 is quiescently maintained in conduction by means of a voltage divider which comprises resistors 1230 and 1232. The latter two resistors connect in order from the −26 volt bus to ground, and their junction is tied to the emitter of transistor 1228. The collector load resistor 1234 of transistor 1228 connects to the −26 volt supply.

Upon receipt of the initial negative pulse at input terminal 1202 capacitor 1222 will charge, and will cut off transistor 1228 as long as the capacitor charge remains positive with respect to the emitter of transistor 1228. If input pulses appear at terminal 1202 with a period smaller than the recovery time of capacitor 1222, the capacitor charge is replenished, and transistor 1228 remains cut off. As will now be seen, the duration of the output pulse at terminal 1206 corresponds to the duration of cut off of transistor 1228.

Cut off of transistor 1228 produces a negative pulse at its collector. The negative swing is limited to −6 volts by means of a clamping diode 1236, whose cathode is tied to the collector and whose anode is tied to the −6 volt supply.

The negative pulse signal from the collector of transistor 1234 is transmitted to the base of a grounded emitter stage connected transistor 1237 via series resistors 1238 and 1240 shunted by speed-up capacitor 1242. Transistor 1237 had been quiescently cut off by provision of resistor 1244 which couples the transistor base to the +20 volt supply. Load resistor 1246 connects the collector of transistor 1237 to the −26 volt supply.

Transistor 1237 is turned on for so long as the negative signal is received from the collector of transistor 1228, and its collector swings positive, giving rise to the positive output signal at terminal 1206 which is tied to the collector of transistor 1237. To prevent deep saturation, a non-linear negative feedback is provided from the collector via the anode and then the cathode of a diode 1250 to the junction of resistors 1238 and 1240, and then via the latter resistor to the base of transistor 1237. The collector positive signal terminates upon termination of the negative signal from the collector of transistor 1228. To limit the negative-going return swing of the output voltage at terminal 1206 to −6 volts, the collector of transistor 1237 connects through the cathode and then the anode of a clamping diode 1248 to the −6 volt supply.

The signal at the collector of transistor 1237 is transmitted via a differentiating capacitor 1252 to the cathode of a diode 1160B (in block 1145B), which cathode is returned to ground via a cooperating differentiating resistor 1254. Thus diode 1160B passes only the negative-going trailing edge of the output signal from the collector of transistor 1237. This completes the description of the block 1207.

The circuitry of the block 1145B is structurally very similar to the circuitry of the block 1145A described in connection with the basic delay flop of FIGURE 33, with the following minor differences. Unlike resistor 1162A, the resistor 1162B in block 1145B is not shunted by a capacitor. Thus the integrating feature of the basic delay flop is lacking, and output signal is realized at terminal 1204 as soon as the output at terminal 1206 ends. For the same reason the circuit of block 1145B recovers somewhat more quickly than the circuit of block 1145A. Secondly, there is connected from the collector of transistor 1166B a resistor 1260 to ground, which has no counterpart in the block 1145A. Resistor 1260 is provided for proper biasing, and does not affect the monostable operation of block 1145B, which is essentially the same as that of block 1145A except for quicker recovery as stated.

BLOCKING OSCILLATOR (FIGURE 44)

The symbol for a representative blocking oscillator 1270, having input terminal 1271 and output terminal 1272, is shown in FIGURE 44A. The corresponding details are shown in symbolic form in FIGURE 44B, from which it may be seen that the blocking oscillator 1270 is structurally and functionally similar to the basic delay flop of FIGURE 41. The blocking oscillator 1270 is composed of blocks 1144 and 1145C. Block 1144 is structurally the same as the like-numbered block in FIGURE 41. Block 1145C is also structurally the same as block 1145A, except that a resistor corresponding to resistor 1260 in block 1145B of FIGURE 43 is included. Functionally the blocking oscillator is the same as the basic delay flop of FIGURE 41; however, its circuit constants are selected to produce output pulse of substantially shorter duration than that of the basic delay flop.

DECODER (FIGURE 45)

The symbol for a representative decoder 1299 is shown in FIGURE 45A. In the description of the decoder 1299, and also of the parity checker in the next section, it will be convenient to identify terminals and the signals that are applied to or delivered at such terminals by one and the same reference characters. For example, decoder 1299 accepts pairs of complementary input signals A and —A, B and —B, and C and —C. It delivers output signals 0 to 7. The input signals A and —A are deemed to be applied to input signal terminals A and —A respectively.

The decoder is commonly used in conjunction with a binary counter of the kind described in a previous section, or with some similar static register, and its purpose is to provide an output signal at that one of the particular output terminals which corresponds numerically to the count stored in the static register. Thus, the decoder 1299 is deemed to derive its signals by way of example from a three-stage binary counter of counting capacity 0 to 7. The complementary signal pairs, A, B, C are deemed to be derived from the three stages respectively, as described in connection with the binary counter. The following description of the details of decoder 1299 (FIGURE 45B) will further elucidate this concept.

Decoder 1299 includes eight gates 1300 to 1307, whose outputs are connected to the input terminals of eight amplifiers 1310 to 1317 respectively. The latter amplifiers deliver at their negative output terminals the count pulses 0 to 7 respectively.

Each of the gates 1300 to 1307 has three inputs to which are applied one or the other signal in each of the pairs A, B and C. All like labeled input terminals are deemed to be interconnected, although the interconnections are omitted in the interest of clarity. For example, input terminals —A are shown for gates 1300, 1302, 1304 and 1306, and are deemed to be interconnected. It should be recalled that the +A signal is derived from the first stage of the binary counter and therefore represents the least significant bit (binary digit) of the stored count; similarly the +B signal represents the second least significant bit, and the +C signal the third least significant bit. Also the minus sign corresponds to the bit 0 and the absence of the minus sign represents the bit 1 (recall the designations of the output terminals of a counter stage as "0" and "1"). The functioning of the decoder may now be determined by inspection, since in each of gates 1300 to 1307 the stored number passed by a given gate is indicated in binary representation, least significant bit vertically below the A input terminal, second least significant bit vertically below the B input terminal, and third least significant bit vertically below the C input terminal. Additionally there is inscribed in each gate the passed number in decimal representation. Consider gate 1303 which passes the count 3. The binary representation for 3 is 011. For this number to be passed, the +A and +B signals must be present and the +C signal absent, which means that the —C signal must be present, as shown. The remaining gates follow the same pattern.

It will be recalled that a gate, when transmissive, passes a negative output signal. The fact that the output signal from amplifiers 1310 to 1317 is taken from the negative output terminals, implies that when a given gate is open, its associated amplifier will produce a positive output count signal. This is desirable, as decoder 1299 commonly feeds positive logic circuits. If negative logic circuits are to be driven, the in-phase outputs of amplifiers 1310 to 1317 may be utilized.

PARITY CHECKER (FIGURE 46)

The symbol for a representative parity checker 1320 is shown in FIGURE 46A. Parity checker accepts pairs of complementary input signals +A to +G, these lettered input signals having the same significance as in the preceding section. They are derived from a seven-stage static register. For simplicity, only one input terminal is shown per given complementary signal pair.

The parity checker 1320 is commonly used to indicate whether the number of bits 1 of a character sorted in the seven stage static register is odd or even. The disclosed system may be operated in a manner such that the number of bits 1 should be always odd. Therefore, if parity checker 1320 reflects an even number of bits 1, an error has occurred. Instead of odd parity, the disclosed system may be operated on even parity, in which case an indication by parity checker 1320 of an odd number of bits 1 is an error indication. The output signals OD3 and EV3 reflect odd and even number of bits 1 respectively. The significance of the suffix numeral 3 in these output signals will be apparent from the description of the details of the parity checker 1320 (FIGURE 46B) which now follow.

In FIGURE 46B, the parity checker 1320 is conveniently divided into three blocks 1325, 1326 and 1327. Block 1325 comprises mixer gates 1331 to 1334, whose outputs are tied together and connected to the input of amplifier 1335. Output signal EV1 is derived from the negative output terminal of amplifier 1335, and when negative in potential, implies that the number of bits in the three least significant orders of the number stored in the binary counter is even. Signal EV1 is applied as input signal to a second amplifier 1336, from whose negative output terminal the output signal OD1 is derived. Signal OD1, when negative, signifies that the number of bits 1 in the three lowest binary denominations of the number stored in the binary counter is odd. In this connection, it should be noted that signal EV1 is the logical "negation" of the input to amplifier 1335, and signal OD1 is the logical "negation" of signal EV1 and therefore the logical "double negation" or "affirmation" of the input signal to amplifier 1335.

Mixer gates 1331 to 1334 receive as input signals the A, B and C signals with polarity as indicated. The conventions of implicit interconnection of like-lettered input terminals applies as in the preceding section. Also like-lettered terminals in blocks 1325 and 1326, and in blocks 1326 and 1327 are deemed to be interconnected. Also, the convention of representation of the numbers corresponding to the three input signals of a given gate, expressed both in binary and decimal fashion, is applicable to mixer gates 1331 to 1334. The operation of block 1325 may now be inferred practically by inspection, recalling that each mixer gate acts as an "and" gate in respect to the input signal it receives, and acts in "or" gate fashion in conjunction with the other mixer gates. The mixer gates 1331 to 1334 will pass counts 1, 2, 4 and 7, these being all the three-bit numbers having odd number of bits 1 (see the binary expressions inscribed in the mixer gates). When negative input signal is applied to amplifier 1335, output signal OD1 will be negative, signifying odd parity. When the input signal to amplifier 1335 is positive, implying that mixer gates 1331 to 1334 are closed, output signal EV1 will be negative, implying even parity.

Block 1326 comprises mixer gates 1337 to 1340, whose common output signal serves as input signal to amplifier 1341. Output signal EV2 from amplifier 1341 is taken from the negative output terminal of the latter, and serves as input signal for amplifier 1342. Output signal OD2 is taken from the negative output terminal of amplifier 1342. Signals EV2 and OD2 have even and odd parity significance, but now with respect to the five least significant bits of the stored number. This arises from the fact that each of the mixer gates 1337 to 1340 receives the D and E signals with polarity as indicated, and additionally receives the EV1 or OD1 signal.

In block 1326 the convention of binary representation is adhered to in respect to the D and E signals; blanks are left in locations corresponding to the OD1 and EV1 terminals. The decimal numbers inscribed in mixer gates 1337 to 1340 are the lowest decimal numbers passed. The logical scheme applicable to block 1326 is readily evolved from the following considerations. If the stored number has an even number of bits in the three lowest binary denominations (signal EV1 present) there will be odd parity if either the +D signal is present (mixer gate 1337) or the +E signal is present (mixer gate 1338), but not both. If on the other hand there is odd parity in the three lowest binary denominations, odd parity will be present if neither the +D nor the +E signal is present (mixer gate 1339), or both the signals are present (mixer gate 1340). When odd parity exists for the lowest five binary denominations, the input signal to amplifier 1341 will be negative and hence output signal OD2 will be negative. Failing this condition, the EV2 signal is negative and even parity exists.

Block 1327 is structurally identical to block 1326, and is therefore not illustrated in detail. In lieu of the D, E, EV1, OD1 input signals received by block 1326, the block 1327 receives at corresponding locations input signals F, G, EV2, OD2. Its output signals OD3 and EV3 correspond to output signals OD2 and EV2 of block 1326. Signals OD3 and EV3, when present, reflect respectively odd and even parity for the full seven binary denominational orders.

AMPLIFIERS FOR THE MAGNETIC CORE MEMORY

The magnetic core memory of the disclosed system is of the coincident current type employing rows and columns of magnetic core windings arranged in a succession of "planes," and inhibit and sense windings. A so-called core driver, described in detail below, connects to commoned ends of all the row windings. The free end of each row winding is connected to a so-called bilateral switch, also described in detail below. Similarly one set of ends of the column windings is commoned to a core driver, while the other ends are connected to individual bilateral switches.

Memory selection is accomplished by grounding through the associated bilateral switches one of the non-common ends of the row windings and one of the non-common ends of the column windings. The core drivers apply read pulses to the selected windings during a read cycle, and write pulses during a write cycle of the memory. A read pulse switches the selected cores (one per plane) to the "0" state. If the core was previously in a "1" state, the transition is accompanied by a flux change which induces a voltage pulse in the sense winding which threads all the cores in a particular plane. If the selected core previously contained a "0," a much smaller and briefer voltage is induced in the sense winding. The sense amplifier, as will be seen from its description below, functions to produce output only on switching to "0" from a previous "1."

The write pulse will switch the selected cores to "1," and this will be permitted in those planes where the intent is to write "1." Where "0" must be written, an inhibit pulse is applied to the inhibit winding from an inhibit driver described below. The inhibit pulse envelops the write pulse, and inhibits writing of a "1," and therefore leaves the selected core in the "0" state it had at the end of the read cycle. There is one inhibit driver and one sense amplifier per core plane.

Further details will be given in the course of the description of the amplifiers (drivers). The amplifiers are structurally very similar to the amplifier 1050 and counter reset 1070 previously described. To simplify the description, the illustrations of the amplifiers include the actual circuit component values. The description will be limited to points of difference with respect to the amplifier 1050 and counter reset 1070.

CORE DRIVER (FIGURE 47)

The symbol for a representative core driver DCD is shown in FIG. 47A. The core driver is provided with a read input terminal, a write input terminal, and a common output terminal which is connected to the commoned ends of row or column windings.

The circuit details of the core driver are shown in FIG. 47B. The read input terminal is intended to be connected to a source of read pulse voltage of positive polarity. A two stage direct coupled amplifier spans the read input terminal and the output terminal. The resultant negative voltage pulse at the collector of npn transistor GT1659 turns on the previously off second stage (pnp transistor 2N317). Current flows from the +10 volt source through the emitter and then the collector of transistor 2N317, then through the paralleled 100 ohm resistors to the output terminal into the selected winding and its associated bilateral switch to ground. The feedback diodes GTDX3 and GTDX2 are oppositely poled.

The write channel from the write input terminal to the common output terminal is similar to the read channel, except for inversion of transistor conductivity type to accommodate negative write input voltage pulses. Here the output current path is the reverse of that given for the read channel; it begins at ground at the bilateral switch and terminates at the −10 volt source connected to the emitter of npn transistor 2N357. The write input pulses and also the read input pulses have a duration of four microseconds and are separated by a minimum time interval of one microsecond.

INHIBIT DRIVER (FIGURE 48)

The symbol for a representative inhibit driver ID is shown in FIG. 48. The circuit is the same as the write channel of the core driver. The input terminal is intended to be connected to an external exciting source, and the output terminal to an end of the inhibit winding whose other end is grounded. The input inhibit pulses are of six microsecond duration and envelop corresponding write pulses.

BILATERAL SWITCH (FIGURE 49)

The symbol for a representative bilateral switch BS is shown in FIGURE 49A, and the corresponding circuit in FIGURE 49B. The circuit is similar in structure to the amplifier circuits previously described; however the output transistor 2N1319 is a bidirectional germanium alloy junction transistor having emitter and collector electrodes which in a sense are interchangeable, that is the current amplification from base to emitter is the same as that from base to collector. Actually, there is no distinct emitter and collector in the usual sense. Therefore, the electrode which is connected to the output terminal may be deemed the collector/emitter; it is intended to be connected to the sense winding whose other end is grounded. The electrode which is connected to the one ohm resistor is deemed the emitter/collector. The latter resistor is provided for current monitoring purposes with the use of a cathode ray oscilloscope.

In operation, the bilateral transistor is kept normally non-conducting by the collector resistor of npn transistor GT1659. When the latter is turned on by switching the input from minus six volts to zero volts, the bilateral switch is supplied with base current and thus conducts. The base current short circuits the bilateral switch allowing current passage in either direction while absence of base current leaves the switch open.

The bilateral switch has a minimum set-up and drop-out time of four microseconds before the core driver may be allowed to pulse (read).

SENSE AMPLIFIER (FIGURE 50)

The symbol for the representative sense amplifier SA is shown in FIGURE 50A, and the corresponding circuitry in FIGURE 50B. The sense amplifier has double-ended input terminals HI and LO, to which the ends of the magnetic core memory sense winding are connectable, and an output terminal.

The sense winding which threads one core plane delivers signals to sense amplifier SA which are on the order of fifty millivolts, very low impedance and of either polarity. The signals are pulses of lobe shape, those corresponding to binary "0" being of appreciably lesser amplitude than those corresponding to binary "1." The sense amplifier functions to suppress the lower amplitude input signals. The larger amplitude input signals are amplified, converted to pulse signals of single polarity, and shaped to the desired square shape.

Referring to FIGURE 50B, input terminal HI and LO are connected to the primary of a transformer 3001, the center tap of the primary being grounded. The transformer secondary winding is included in the emitter input circuit of a grounded base amplifier including transistor T1. The amplified output is applied from the collector T1 to the base of an emitter follower stage including transistor T2, the emitter including the primary winding of a second transformer 3002, whose secondary winding drives a full wave rectifier including diodes D1 and D2. The diodes are biased so as to pass only the desired full amplitude signals and to block passage of the lesser amplitude signals. This is accomplished by means of resistor 3003, which interconnects the diode cathodes and the center tap of the secondary winding of transformer 3002, in association with the other indicated resistors connected to resistor 3003. The bias network also properly biases the base of transistor T3, also connected to the diode cathodes for further suppression of any residual low amplitude signals, and for shaping of the desired signals in association with the final output stage including transistor T4. T3 is connected in an emitter follower circuit, while T4 is connected in a grounded emitter circuit. Output is obtained from the collector of T4.

TAPE READ AND WRITE AMPLIFIERS (FIGURES 51, 52)

Magnetic tape recording, for purposes of the disclosed system, is of the so-called non-return to zero type (NRZ), in which the tape is magnetically saturated in one direction or the other. Binary "1" is recorded by change of the direction of saturation in either direction; binary "0" is not recorded in a positive manner. The magnetic recording heads are energized by tape write amplifiers, of which that shown in FIGURE 51 and denominated TWA, is illustrative. As may be seen from FIGURES 51A and 51B, the tape write amplifier TWA is simply a core driver DCD described in a previous section, with the read and write input terminals commoned. The tape write amplifier actually admits of a third state, absence of input signal, in which case the state of magnetization of the recording tape is unaffected.

The symbol for the representative tape read amplifier TRA is shown in FIGURE 52A, and the corresponding circuitry in FIGURE 52B. The circuitry is arranged in the following functional blocks: linear amplifier 3010, phase splitter 3011, full wave detector 3012, slope detector 3013, blocking oscillator 3014.

The linear amplifier 3010 accepts at the input terminal the signals read out from magnetic tape, which are pulses of lobe form and either polarity, and of from five to twenty millivolts peak to peak amplitude. The amplifier is a three stage resistance-capacitance coupled amplifier, the individual stages (including transistors T1, T2, T3) being of the common emitter amplifier type, with input to the base and output at the collector. The collector supply circuits are decoupled from each other by a succession of series resistors R15, R16, R17, R30 leading to the minus A26 volt source, and by shunt capacitors C6, C7, C8 and C9. Capacitor C16 is in shunt with collector resistor R12 of transistor T4 and provides shaping of the amplified signals. An adjustable rheostat R4 is in the base circuit of T1 for gain control purposes.

The output of the linear amplifier 3010 is applied to the base of transistor T4 connected as a phase emitter, namely phase splitter 3011. Substantially equal load resistors R20 and R21 are connected to the collector and the emitter of transistor T4, respectively. This assures that for each input signal lobe, whether positive or negative, there will be a positive and a negative output signal from phase splitter 3011 to the full wave detector 3012, one from the emitter, and one from the collector of T4.

The full wave detector 3012 comprises emitter follower connected transistors T5 and T6, inputs to their bases being from collector and emitter of T4 via coupling capacitors C11 and C12 respectively. The emitters of T5 and T6 are connected to the anodes of the didoes D4 and D5 respectively, which are connected in a full wave rectifier circuit, which passes the signal from either T5 or T6, whichever is positive. Threshold bias, for passing positive signal of minimum desired amplitude while blocking signals of lesser amplitude, is provided by means of diode D6, which with diodes D4 and D5 forms a gate circuit. Diode D6 is biased by means of resistors R38 and R39, the latter being adjustable for setting the threshold level, and the indicated power supply levels to which resistors R38 and R39 lead.

The output of the full wave detector 3012 is applied to a common emitter stage including transistor T7 within the slope detector 3013. The inverted signal, now negative, is taken off the collector of transistor T7 and is applied to the base of transistor T8, also within the slope detector 3013. Transistor T8 is also connected basically as a common emitter stage, but the emitter is returned to ground through capacitor C13.

The circuitry of transistor T8 operates in the following manner. Normally, T8 is non-conducting. As the (negative) signal comes in to the base of T8, capacitor C13 will be charged rapidly by the emitter current of T8. As soon as the (negative) peak of the incoming lobe is attained, the capacitor C13 stops charging and in fact discharges, and transistor T8 is turned off again. In this sense the circuit of the transistor detects the peaks of the incoming lobe shapes, or their slopes, or more accurately the fact of zero slope of the lobe. The resultant wave shapes at the collector of T8 are in the form of "spikes" concurring with the peaks of the lobes at the base of T8. The "spikes" are more desirable for accurate timing of the ultimate output signals; dependence on the lobes would lead to "jitter" of the ultimate output signals.

The collector output signal of T8 is applied to an emitter follower stage including transistor T9, also within slope detector 3013. The emitter signal of T9 is applied to the blocking oscillator 3014, which is structurally and functionally similar to the blocking oscillator BO previously described. It functions to provide an output pulse of predetermined duration for each incoming spike received, and such output pulses are available at the output terminal.

CONTROLLED MULTIVIBRATOR (FIGURE 53)

Referring to FIGURE 53, the controlled and correctable multivibrator of the Serializer includes the buffer B900 having a first input connected to the GAFC signal line and a second input. The output of buffer B900 is connected to the input of amplifier A900 whose negative output terminal is connected to the input of amplifier A901 and to one end of the speed up resistor-capacitor combination C1–R2. Buffer B900 operates as a gating means in that when its first input terminal is at a negative potential no signals pass from its second input terminal to its output terminal and when its first input terminal is not at a negative potential signals can pass from its second input terminal to the output terminal. The other end of this combination is connected to the base T1B of transistor T1. The base T1B is also coupled via resistor R3 to a plus 20 volt potential. The emitter T1E of transistor T1 is connected to ground potential, and the collector T1C is connected via the resistor R4 to a minus 26 volt potential. Clamping diode D2 connects the collector T1C to a voltage −13Z (a regulated voltage of minus 13 volts). Therefore, the collector T1C can never go below minus 13 volts. Timing capacitor C2 connects the collector T1C to the base T2B of transistor T2. The base, T2B, is connected via resistor R6 to a point having the same potential as the collector T1C when transistor T1 is not conducting. This potential is equal to −13Z less the drop across diode D2 and is obtained by the diode D3 and the resistor R7 connected to minus 26 volts where resistor R7 is the same value as resistor R3 and diodes D2 and D3 are of the same type.

Fine control timing resistors R9 and R10 in series, are connected in parallel with resistor R6. Resistor R8 connects the base T2B to the VC signal line. The emitter T2E of transistor T2 is connected to ground potential and the collector T2C is connected via resistor R11 to a minus 26 volt potential. However, the collector T2C is clamped to a minus 13 volt potential by virtue of the diode D4. Timing capacitor C3 connects the collector T2C to the input of amplifier A902. Timing resistor R13 connects the input of amplifier A902 to the cathode of diode D3 while timing resistor R12 connects the input of amplifier A902 to tthe VC signal line. The output of amplifier A902 is connected to the second input of buffer B900.

The multivibrator operates in the following manner. Initially, when the GAFC signal is at a negative potential, the multivibrator, which is of the free-running type is immobilized. Since the GAFC signal is at a negative potental, the output of buffer B900 is also at a negative potential causing the output of amplifier A900 to be at substantially ground potential. Therefore, the base TB1 of transistor T1 will be above ground potential, by virtue of the divider action of resistors R2 and R3, cutting off transistor T1. Accordingly, a negative potential will exist at the base T2B of transistor T2, which is therefore conducting since its emitter base junction is forward biased. A negative potential will exist at the input of amplifier A902 which therefore transmits substantially ground potental to the second input of buffer B900, but since the GAFC signal is at a negative potential it overrides the positive potential fed to the second input of buffer B900, and the multivibrator remains in this nonoperating state until the GAFC signal goes to ground potential.

At that time the output of buffer B900 goes to ground potential, causing the output of amplifier A900 to assume a negative potential. This negative potential is fed via the parallel combination of resistor R2 and capacitor C1 to the base T1B of transistor T1. Transistor T1 starts conducting, causing the transmission via timing capacitor C2 of a positive going transient to the base T2B of transistor T2, which accordingly cuts-off. When transistor T2 cuts-off, a negative going signal is fed to the input of amplifier A902, since the amplifier A902 had been receiving a negative voltage, nothing further happens to its output. Timing capacitor C2 starts discharging via the timing resistors R6, R8, R9 and R10, until finally, the potential of the base T2B drops to a point sufficient to start conduction in transistor T2. As transistor T2 starts conducting, a positive going transient is fed to the input of amplifier A902 which transmits a negative going signal to the input of buffer B900 which passes this negative going signal to the input of amplifier A900. Amplifier A900 transmits a signal of substantially ground potential to the base of transistor T1, causing the transistor T1 to turn off. The process is regenerative until we reach the point where transistor T1 is completely cutoff and transistor T2 is fully conducting. Timing capacitor C3 starts discharging via timing resistors R12 and R13 and the point is reached where the input to amplifier A902 reaches a potential such that a positive going signal is fed from its output via buffer B900 to amplifier A900 which starts generating a negative going signal, causing the transistor T1 to start conducting. The operation is cumulative until the transistor T1 is completely on, and the transistor T2 is cut-off. The relaxation oscillator will continue until the GAFC signal is returned to a negative potential.

It should be noted that the output of amplifier A900 is connected to the input of amplifier A901, whose output generates the MV signal which is a square wave by virtue of the described operation.

The basic period of the square waves is determined by the capacitor C1 operating in conjunction with resistors R6, R8, R9 and R10, and the capacitor C3 operating with resistors R12 and R13. These elements are chosen so that the free running frequency of the multivibrator is twelve hundred cycles per second plus or minus less than three percent.

In order to constrain the free running frequency of the multivibrator to the frequency of the data bits received from the transmitter, a control voltage VC is generated. Control voltage VC is fed to the free ends of resistors R8 and R12. It should be noted that the effect of this control voltage is to modify the aiming point which the capacitors C2 and C3 discharge towards. The voltage on the VC signal line is a measure of the difference in frequency of the square wave generated by the multivibrator and the frequency of the data bits received from the transmitter. The control voltage VC is generated by the remaining elements of FIGURE 53.

It should be recalled that in the description of the Serializer SZ, the A1 and A2 signals were generated therein in response to, substantially, the comparison of the data bits and the signals derived by the square wave generated by the multivibrator. Signal A1 is a series of pulses which occur in one to one correspondence with the received data edges. The width of these pulses will depend on the phase difference between the counted down multivibrator pulses and the data edges. Signal A2 is a series of pulses of fixed width occurring in a one to one correspondence with the pulses of signal A1. The signal A2 is then subtracted from the signal A1 by the control voltage generating circuitry so that the net result will be a D.C. shift proportional to the phase error and the rate at which data edges are received, i.e., the rate at which phase comparisons are made.

More particularly, the pulses on the A1 signal line are fed via the speedup network comprising capacitors C5 and R14 to the base T4B of transistor T4. The A2 signal is fed via a speedup network comprising resistors C6 and R15 and via the phase inverter comprising the amplifier T3 and the speedup network comprising capacitor C7 and resistor R20 to the base T5B of transistor T5. Therefore, when the base T4B of transistor T4 receives a square wave, the base T5B of transistor T5 will also receive a square wave which is substantially one hundred and eighty degrees out of phase therewith. If the pulses on lines A1 and A2 are exactly in phase, indicating no error, the pulses received at the bases T4B and T5B, respectively, will be exactly one hundred and eighty degrees out of phase. The collectors T4C and T5C of the transistors T4 and T5 feed opposite arms of an algebraic resistance adder comprising serially connected resistors R23 and R24 having equal values and whose junction is connected to a filtering capacitor C8. The transistors T4 and T5 are substantially linear amplifiers. Therefore, a true subtraction is performed and if there is no phase difference between the signals, no direct-current signal is transmitted from the junction of the resistors R23 and R24. However, if there is a phase difference, either a positive or negative direct-current signal component remains which is a measure of the phase difference. This direct-current signal component is fed via the cascaded emitter follower amplifiers T6 and T7 which are used to provide minimum loading of the junction of resistors R23 and R24 by the input to the common base amplifier T8. Common emitter amplifier T8, accordingly amplifies this direct-current signal component and feeds it as the VC signal to the multivibrator.

It should be noted that the transistor T4 which operates as a common emitter amplifier is of the PNP type whose base T4B receives the input signal and whose collector T4C is coupled via a resistor R25 to the −13Z potential line and whose emitter T4E is connected to ground potential. The transistor T5 is of the NPN type which operates as a common emitter amplifier, whose emitter T5E is connected to a −13Z potential line and whose collector T5C is connected via a resistor R21 to ground potential. The values of the resistors R21 and R25 are substantially equal. Therefore, minimum distortion is introduced in the signals received at the collectors T4C and T5C respectively, which are then subtracted by the algebraic adder.

The potential on the line −13Z is generated at the junction of resistor R1 and diode D1. The free end of resistor R1 is connected to a minus 26 volt potential and the free end of diode D1 is connected to ground. The diode D1 is a Zener diode and at this time is in the breakdown condition, establishing a minus thirteen volt potential which is regulated. The initial or quiescent setting of the value for the control voltage VC is obtained by fixing the potential of the emitter T8E of the amplifier T8. The emitter T8E is connected to the center tap of a potentiometer comprising resistors R28, R30 and R31, whose outer arms are connected to ground potential and the −13Z potential line respectively.

SIGNAL LIST

Only those signals are listed which are fed between blocks of the system. Those used only internal to a block, as a rule, are not included in the list even if they are given specific reference number designations within the block. Several signals which are listed do not include the blocks of use because they are used almost universally throughout the system. These signals are the general clearing and timing signals. Signals serving to energize lamps or other indicators are omitted.

| Signal | Source | Remarks | Used |
|---|---|---|---|
| ABRD | Fig. 20 | enable mag. tape read | Figs. 18, 19, 20. |
| ACI | Fig. 23 | termination character for acknowledge, connect or idle. | Fig. 24. |
| ACK | Fig. 23 | acknowledge mode | |
| ADC | Fig. 22 | advance Sodeco counter | Fig. 32. |
| AFW | Fig. 18 | allow tape forward for re-read or re-write | Figs. 17, 19, 20. |
| AKR | Fig. 23 | reset acknowledge mode | Figs. 8, 23, 28. |
| ALCK | Fig. 15 | memory inhibit pulse for recirculated date | Figs. 15, 18, 23. |
| ALL | Fig. 22 | allow mode | Figs. 20, 22. |
| AUT | Fig. 8 | automatic (continuous) mode | Figs. 8, 20. |
| AUTO | Fig. 31 | Automatic mode switch | Fig. 8. |
| BA(A–G) | Fig. 25 | Buffer A in coupler section | Figs. 23, 24, 25, 26. |
| BB(A–G) | Fig. 25 | Buffer B in coupler section | Figs. 12, 16, 24, 25, 27, 28. |
| BC1–5 | Fig. 19 | Block counter signals | Fig. 18. |
| BDA | Fig. 22 | Bid or allow modes | Figs. 8, 17, 22, 24, 27. |
| BID | Fig. 22 | Bid mode | Fig. 22. |
| BL(A–C) | Fig. 16 | Five count for IBM memory fill | Figs. 11, 16, 27. |
| BMA–B | Fig. 16 | Outputs of counter that counts BLC's | Figs. 11, 16, 27. |
| BT(A–H) | Fig. 24 | Bit clock signals | Figs. 12, 15, 16, 21, 23, 24, 25, 26, 27, 28. |
| BTP | Fig. 17 | Bad tape detector | Figs. 18, 20, 21. |
| CAD | Transceiver DF | Carrier detector signal from subset | Fig. 22. |
| CC(1–7) | Fig. 6 | Mag. tape long. parity counters | Fig. 18. |
| CC(01–16) | Fig. 14 | Memory col. counter | Figs. 14, 20. |
| CCC(1–2) | Fig. 14 | Memory counter clear | Fig. 14. |
| CD(A–D) | Fig. 23 | Set by remote terminal-defines nature of remote station. | Figs. 23, 24. |
| CFC | Fig. 19 | Inhibits LOZ fill at the end of a section of a large block. | Fig. 16. |
| CHE | Fig. 26 | Error Character detector | Fig. 23. |
| CHR | Fig. 21 | Substitution time when reconstructing line data | Figs. 15, 19. |
| CKDL | Fig. 15 | Memory clock-counter advance | Figs. 5, 7, 11, 19, 21. |
| CKHB | Fig. 15 | Memory clock-inhibit | Figs. 15, 19, 20. |
| CKRE | Fig. 15 | Memory clock-read | Figs. 13, 16, 20. |
| CKST | Fig. 15 | Memory clock-strobe | Fig. 15. |
| CKWR | Fig. 15 | Memory clock-write | Fig. 13. |
| CLB | Fig. 21 | Clear Buffer B | Fig. 25. |
| CLE | Fig. 24 | Terminate coupler send or receive | Figs. 20, 22, 23, 26, 27, 28. |
| CLEM | Fig. 14 | Clear memory row counter | Figs. 16, 20. |
| CNE | Fig. 23 | Coupler connect error | Figs. 23. |
| CLN | Fig. 25 | Clear signal at beginning of send, receive or disconnect. | Fig. 21. |
| CMER | Fig. 19 | Comparison output: line data ± memory data | Fig. 21. |
| DLR | Fig. 23 | Disconnect clear | |
| CMHB | Fig. 21 | Stops reconstruction in event of CMER | Fig. 21. |
| COE | Fig. 21 | Memory error | Figs. 17, 18, 19, 20. |
| COM | Fig. 21 | Reconstruction input cycle | Figs. 19, 21. |

| Signal | Source | Remarks | Used |
|---|---|---|---|
| CON | Fig. 22 | Connect mode | Figs. 13, 20, 22. |
| CRUR | Fig. 20 | Last memory address | Fig. 20. |
| CT(A–E) | Fig. 24 | Transmit char. count in coupler | Figs. 24, 28. |
| DCL | Fig. 23 | Disconnect | Figs. 15, 20, 22, 28. |
| DCLR | Fig. 28 | Disconnect relay | Fig. 32. |
| DCM | Fig. 23 | Disable disconnect point | Figs. 23, 31. |
| DE(00-63) | Fig. 9 | Decoder output | Fig. 10. |
| DEB | Fig. 5 | Delete a forced end of block signal | Fig. 16. |
| DFC | Fig. 19 | Marks period from beginning of fill operation for a large block until end of acknowledge mode. | Figs. 17, 18, 19, 21. |
| DIN | Fig. 25 | Data from line | Figs. 25, 29. |
| DIND | Transceiver DF | Data from subset | Fig. 25. |
| DLE | Fig. 8 | Read bad tape mode | Figs. 12, 16, 18, 20, 21, 26. |
| DLEA, DLEG | Fig. 30 | Read bad tape switch | Fig. 8. |
| DT (1–7) | Fig. 5 | Tape store 2 | Fig. 15. |
| DRC(1-3) | Transceiver DF | Connect-disconnect coupler and transceiver | Figs. 30, 32. |
| DT | Fig. 29 | Trailing edge of line data used in AFC ckts | Fig. 29. |
| DTA(1-6) | Fig. 12 | Data to decoder | Fig. 9. |
| DTE(1-6) | Fig. 9 | Amplified data to decoder | Fig. 9. |
| EACK | Fig. 20 | End of acknowledge, connect or allow modes | Figs. 19, 20, 21. |
| EB(A–C) | Fig. 24 | End of block detector | Figs. 24. |
| EBD | Fig. 24 | End of block detected | Figs. 22, 24. |
| EC(A–G) | Fig. 26 | Forced char. to buffer B | Fig. 25. |
| EDF | Fig. 8 | Write end of data pulse | Fig. 20. |
| EE(A–B) | Fig. 23 | Coupler error counter | Figs. 17, 21, 22. |
| EFCH | Fig. 8 | Write end of data cycle | Figs. 7, 8, 18, 20. |
| EM(A–C) | Fig. 24 | End of transmission decoders | Fig. 24. |
| EMP | Fig. 24 | Buffer A empty | Figs. 15, 21, 23, 26, 27. |
| EMS | Fig. 24 | Forced end of block detector | Figs. 15, 20, 21. |
| EN(A–C) | Fig. 24 | End of block decoder | Figs. 5, 24. |
| ENBL | Fig. 19 | End memory char. detector | Fig. 18. |
| ENC(1-6) | Fig. 11 | Amplified output of encoder 1 (line to mag. tape) | Fig. 16. |
| ENDT | Fig. 17 | End of mag. tape detector | Fig. 19. |
| ENR | Fig. 18 | Stop tape reverse | Figs. 8, 17, 19. |
| ENRV | Fig. 19 | Tape block counter =1 | Fig. 18. |
| ENS | Fig. 24 | End of block or end of transmission codes detected | Figs. 21, 24, 26, 27. |
| ENWR | Fig. 20 | End of tape motion | Figs. 8, 14, 17, 18, 19, 20, 21. |
| EOB | Fig. 24 | End of block pulse in coupler | Figs. 8, 20, 22, 23, 27. |
| EOC | Fig. 23 | Termination character for acknowledge connect or idle. | Figs. 22, 23, 26. |
| EOFR | Fig. 17 | End of file code detected | Figs. 17, 20. |
| EOP | Fig. 22 | End of transmission | Fig. 28. |
| EOT | Fig. 24 | End of transmission code detected | Figs. 20, 22, 27. |
| EOTR | Fig. 23 | End of transmission acknowledged | Figs. 8, 20 ,22, 23. |
| EPE | Fig. 27 | Coupler even parity error | Fig. 26. |
| ERR | Fig. 23 | Coupler error | Fig. 18, 19, 22, 23, 26, 28. |
| ERS | Fig. 8 | Clear error flops | Figs. 18, 21. |
| ERV | Fig. 17 | End of mag. tape sprockets | Fig. 17, 18. |
| ES(A–C) | Fig. 24 | End of transmission code detectors | Fig. 24. |
| EST | Fig. 17 | Erase bad tape section | Fig. 18. |
| ETD | Fig. 24 | End of transmission code detected | Fig. 24. |
| ETPS | Fig. 17 | End of tape detector | Fig. 17. |
| ETT | Fig. 22 | End of transmission | Figs. 20, 22, 23. |
| EDFA, EDFG | Fig. 20 | Write end data switch | Fig. 8. |
| ERSA, ERSG | Fig. 31 | Clear error flops switch | Fig. 8. |
| EVEN | Fig. 21 | Mag. tape even parity | Figs. 7 15, 18. |
| EVEL | Fig. 27 | Line even parity | Figs. 25, 26. |
| EZC(1-6) | Fig. 12 | Amplified output of encoder 2 (mag. to line) data | Fig. 16. |
| EZCS | Fig. 12 | Amplified encoder 2 lower case character | Fig. 16. |
| FCE | Fig. 23 | Four consecutive errors | Fig. 23. |
| FEB | Fig. 5 | Force end of tape block character | Fig. 15. |
| FER | Fig. 30 | Force erase | Fig. 8. |
| FGL | Fig. 16 | Generates clock signals during fill operations | Fig. 16, 22. |
| FGM | Fig. 16 | Force group mark-generates memory end sentinel | Figs. 14, 16, 19, 20. |
| FGR | Fig. 21 | Upper case character being transmitted | Fig. 21. |
| FIEB | Fig. 26 | Force ignore tape error block character into buffer B. | Fig. 26. |
| FILB | Fig. 26 | Force ignore last block character into buffer B | Fig. 26. |
| FIG | Fig. 21 | Force upper case shift into coupler | Fig. 21. |
| FILL | Fig. 20 | Initiates fill operation | Fig. 16. |
| FLB(A–F) | Fig. 14 | Forced character into memory | Fig. 16. |
| FLBL | Fig. 14 | Controls memory fill to multiple of five | Fig. 16. |
| FLEB | Fig. 14 | Insert memory end character | Figs. 16, 20. |
| FLEB 1 | Fig. 14 | Insert memory end character | Fig. 19. |
| FLIG | Fig. 14 | Insert memory fill character | Figs. 16, 27. |
| FLOZ | Fig. 14 | Generates fill characters at end of section of large block. | Fig. 11. |
| FLX | Fig. 20 | Occurs with end block character fill after Max | Fig. 16. |
| FOR | Fig. 18 | Mag. tape forward | Figs. 8, 18. |
| FWD | Fig. 8 | Tape unit forward | |
| FWP | Fig. 18 | Pulse at beginning of mag. tape forward | Figs. 7, 14, 17, 18, 19, 21. |
| GCL | Fig. 23 | Disconnect clear | |
| ICE | Fig. 26 | Ignore last block character detected | Fig. 23. |
| IDLE | Fig. 22 | Idle mode | Figs. 15, 17, 19, 20, 21, 22, 23. |
| IEC | Fig. 26 | Insert error char. into buffer B | Figs. 16, 31. |
| ILB, ILB2, ILB3 | Fig. 26 | Ignore last block time in coupler | Figs. 25, 26, 27. |
| INE | Fig. 24 | Transmitted char. count of two during acknowledge bid or allow. | Figs. 22, 23, 28. |
| INH | Fig. 22 | Data inhibit at start of receive | Figs. 22, 23, 25, 26. |
| INS | Fig. 21 | Controls insertion of upper and lower case shifts | Fig. 21. |
| INT | Transceiver DF | Subset in data mode | Fig. 22. |
| IRF | Fig. 24 | Send reference characters before transmission of data. | Figs. 24, 25. |
| JAM | Fig. 18 | Signal at beginning and end of tape motion | Figs. 4, 5, 6, 17. |
| LAL | Fig. 8 | Allow tape write amps | Fig. 3. |
| LBF | Fig. 27 | Special format | Figs. 18, 19, 21. |
| LCC | Fig. 26 | Lower case shift detected | Figs. 12, 16, 27. |
| LET | Fig. 21 | Force lower case shift into coupler | Fig. 21. |
| LP(A–G) | Fig. 26 | Coupler long. parity counters | Figs. 26, 28. |
| LPCK | Fig. 17 | Check mag. tape long. parity | Figs. 5, 18. |
| LPI | Fig. 17 | Mag. tape long. parity time | Fig. 17. |
| LPL | Fig. 26 | Initiates termination of coupler send or receive | Figs. 24, 25, 26. |
| LPLS | Fig. 27 | Initiates termination of coupler send or receive | Fig. 26. |
| LPR | Fig. 26 | Coupler long. parity error | Figs. 21, 28. |
| LPT, LPTi | Fig. 26 | Coupler long. parity time | Figs. 22, 25, 26, 28. |
| LTR | Fig. 21 | Lower case char. being transmitted | Fig. 21. |

| Signal | Source | Remarks | Used |
|---|---|---|---|
| LX(1-4) | Fig. 9 | Lower case char. decode for flex code | Fig. 11. |
| LOZ | Fig. 11 | Operator error LOZ fill | Fig. 16. |
| MAN | Fig. 31 | Manual operation | Fig. 8. |
| MAF(1-2) | Fig. 29 | Disable AFC points | Fig. 31. |
| MAL | Fig. 30 | Allow set of Master mode | Fig. 22. |
| MAX | Fig. 27 | Preset character count reached | Figs. 20, 24. |
| MC(01-32) | Fig. 14 | Memory col. addresses | Fig. 13. |
| MCS | Fig. 24 | Bid Character Switch | Fig. 31. |
| MDT(1-7) | Fig. 15 | Memory data | Figs. 7, 12, 15, 19. |
| MEME | Fig. 15 | Memory parity error | Figs. 12, 16, 18, 19, 21. |
| MG(A-G) | Fig. 21 | Character forced into coupler | Fig. 25. |
| MPE | Fig. 21 | Coupler error (line) | Fig. 23. |
| MR(01-32) | Fig. 14 | Memory row addresses | Fig. 13. |
| MSR | Fig. 22 | Master mode | Figs. 22, 23. |
| MTE | Fig. 19 | Coupler error (mag. tape) | Fig. 23. |
| MVPI | Fig. 18 | Tape write clock | Fig. 15. |
| MXC | Fig. 27 | Marks largest section of a record that receiver can handle in memory. | Fig. 27. |
| MXM | Fig. 20 | Preset memory address has been reached | Figs. 18, 20. |
| NDT(1-7) | Fig. 16 | Data from encoders | Figs. 15, 16, 19, 25. |
| NDTE | Fig. 16 | Even parity bit from encoders | Fig. 25. |
| NDTS | Fig. 16 | Lower case char. from encoder 2 (mag. to line) | Fig. 21. |
| NT(A-N) | Fig. 27 | Coupler char. counter | Fig. 27. |
| OBF | Fig. 8 | Tape fwd. one block pulse | Fig. 15. |
| OBR | Fig. 8 | Tape reverse one block pulse | Fig. 18. |
| ODD | Fig. 21 | Mag. tape odd parity | Figs. 7, 15, 18. |
| OBFF | Fig. 17 | Force tape fwd. one block | Fig. 8. |
| ODDL | Fig. 27 | Odd line parity | Figs. 25, 26. |
| OBRA, OBRG | Fig. 30 | Tape fwd. switch | Fig. 8. |
| OBFA, OBFG | Fig. 30 | Tape rev. switch | Fig. 8. |
| ONEB | Fig. 8 | Tape fwd. one block | Figs. 17, 18, 20. |
| OPE | Fig. 27 | Coupler odd parity error | Fig. 26. |
| OTD | Fig. 18 | Start tape reverse | Fig. 8. |
| OTF, OTF1 | Fig. 18 | Tape forward write | Figs. 3, 8, 15, 17, 18, 20. |
| OTR, OTR1 | Fig. 18 | Tape reverse | Figs. 8, 17, 18, 19. |
| OTRP | Fig. 18 | Start of tape reverse | Fig. 18. |
| PADM | Fig. 16 | Sprocket for transfer from coupler to memory | Fig. 15. |
| PET | Fig. 18 | Mag. tape parity error | Figs. 18, 19, 20. |
| PNC | Fig. 30 | Copy-mag. to punch | Figs. 22, 23, 24, 28. |
| POB | Fig. 30 | Copy one block | Fig. 23. |
| PRN | Fig. 22 | Print on Sodeco counter | Fig. 32. |
| PROA, PROG | Fig. 31 | Proceed switch | Fig. 8. |
| PROC | Fig. 8 | Manual proceed signal | Figs. 8, 20. |
| R(1-7) | Fig. 4 | Tape data | Fig. 17. |
| R(1-7) | Fig. 3 | Tape data from read amps | Fig. 4. |
| RBT | Fig. 31 | Read bad tape | Fig. 18. |
| RC(01-16) | Fig. 14 | Memory row counter | Figs. 14, 20. |
| RCV | Fig. 22 | Receive mode | Figs. 11, 16, 21, 25, 26, 28. |
| RDA | Fig. 21 | Transfer from memory to coupler | Figs. 12, 15, 16, 21, 26. |
| REC | Fig. 23 | Coupler is a receiver | Figs. 8, 16, 17, 19, 20, 22, 23, 28. |
| REC1 | Fig. 23 | Coupler is a receiver | Figs. 12, 15, 16. |
| RECV | Fig. 30 | Master is a receiver | Fig. 23. |
| REE | Fig. 23 | Error is acknowledged | Figs. 8, 18, 20, 21, 23, 28. |
| REV | Fig. 8 | Tape unit reverse control | Tape Unit. |
| ROB | Fig. 8 | Tape reverse one block signal | Figs. 17, 18. |
| RTO | Fig. 30 | Retransmit mode | Figs. 8, 17, 19, 20, 21, 22, 23, 24, 27, 28. |
| RTS | Fig. 22 | Request to send signal | Figs. 23, 25, 26, 29. |
| RTSD | Fig. 29 | Request to send signal to subset | Transceiver DF. |
| RTSDS | Fig. 29 | Request to send signal for maintenance | Transceiver DF. |
| RTT | Fig. 22 | Beginning of send or receive | Figs. 14, 24, 25, 27. |
| SDS | Fig. 20 | Disconnect signal to coupler | Figs. 8, 23. |
| SEE | Fig. 23 | Synch error during data reception | Figs. 23, 28. |
| SILB | Fig. 26 | Set ignore last block flip-flop | Fig. 26. |
| SPL | Fig. 26 | Pulse after data transfer to buffer B | Figs. 24, 26, 27. |
| SPLD | Fig. 26 | Pulse after data transfer to buffer B | Fig. 27. |
| STB | Fig. 29 | Coupler data strobe | Fig. 25. |
| SPWR | Fig. 27 | Marks beginning of fill of special character at end of a section of a large block. | Figs. 16, 19, 20, 27. |
| STBT | Fig. 29 | Coupler tuning fork clock | Fig. 29. |
| STBR | Fig. 29 | Coupler AFC strobe | Fig. 29. |
| STP | Fig. 24 | End of send or receive in coupler | Fig. 21. |
| STPW | Fig. 18 | Start tape write | Fig. 14. |
| STR | Fig. 21 | Strobe for transfer of data to coupler | Figs. 16, 25. |
| STRD | Fig. 20 | Start tape read | Figs. 18, 20. |
| STS | Fig. 22 | Start to send signal | Figs. 24, 29. |
| STSD | Transceiver DF | Start to send signal from subset | Fig. 22. |
| STU | Fig. 17 | Start tape forward after a reverse | Figs. 17, 18, 20. |
| STWR | Fig. 20 | Start tape write | Fig. 18. |
| SYE | Fig. 25 | Synch error | Figs. 23, 25, 26, 29. |
| SYN | Fig. 25 | Coupler is in synch | Fig. 25. |
| SYP | Fig. 29 | Synch error clear pulse | Fig. 29. |
| SPC | Fig. 26 | Special count time at punch | Fig. 26. |
| TBRS | Tape Unit | Generated with sensing of foil at beginning of tape | Fig. 17. |
| TDAD | Fig. 28 | Data to subset | Transceiver DF. |
| TDADS | Fig. 28 | Data to subset for maintenance | Transceiver DF. |
| TD(1-7) | Fig. 4 | Tape store 1 | Figs. 6, 17, 18. |
| TELE | Fig. 27 | Teletype line code | Fig. 12. |
| TERS | Tape Unit | Generated with sensing of foil at end of tape | Fig. 17. |
| TFW | Fig. 18 | Tape forward-read | Figs. 5, 8, 15, 20. |
| TFW1 | Fig. 18 | Tape forward-read | Figs. 15, 17, 20, 21. |
| TLM | Fig. 17 | Used to produce leader on output tape | Fig. 17. |
| TM(A-C) | Fig. 25 | Coupler bit counter | Fig. 24. |
| TPE | Fig. 18 | Mag. tape parity error | Figs. 18, 20. |
| TR(1-7) | Fig. 4 | Tape store 1 | Fig. 5. |
| TR8 | Fig. 17 | Tape sprocket | Figs. 5, 15, 17, 18. |
| TRD | Fig. 22 | Transmit data to subset | Fig. 28. |
| TRF | Fig. 22 | Transmit reference character before data | Figs. 21, 24. |
| TRM | Fig. 22 | Transmit mode | Figs. 22, 25, 27, 28. |
| TRS | Fig. 23 | Coupler is a transmitter | Figs. 17, 19, 20, 22, 23, 28. |
| TRSM | Fig. 30 | Master is a transmitter | Fig. 23. |
| TSP | Fig. 17 | Mag. tape sprocket | Fig. 4 |
| TW(1-7) | Fig. 7 | Tape write data | Fig. 3. |
| TZR | Fig. 19 | Force transmission of reference characters | Fig. 24. |
| UCC | Fig. 26 | Upper case shift char. detected | Figs. 12, 16, 27. |
| UCH | Fig. 17 | Upper case H detected on mag. tape | Figs. 17, 18. |
| UCGH | Fig. 19 | Upper case G or H detected in memory (allow INS) | Fig. 21. |

| Signal | Source | Remarks | Used |
|---|---|---|---|
| UCSH | Fig. 12 | Upper case character being received | Figs. 9, 12. |
| URW | Fig. 19 | Four unsuccessful write attempts | Fig. 20. |
| UX(1-4) | Fig. 9 | Upper case char. decode for flex code | Fig. 11. |
| VPE | Fig. 26 | Coupler parity error | Figs. 21, 26, 28. |
| WEN | Tape Unit | Tape ring allow write | Fig. 3. |
| WLPC | Fig. 18 | Write long. parity char. on tape | Figs. 7, 19, 20. |
| WMGT | Fig. 18 | Tape write control | Figs. 7, 17, 18. |
| WREP | Fig. 7 | Write end of file char. on tape | Figs. 7, 18. |
| WREP(1-7) | Fig. 7 | End of file char | Fig. 7. |
| XA(00-63) | Fig. 10 | Amplified decoder output | Figs. 11, 12. |
| XBD | Fig. 12 | Allows insertion of ignore block character when read bad tape control is in use. | Figs. 12, 26. |
| FMAX | Fig. 27 | Forced MAX count | Fig. 27. |
| MMRO | Fig. 31 | Memory read out switch | Figs. 8, 15, 31. |
| SPAC | Fig. 26 | Allow letter punch after space code | Fig. 12. |

CONCLUSION

Although only one embodiment of the various aspects of the invention has been shown and described in detail, there will now be obvious to those skilled in the art many modifications and variations which satisfy many or all of the objects, and to which accrue the advantages of the invention, but which do not depart from the spirit of the invention as defined by the appended claims.

What is claimed is:

1. A system for transferring a group of characters comprising: transmitting means for transmitting the group of characters; and receiving means for receiving the group of characters, said receiving means including storage means for storing the received characters, first error detecting means for detecting errors in the characters being received by said receiving means, first control means operative during an initial transmission of the group of characters and responsive to said error detecting means for causing said transmitting means to retransmit the group of characters whenever an error is detected in any received character in the group, means operative during the retransmission of the group of characters to store in said storage means error free characters by causing to be stored in said storage means either the newly received character if error free, or the related previously received and stored error free character, second error detecting means operative during the retransmission of the group of characters for detecting errors in said related previously received and stored characters, and second control means operative during the retransmission of the group of characters and responsive to said first and second error detecting means to clear said storage means and to cause a further transmission, equivalent to an original transmission, when said first error detecting means detects an error in a retransmitted character and said second error detecting means detects an error in the related previously received and stored character.

2. The system of claim 1 wherein each of said characters is represented by a coded combination of binary digits having a given parity and said first and second error detecting means detects for the parity of the characters.

3. A system for transferring a group of characters comprising: transmitting means for transmitting the group of characters, receiving means for receiving the group of characters, said receiving means including storage means for storing the received characters, first error checking means for detecting errors in the characters being received by said receiving means, first control means operative during an initial transmission of the group of characters and responsive to said first error detecting means for causing said transmitting means to retransmit the group of characters whenever an error is detected in any received character in the group, means operative during the retransmission of the group of characters to store in said storage means error free characters by causing to be stored in said storage means either the newly received character if error free or the related previously received and stored error free character, second error checking means operative during the retransmission of the group of characters for detecting errors in said related previously received and stored characters, comparison means for testing equality of newly received characters and their respective related previously received and stored characters, second control means responsive to said first and second error detecting means for activating said comparison means when both said error checking means reflect that a given newly received character and also its related previously received and stored character are apparently error free, and third control means responsive to said comparison means reflecting inequality, for clearing said storage means and for causing a further transmission, equivalent to an original transmission, of the group of characters and for causing said storage means to store only the characters received during such further transmission.

4. The system of claim 3 wherein each of said characters is represented by a coded combination of binary digits having a given parity and said first and second error checking means check for the parity count of the binary digits of the characters.

5. In a system including a transmitter of information in the form of a group of characters, and a receiver of such information: means for reconstructing the group of characters to assure that the received information is ultimately error free, the reconstruction means comprising: means for checking each originally received character to detect any error therein, and means for storing the entire group of originally received characters; means responsive to the error detection means detecting error in any originally received character to cause a retransmission of the entire group of characters from said transmitter to said receiver; means for checking each newly received character to detect any error therein; means responsive to the latter checking means for replacing in storage an originally received character exhibiting error by its related newly received character and for blocking from storage a newly received character exhibiting error while retaining in storage its related originally received error free character; means also responsive to said latter checking means for comparing for equality a newly received character and its related originally received character when both are apparently error free; and means responsive to said comparison means and to said checking means for removing from storage the entire character group and for causing a further transmission of the same group of characters, equivalent to an original transmission, when an originally received character and its related newly received character both exhibit error, or both are apparently error free but unequal.

6. A system for transferring information comprising: first, second and third units; said first unit including means for transmitting information to said second unit; said second unit including means for receiving information from said first unit, means for transmitting the information received from said first unit to said third unit and first error checking means for detecting errors in the information transmitted by said second unit to said third unit; said third unit including means for receiving the information transmitted by said second unit, second error checking means for detecting errors in the information received by said third unit from said second unit, and directing means responsive to the detection of an error by said second error checking means for directing retransmission of the information ultimately to said third unit; and control means in said second unit responsive to the directing means of said third unit and to said first error checking means to cause the transmitting means in said second unit to retransmit the information from said second unit to said third unit if said first error checking means had detected no error, and to direct said first unit to retransmit the information to said second unit for retransmission by said second unit to said third unit when said first error checking means had detected an error.

7. A system for transferring information comprising: first, second and third units; said first unit including first transmitting means for transmitting information to said second unit; said second unit including first receiving means for receiving information from said first unit, storing means for storing the received information, second transmitting means for transmitting the stored information to said third unit, transfer means for transferring the information from said storing means to said second transmitting means, and first error checking means in said unit for detecting errors in the information stored in said storing means when being transmitted to said third unit; said third unit including second receiving means for receiving the information transmitted by said second unit, second error checking means for detecting errors in the information received from said second unit, and means responsive to said second error checking means detecting an error for directing retransmission of the information ultimately to said third unit; and control means in said second unit responsive to the directing means of said third unit and to said first error checking means for causing said transfer means to transfer the information in said storing means to said second transmitting means in said second unit to retransmit the information stored in said storing means if said first error checking means had detected no error, and for directing said first unit to retransmit the information to said second unit when said first error checking means has detected an error, for replacing the information in said storing means before causing said transfer means to transfer the information from said storing means to said second transmitting means for retransmission to said third unit.

8. A system for transferring information comprising: first, second and third units; said first unit including first transmitting means for transmitting information to said second unit; said second unit including first receiving means for receiving information from said first unit, first error checking means for detecting errors in the received information, second transmitting means for transmitting the received information to said third unit, first control means responsive to said first error checking means for causing retransmissions of the information from said first unit to said second unit when an error is detected and for activating said second transmitting means when no error is detected, and second error checking means for detecting errors in the information transmitted to said third unit; said third unit including second receiving means for receiving the information transmitted by said second unit, third error checking means for detecting errors in the received information, and directing means responsive to said third error checking means detecting error for directing a retransmission of the information ultimately to said third unit; and second control means in said second unit responsive to the directing means of said third unit and to said second error checking means to cause said second transmitting means in said second unit to retransmit the information if said second error checking means had detected no error, and to direct said first unit to retransmit to said second unit for retransmission by said second unit to said third unit when said second error checking means has detected an error.

9. A system for transferring information comprising: first, second and third units; said first unit including first transmitting means for transmitting information to said second unit; said second unit including first receiving means for receiving information from said first unit, first error checking means for detecting errors in the received information, storing means for storing the received information, second transmitting means for transmitting the stored information to said third unit, transfer means for transferring the information from said storing means to said second transmitting means, first control means responsive to said first error checking means for causing retransmissions of the information from said first unit to said second unit when an error is detected and for activating said second transmitting means when no error is detected and second error checking means for detecting errors in the information transmitted to said third unit; said third unit including second receiving means for receiving the information transmitted by said second unit, third error checking means for detecting errors in the received information, and directing means responsive to said third error checking means detecting error for directing a retransmission of the information ultimately to said third unit; and second control means in said second unit responsive to the directing means of said third unit and to said second error checking means to cause said transfer means to transfer the information in said storing means to said second transmitting means in said second unit to retransmit the information stored in said storing means if said second error checking means had detected no error, and for directing said first unit to retransmit the information to said second unit when said first error checking means has detected an error, for replacing the information in said storing means before causing said transfer means to transfer the information from said storing means to said second transmitting means for retransmission to said third unit.

10. A system for transferring information comprising: first, second, third and fourth units; said first unit including first transmitting means for transmitting information to said second unit; said second unit including first receiving means for receiving information from said first unit, second transmitting means for transmitting the received information to said third unit and first error checking means for detecting errors in the information transmitted to said third unit; said third unit including second receiving means for receiving the information transmitted by said second unit, second error checking means for detecting errors in the received information, and first directing means responsive to said second error checking means detecting error for directing retransmission of the information ultimately to said third unit, and third transmitting means for transmitting information from said third unit to said fourth unit; first control means in said second unit responsive to said first directing means of said third unit and to said first error checking means to cause said second transmitting means in said second unit to retransmit the information if said first error checking means had detected no error, and to direct said first unit to retransmit to said second unit for retransmission by said second unit to said third unit when said first error checking means had detected an error; said fourth unit including third means for receiving the information transmitted by said third unit, third error checking means for detecting errors in the received information second directing means responsive to said third error checking means for directing retransmission of the information ultimately to said fourth unit; and second control means in said third unit responsive to said second directing means of said fourth unit and to said second error checking means to cause said third transmitting means in said third unit to retransmit the information if said second error checking means had not detected an error, and to direct said second unit to retransmit to said third unit for retransmission by said third unit to said fourth unit when said second error checking means had detected an error.

11. A system for transferring information comprising: first, second, third and fourth units; said first unit including first transmitting means for transmitting information to said second unit; said second unit including first receiving means for receiving information from said first unit, first error checking means for detecting errors in the received information, second transmitting means for transmitting the information received by said first receiving means to said third unit, first control means responsive to said first error checking means for causing retransmissions of the information from said first unit to said second unit when an error is detected and for activating said second transmitting means when no error is detected, and second error checking means for detecting errors in the information transmitted to said third unit; said third unit including second receiving means for receiving the information transmitted by said second unit, third error checking means for detecting errors in the received information, and directing means responsive to said third error checking means detecting error for directing a retransmission of the information ultimately to said third unit; and second control means in said second unit responsive to the directing means of said third unit and to said second error checking means to cause said second transmitting means in said second unit to retransmit the information if said second error checking means had detected no error, and to direct said first unit to retransmit to said second unit for retransmission by said second unit to said third unit when said second error checking means has detected an error; said fourth unit including third means for receiving the information transmitted by said third unit, fourth error checking means for detecting errors in the received information second directing means responsive to said fourth error checking means for directing retransmission of the information ultimately to said fourth unit; and second control means in said third unit responsive to said second directing means of said fourth unit and to said third error checking means to cause said third transmitting means in said third unit to retransmit the information if said third error checking means had not detected an error, and to direct said second unit to retransmit to said third unit for retransmission by said third unit to said fourth unit when said third error checking means had detected an error.

12. An information transfer system for transferring blocks of units of information comprising a punched paper tape reader including a transducer for converting holes in the paper tape to electrical signals and a transport means for moving the paper tape past said transducer, transmitting means for transmitting the electrical signals received from said transducer, counting means for counting the units of information being transferred, and control means responsive to said counting means for suspending transmission of the units of information in the block for a given time interval after a predetermined number of units of information have been transmitted, said control means including means for deactivating said transport means to stop moving said paper tape past said transducer means when said predetermined number is counted by said counting means, time interval generating means for generating a time interval when said predetermined number is counted by said counting means, and means responsive to said time interval generating means to reactivate said transport means to start moving said paper tape past said transducer means at the end of said time interval.

13. A system for transferring blocks of units of information comprising means for transmitting the units of information, counting means for counting the units of information transmitted, first receiving means for receiving the units of information being transmitted, means responsive to said counting means for suspending transmission of said units of information by said transmitting means for a given period of time when a predetermined number of units of information have been transmitted, second receiving means, means responsive to said counting means, when said predetermined number of units of information have been transferred, for transmitting the units of information received by said first receiving means to said second receiving means and for appending to said units of information a control unit of information for indicating that the succeeding units of information received by said second receiving means are included in the same block of units being transmitted.

14. A system for transferring blocks of units of information comprising means for serially transmitting the units of information, counting means for counting the units of information transmitted, first receiving means for receiving and storing the units of information being transmitted, means responsive to said counting means for suspending transmission of said units of information by said transmitting means for a given period of time when a predetermined number of units of information have been transmitted, second receiving means, means responsive to said counting means when said predetermined number of units of information have been transferred for transmitting serially the units of information stored by said first receiving means to said second receiving means and means for transmitting after the transmission of the last of said stored units of information a control unit of information for indicating that the succeeding units of information received by said second receiving means are included in the same block of units being transmitted.

15. A system for transferring blocks of units of information comprising: a transmitting station including means for serially transmitting the units of information, first counting means for counting the units of information transmitted, and first control means responsive to said counting means for suspending transmission of said units of information by transmitting means for a given period of time when a predetermined number of units of information have been transmitted; and a receiving station including first receiving means for receiving and storing the units of information being transmitted, second receiving means, second counting means for counting the units of information received by said first receiving means, means responsive to said second counting means when said predetermined number of units of information have been received for transmitting serially the units of information stored by said first receiving means to said second receiving means and means for appending to said units of information a control unit of information for indicating that the succeeding units of information received by said second receiving means are included in the same block of units being transmitted.

References Cited by the Examiner

UNITED STATES PATENTS

| | | | |
|---|---|---|---|
| 2,242,196 | 5/1941 | Thompson et al. | 178—23.1 |
| 2,279,353 | 4/1942 | Van Duuren | 178—23.1 |
| 2,703,361 | 3/1955 | Van Duuren | 178—23.1 |
| 2,735,889 | 2/1956 | Canfora | 178—23.1 |
| 2,988,596 | 6/1961 | Van Dalen | 178—23.1 |

FOREIGN PATENTS

| | | |
|---|---|---|
| 1,110,207 | 7/1961 | Germany. |
| 721,191 | 1/1955 | Great Britain. |

ROBERT C. BAILEY, *Primary Examiner.*

MALCOLM A. MORRISON, M. A. LERNER, *Assistant Examiners.*

UNITED STATES PATENT OFFICE
CERTIFICATE OF CORRECTION

Patent No. 3,256,514 June 14, 1966

Eugene Leonard et al.

It is hereby certified that error appears in the above numbered patent requiring correction and that the said Letters Patent should read as corrected below.

Column 11, line 3, for "AUTO" read -- AUTO′ --; column 20, line 41, strike out "normal"; column 24, line 26, for "coupled" read -- coupler --; column 25, line 48, for "stroke" read -- strobe --; column 26, line 56, for "and" read -- an --; line 57, for "RECI" read -- RESI --; column 31, lines 7 and 10, for "TRZ", each occurrence, read -- TZR --; column 34, line 67, for "G150" read -- G2700 --; column 38, lines 34 and 45, for "RFD2100", each occurrence, read -- RDF2100 --; line 39, for "FRD2100" read -- RDF2100 --; column 39, line 55, for "TRZ" read -- TZR --; column 42, line 63, for "2K18E" read -- 2K18K --; column 44, line 48, for "B02303" read -- B02301 --; column 45, line 47, for "EBP" read -- EMP --; column 52, line 17, for "C159" read -- C139 --; line 49, for "382 an amplifier G382" read -- G382 an amplifier A382 --; column 54, line 1, for "26 to 38" read -- 34 to 53 --; column 62, line 63, for "anode" read -- cathode --; line 64, for "cathode", each occurrence, read -- anode --; column 64, line 16, for "1226" read -- 1224 --; line 20, for "1222" read -- 1224 --; same line 20, for "1224" read -- 1222 --; column 82, line 62, and column 83, line 31, after "information", each occurrence, insert a comma; column 84, line 26, after "receiving means" insert a comma.

Signed and sealed this 1st day of April 1969.

(SEAL)
Attest:

EDWARD M.FLETCHER,JR.
Attesting Officer

EDWARD J. BRENNER
Commissioner of Patents